US008409012B2

(12) United States Patent
Munakata et al.

(10) Patent No.: US 8,409,012 B2
(45) Date of Patent: Apr. 2, 2013

(54) GAMING MACHINE AND GAME CONTROL METHOD THEREOF, CAPABLE OF SKIPPING COMMON GAME RESULTING IN A DRAW

(75) Inventors: Hiroki Munakata, Tokyo (JP); Makoto Miyawaki, Tokyo (JP); Kazumasa Yoshizawa, Tokyo (JP); Shinji Ogino, Tokyo (JP)

(73) Assignees: Universal Entertaiment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 391 days.

(21) Appl. No.: 12/852,150

(22) Filed: Aug. 6, 2010

(65) Prior Publication Data

US 2011/0053677 A1 Mar. 3, 2011

(30) Foreign Application Priority Data

Aug. 25, 2009 (JP) ................................ 2009-194409

(51) Int. Cl.
*A63F 13/12* (2006.01)

(52) U.S. Cl. ................. 463/42; 463/16; 463/20; 463/40

(58) Field of Classification Search .................... 463/16, 463/20, 30, 40, 42; 273/268, 274
See application file for complete search history.

(56) References Cited

U.S. PATENT DOCUMENTS 5,564,700 A 10/1996 Celona
5,823,879 A 10/1998 Goldberg et al.
6,077,162 A 6/2000 Weiss
6,312,332 B1 11/2001 Walker et al.
6,364,314 B1 * 4/2002 Canterbury .................. 273/274
6,375,568 B1 4/2002 Roffman et al.
6,481,713 B2 * 11/2002 Perrie et al. .................. 273/146
6,656,040 B1 12/2003 Brosnan et al.
7,452,273 B2 11/2008 Amaitis et al.
7,458,891 B2 12/2008 Asher et al.
2006/0046823 A1 * 3/2006 Kaminkow et al. ............. 463/16
2007/0077990 A1 * 4/2007 Cuddy et al. .................... 463/25
2007/0155476 A1 7/2007 Kobayashi

FOREIGN PATENT DOCUMENTS

JP 2007-130296 5/2007
WO WO 2005/109121 A2 11/2005

* cited by examiner

*Primary Examiner* — Damon Pierce
(74) *Attorney, Agent, or Firm* — Edwards Wildman Palmer LLP

(57) ABSTRACT

A gaming machine of the present invention collectively performs determination of a game result, sequentially in relation to a series of crap games until a game result other than a draw is to occur. Then, of game results of the series of crap games thus determined sequentially through collectively performed determination of game results, the gaming machine skips at least partially one or more game results each indicating a draw, and sequentially outputting remaining one or more game results to the slot machines 10.

10 Claims, 47 Drawing Sheets

BUTTON LAYOUT

FIG. 14

REGULAR GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0~3277 | J | WILD | A | Q | J |
| 1 | 3278~6555 | Q | A | J | J | A |
| 2 | 6556~9833 | BAT | Q | BAT | BAT | BAT |
| 3 | 9834~13111 | J | HAMMER | SWORD | Q | J |
| 4 | 13112~16389 | Q | SWORD | RHINOCEROS | K | A |
| 5 | 16390~19667 | RHINOCEROS | WILD | BAT | BAT | BUFFALO |
| 6 | 19668~22945 | A | BUFFALO | FEATURE | A | RHINOCEROS |
| 7 | 22946~26223 | DEER | DEER | A | K | FEATURE |
| 8 | 26224~29501 | SWORD | K | J | HAMMER | K |
| 9 | 29502~32779 | HAMMER | RHINOCEROS | HAMMER | Q | HAMMER |
| 10 | 32780~36057 | A | WILD | A | DEER | Q |
| 11 | 36058~39335 | Q | A | Q | SWORD | BAT |
| 12 | 39336~42613 | SWORD | HAMMER | DEER | FEATURE | K |
| 13 | 42614~45891 | RHINOCEROS | DEER | K | K | DEER |
| 14 | 45892~49169 | K | J | BUFFALO | SWORD | SWORD |
| 15 | 49170~52447 | A | SWORD | Q | DEER | J |
| 16 | 52448~55725 | HAMMER | SWORD | FEATURE | A | WILD |
| 17 | 55726~59003 | J | BAT | A | HAMMER | HAMMER |
| 18 | 59004~62281 | Q | WILD | HAMMER | BUFFALO | SWORD |
| 19 | 62282~65535 | BUFFALO | FEATURE | SWORD | RHINOCEROS | Q |

RANGE OF RANDOM NUMBER: 0~65535

FIG. 15

BONUS GAME SYMBOL TABLE

| | | FIRST COLUMN(L1) |
|---|---|---|
| CODE NO. | RANDOM NUMBER | SYMBOL |
| 0 | 0-2184 | J |
| 1 | 2185-4369 | Q |
| 2 | 4370-6553 | BAT |
| 3 | 6554-8737 | WILD |
| 4 | 8738-10921 | J |
| 5 | 10922-13105 | Q |
| 6 | 13106-15289 | RHINOCEROS |
| 7 | 15290-17473 | WILD |
| 8 | 17474-19657 | A |
| 9 | 18658-21841 | DEER |
| 10 | 21842-24025 | WILD |
| 11 | 24026-26209 | SWORD |
| 12 | 26210-28393 | HAMMER |
| 13 | 28394-30577 | A |
| 14 | 30578-32761 | WILD |
| 15 | 32762-34945 | Q |
| 16 | 34946-37129 | SWORD |
| 17 | 37130-39313 | WILD |
| 18 | 39314-41497 | RHINOCEROS |
| 19 | 41498-43681 | K |
| 20 | 43682-45865 | A |
| 21 | 45866-48049 | WILD |
| 22 | 48050-50233 | HAMMER |
| 23 | 50234-52417 | J |
| 24 | 52418-54601 | WILD |
| 25 | 54602-56785 | Q |
| 26 | 56786-58969 | WILD |
| 27 | 58970-61153 | WILD |
| 28 | 61154-63337 | BUFFALO |
| 29 | 63338-65535 | WILD |

...

| | | FIFTH COLUMN(L5) |
|---|---|---|
| CODE NO. | RANDOM NUMBER | SYMBOL |
| 0 | 0-2184 | WILD |
| 1 | 2185-4369 | J |
| 2 | 4370-6553 | A |
| 3 | 6554-8737 | WILD |
| 4 | 8738-10921 | WILD |
| 5 | 10922-13105 | BAT |
| 6 | 13106-15289 | J |
| 7 | 15290-17473 | A |
| 8 | 17474-19657 | BUFFALO |
| 9 | 18658-21841 | WILD |
| 10 | 21842-24025 | RHINOCEROS |
| 11 | 24026-26209 | FEATURE |
| 12 | 26210-28393 | K |
| 13 | 28394-30577 | WILD |
| 14 | 30578-32761 | WILD |
| 15 | 32762-34945 | WILD |
| 16 | 34946-37129 | HAMMER |
| 17 | 37130-39313 | Q |
| 18 | 39314-41497 | BAT |
| 19 | 41498-43681 | K |
| 20 | 43682-45865 | WILD |
| 21 | 45866-48049 | DEER |
| 22 | 48050-50233 | SWORD |
| 23 | 50234-52417 | J |
| 24 | 52418-54601 | WILD |
| 25 | 54602-56785 | WILD |
| 26 | 56786-58969 | HAMMER |
| 27 | 58970-61153 | SWORD |
| 28 | 61154-63337 | Q |
| 29 | 63338-65535 | WILD |

RANGE OF RANDOM NUMBER: 0-65535

FIG. 16

SYMBOL COLUMN
DETERMINATION TABLE

| SYMBOL COLUMN NO. | RANDOM NUMBER |
|---|---|
| 1 | 0~13106 |
| 2 | 13107~26214 |
| 3 | 26215~39321 |
| 4 | 39322~52428 |
| 5 | 52429~65535 |

RANGE OF RANDOM NUMBER: 0~65535

FIG. 17

CODE NO.
DETERMINATION TABLE

| | |
|---|---|
| RANDOM NUMBER | CODE NO. |
| 0-3277 | 0 |
| 3278-6555 | 1 |
| 6556-9833 | 2 |
| 9834-13111 | 3 |
| 13112-16389 | 4 |
| 16390-19667 | 5 |
| 19668-22945 | 6 |
| 22946-26223 | 7 |
| 26224-29501 | 8 |
| 29502-32779 | 9 |
| 32780-36057 | 10 |
| 36058-39335 | 11 |
| 39336-42613 | 12 |
| 42614-45891 | 13 |
| 45892-49169 | 14 |
| 49170-52447 | 15 |
| 52448-55725 | 16 |
| 55726-59003 | 17 |
| 59004-62281 | 18 |
| 62282-64281 | 19 |
| 64282-65535 | END |

RANGE OF RANDOM NUMBER: 0-65535

FIG. 18

WILD SYMBOL INCREASE NUMBER DETERMINATION TABLE

| WILD SYMBOL INCREASE NUMBER | RANDOM NUMBER |
|---|---|
| 10 | 0-13106 |
| 30 | 13107-26214 |
| 50 | 26215-39321 |
| 70 | 39322-52428 |
| 90 | 52429-65535 |

RANGE OF RANDOM NUMBER: 0-65535

FIG. 19

TRIGGER SYMBOL INCREASE NUMBER DETERMINATION TABLE

| TRIGGER SYMBOL INCREASE NUMBER | RANDOM NUMBER |
|---|---|
| 2 | 0-13106 |
| 4 | 13107-26214 |
| 6 | 26215-39321 |
| 8 | 39322-52428 |
| 10 | 52429-65535 |

RANGE OF RANDOM NUMBER:0-65535

FIG. 20

PAYOUT TABLE

| SYMBOL | THE NUMBER OF SYMBOLS REARRANGED | | | |
|---|---|---|---|---|
| | TWO | THREE | FOUR | FIVE |
| A | 2 | 4 | 6 | 8 |
| K | 10 | 20 | 30 | 40 |
| Q | 30 | 60 | 90 | 120 |
| J | 3 | 6 | 9 | 12 |
| SWORD | 2 | 4 | 6 | 8 |
| HAMMER | 2 | 4 | 6 | 8 |
| BAT | 5 | 10 | 15 | 20 |
| DEER | 15 | 30 | 45 | 60 |
| RHINOCEROS | 8 | 16 | 24 | 32 |
| BUFFALO | 25 | 50 | 75 | 100 |
| FEATURE | 2 | 4 | 6 | 8 |

FEATURE (FREE GAME): FREE GAME IS RUN WHEN THREE OR MORE TRIGGER SYMBOLS ARE REARRANGED

FIG. 21

GAMING TERMINAL MANAGEMENT TABLE

| GAMING TERMINAL | GAME TYPE | GAME STATE | CUMULATIVE GAME COUNT |
|---|---|---|---|
| 001 | REGULAR GAME | RUNNING | 35 |
| 002 | REGULAR GAME | STOPPED | 60 |
| 003 | REGULAR GAME | RUNNING | 21 |
| 004 | BONUS GAME | RUNNING | 18 |
| 005 | BONUS GAME | STOPPED | 51 |

FIG. 22

COMMON GAME MANAGEMENT TABLE

| GAMING TERMINAL | 001 | 002 | 003 | 004 | 005 |
|---|---|---|---|---|---|
| BET AMOUNT AT SLOT GAME Sn | 10.4 | 2.5 | 3.0 | 12.4 | 10.0 |
| PAYOUT MULTIPLYING FACTOR An | 2 | 2 | 2 | 2 | 2 |
| SHOOTER | 0 | 1 | 0 | 0 | 0 |
| ACCUMULATED BET AMOUNT Bn<br>Σ(Sn−Cn−Dn) | 69.39 | 92.61 | 46.26 | 46.26 | 23.13 |
| INDIVIDUAL SPECIAL BET AMOUNT Cn<br>Bn × 3% | 2.31 | 3.09 | 1.54 | 1.54 | 0.77 |
| BASE BET AMOUNT Dn<br>Bn × 7% | 5.40 | 7.20 | 3.60 | 3.60 | 1.80 |
| COMMON GAME BET AMOUNT Tn<br>INITIAL VALUE Dn | 5.40 | 7.20 | 3.60 | 3.60 | 1.80 |
| BASE BET TOTAL AMOUNT F<br>Σ Dn | 21.60 | | | | |
| SPECIAL BET TOTAL AMOUNT G<br>Σ Cn | 9.26 | | | | |
| MODE H | P | P | E | E | E |
| EASY-MODE TOTAL AMOUNT I<br>G × (i/5) | 5.56 | | | | |
| ADVANCED MODE TOTAL AMOUNT J<br>G × (5−i)/5 | 3.70 | | | | |
| PAYOUT RATIO Kn (CONTRIBUTION LEVEL En)<br>Dn/Dmax<br>(WITHIN THE SAME MODE) | 75% | 100% | 50% | 50% | 25% |
| CORRECTED SPECIAL BET Ln<br>I OR J × Kn<br>(WITHIN THE SAME MODE) | 2.78 | 3.70 | 2.78 | 2.78 | 1.39 |
| TOTAL BET AMOUNT Mn<br>Ln+Dn | 8.18 | 10.90 | 6.38 | 6.38 | 3.19 |
| NEXT-GAME CARRY-OVER AMOUNT Nn | 0.92 | 0 | 2.78 | 2.78 | 4.17 |

FIG. 23

DIE PIP STORAGE TABLE

| CUMULATIVE GAME COUNT | PIPS OF DICE |
|---|---|
| 1 | 3 |
| 2 | 6 |
| 3 | 8 |
| 4 | 9 |
| 5 | 2 |
| 6 | 11 |
| ... | ... |
| ... | ... |
| ... | ... |
| E-3 | 11 |
| E-2 | 6 |
| E-1 | 2 |
| E | 7 |

FIG. 24

SUBTRACTION VALUE DETERMINATION TABLE

| SUBTRACTION VALUE | RANGE OF RANDOM NUMBER |
|---|---|
| 1 | 0~77 |
| 2 | 78~205 |
| 3 | 206~255 |

RANGE OF RANDOM NUMBER: 0~255

GAMING MACHINE AND GAME CONTROL METHOD THEREOF, CAPABLE OF SKIPPING COMMON GAME RESULTING IN A DRAW

CROSS REFERENCE TO RELATED APPLICATION

The present application claims priority from Japanese Patent Application No. 2009-194409, which was filed on Aug. 25, 2009, the disclosure of which is herein incorporated by reference in its entirety.

BACKGROUND OF THE INVENTION

1. Field of the Invention

The present invention relates to a gaming machine and a game control method thereof, whereby a common game such as a crap game is run in a plurality of gaming terminals.

2. Description of Related Art

A known gaming machine as described in U.S. Pat. Nos. 5,564,700, 6,077,162, 6,375,568, and 6,312,332 includes a plurality of gaming terminals, terminal controllers each of which is provided to a gaming terminal and causes the gaming terminal to run a game, and a center controller which controls each terminal controller. Such a gaming machine has function which enables a game involving a jackpot to be run as a common game in the gaming terminals and distributes a jackpot payout to a plurality of players, in addition to a function which allows a base game to be run individually at the gaming terminals.

Further, U.S. Pat. Nos. 6,656,040, 7,458,891, 7,452,273, 5,823,879, and WO 2005/109121 each disclose a structure which allows a common game such as crap game to be run in a synchronous manner at each gaming terminal. In addition, Japanese Patent Publication 2007-130296 discloses a structure where game results of a predetermined count of games are determined in advance, and the predetermined count of games are consecutively run as one set, while effects for one set are being executed.

Accordingly, a known gaming machine possesses an entertainment characteristic which allows a plurality of players to play one common game, in addition to an entertainment characteristic which allows the players to individually play a base game. Further, a know gaming machine consecutively runs a plurality of games as one set while executing one set of effects to expand a level of freedom in the entertainment characteristic. Thus, how to run a common game at each gaming terminal has traditionally been an important element of improving the entertainment characteristic in the gaming machine having a plurality of gaming terminals.

The object of the present invention is to provide a gaming machine having a function of running a common game capable of realizing a high entertainment characteristic, and a game control method.

SUMMARY OF THE INVENTION

The present invention is a gaming machine including a plurality of gaming terminals and a center controller. The plurality of gaming terminals each have an input device which accepts an external input, and a terminal controller programmed to execute the steps (a1) to (a3) below. The center controller is connected in communication with the gaming terminals (with wires or wirelessly), and is programmed to execute the steps (b1) to (b3) below.

Specifically, the terminal controllers each execute the steps of:

(a1) running a base game (regular game, bonus game, free game or the like) in response to a start operation input through the input device;

(a2) in response to a game start command from the center controller, running a common game (crap game or the like) whose game result includes a draw; and (a3) determining a game result of the common game based on game result information from the center controller, and when a game result is a draw, running a common game again based on next game result information.

Meanwhile, the center controller execute the steps of:

(b1) outputting a game start command to a gaming terminal having satisfied a game running condition at a predetermined timing;

(b2) collectively perform determination of a game result, sequentially in relation to a series of common games, until a game result other than a draw occurs;

(b3) among the game results of the series of common games thus determined in (b2), skipping at least partially one or more game results each indicating a draw, and sequentially outputting remaining one or more game results as game result information to each of the gaming terminals.

With the structure, the center controller collectively performs determination of a game result, sequentially in relation to a series of common games. Then, of the game results thus determined, those indicating a draw are skipped at least partially, and the remaining one or more game results are output as the game result information to the gaming terminals. Thus, at least a part of common games are omitted at a gaming terminal, each of which omitted common games would result in a draw. Therefore, even when several game results determined each indicate a draw, adjusting the number of common games to be skipped prevents an excessive number of repetitions of common games. As a result, this prevents a player from losing his/her interest in playing a game, because of an excess waiting time due to repetitions of common games each resulting in a draw.

Further, in the present invention, the center controller may execute (b2) above, on condition that a predetermined count of common games are repeated.

According to the above structure, the number of common games repeated is determined within a certain range such the player is not kept waiting for an excessively long period of time due to the repeated common games resulting in a draw. Thus, it is possible to provide a common game to the player without making him/her lose his/her interest in common games.

Further, in the present invention, the center controller may, in (b3), (i) randomly determines a re-execution count of the common games indicating the count of common games re-executed at the terminal controller, based on the game result information, and (ii) when a count of consecutive game results which are determined in (b2) and indicates a draw is greater than the re-execution count, determines a skip count (i.e. the number of results skipped) of the game results indicating a draw so that the count of the game results indicating a draw equals the re-execution count.

According to the above structure, the re-execution count, which indicates a count of common games re-executed before the common game resulting in a win or loss, is unspecified. This prevents a player from predicting a timing at which common games end.

Further, in the present invention, the center controller may execute (b3) on condition that a predetermined count of consecutive game results determined in (b2) indicate a draw.

According to the above structure, the number of common games repeated is determined within a certain range such the player is not kept waiting for an excessively long period of time due to the repeated common games resulting in a draw. Thus, it is possible to provide a common game to the player without making him/her lose his/her interest in common games.

Further, in the present invention, the center controller executes the following process of: determining in advance a repetition count indicating the number of common games to result in a draw, and executing (b2) on condition that the number of common games repeated equals the repetition count; skipping in (b3) all the game results indicating a draw out of the game results determined in (b2); and outputting a last one of the game results as game result information to each of the gaming terminals.

According to the above structure, when common games are repeated for the number of times equal to a repetition count determined in advance, which common games result in a draw, a series of game results for a series of common games are determined. Thereafter, all game results indicating a draw are skipped, out of the determined series of game results, and a common game corresponding to a last one of the game results is run. Thus, a win or a loss is surely resulted from the common game following the number of previous common games equal to the repetition count, each of which previous common games are to result in a draw. This easily prevents an excess gaming time during which common games are run.

Further, the gaming terminals of the present invention may further include a display device; the terminal controller may execute the step of (a4) executing a process for displaying, on the display device, skip information from the center controller; and the center controller may execute the step of (b4) outputting one or more game results which indicate a draw and are skipped in (b3) as the skip information to each of the gaming terminal.

According to the above structure, skipped one or more game results indicating a draw are displayed on the display device of each gaming terminal. This allows a player to confirm the number of common games skipped.

Further, the common game in the present invention may be a crap game.

Further, the present invention is a gaming machine which includes a plurality of gaming terminals and a center controller. The gaming terminals each include an input device which accepts an external input, and a terminal controller programmed to execute steps (c1) to (c4) below. The center controller is connected in communication with the gaming terminals (wired, or wirelessly), and programmed to execute steps (d1) to (d5) below.

Specifically, the terminal controllers each execute the steps of:

(c1) running a base game in response to a start operation inputted through the input device;

(c2) running a crap game in response to a game start command from the center controller;

(c3) determining whether the gaming terminal is designated to be a shooter of the crap game, based on a shooter command from the center controller, and when the gaming terminal is designated to be a shooter, accepting a roll operation input through the input device and enabling a roll operation command to be output to the center controller; and (c4) determining a game result of the crap game based on game result information from the center controller, and when the game result indicates a draw, running a crap game again based on next game result information.

Specifically, the center controller executes the steps of:

(d1) determining whether a crap game start condition is met, based on a running state of the base game at each gaming terminal;

(d2) when the crap game start condition is met, outputting a game start command to one or more gaming terminals having satisfied a game running condition;

(d3) after outputting the game start command, selecting a specific gaming terminal from among one or more gaming terminals having satisfied the game running condition, and outputting a shooter command to the specific gaming terminal;

(d4) collectively perform determination of a game result, sequentially in relation to a series of crap games, in response to a roll operation command from the specific gaming terminal, until a game result other than a draw occurs;

(d5) among the game results of the series of common games thus determined in (d4), skipping at least partially one or more game results each indicating a draw, and sequentially outputting remaining one or more game results as game result information to each of the gaming terminals.

With the structure, the center controller collectively performs determination of a game result, sequentially in relation to a series of crap games. Then, of the game results thus determined, those indicating a draw are skipped at least partially, and the remaining one or more game results are output as the game result information to the gaming terminals. Thus, at least a part of crap games are omitted at a gaming terminal, each of which omitted crap games would result in a draw. Therefore, even when several game results determined each indicate a draw, adjusting the number of crap games to be omitted prevents an excessive number of repetitions of crap games. As a result, this prevents a player from losing his/her interest in playing a crap game, because of an excess waiting time due to repetitions of common games each resulting in a draw.

Further, the present invention is a game control method of a gaming machine which includes a plurality of gaming terminals and a center controller. The gaming terminals each include an input device which accepts an external input, and a terminal controller which executes the steps below. The center controller is connected in communication with the gaming terminals, and executes the steps below.

Specifically, the terminal controllers each execute the steps of:

- running a base game in response to a start operation input through the input device;
- in response to a game start command from the center controller, running a common game whose game result includes a draw; and
- determining a game result of the common game based on game result information from the center controller, and when a game result is a draw, running a common game again based on next game result information.

Specifically, the center controller executes the steps of:

- outputting a game start command to a gaming terminal having satisfied a game running condition at a predetermined timing;
- collectively performing determination of a game result, sequentially in relation to a series of common games, until a game result other than a draw occurs; and
- among the game results of the series of crap games thus determined sequentially through collectively performed determination of game results, skipping at least a partially one or more game results each indicating a draw, and sequentially outputting remaining one or more game results as game result information, to each of the gaming terminals.

The present invention is able to possess a function of a common game capable of realizing a high entertainment characteristic.

BRIEF DESCRIPTION OF THE DRAWINGS

FIG. 14 is an explanatory diagram of a regular game symbol table.

FIG. 15 is an explanatory diagram of a bonus game symbol table.

FIG. 16 is an explanatory diagram of a symbol column determination table.

FIG. 17 is an explanatory diagram of a code No. determination table.

FIG. 18 is an explanatory diagram of a wild symbol increase number determination table.

FIG. 19 is an explanatory diagram of a trigger symbol increase number determination table.

FIG. 20 is an explanatory diagram of a payout table.

FIG. 21 is an explanatory diagram of a gaming terminal management table.

FIG. 22 is an explanatory diagram of a common game management table.

FIG. 23 is an explanatory diagram of a die pip storage table.

FIG. 24 is an explanatory diagram of subtraction value determination table.

DESCRIPTION OF THE PREFERRED EMBODIMENTS

Gaming Machine Overview

A gaming machine has a first structure where a plurality of gaming terminals are connected to a center controller so as to allow data communication therebetween, and (i) runs common games at each gaming terminal, which common games have game results each indicating a time, in such a manner that at least a part of game results is skipped, which game results indicating a draw, and (ii) runs one or more common games until a game result indicating other than a draw is resulted.

Figure 1:
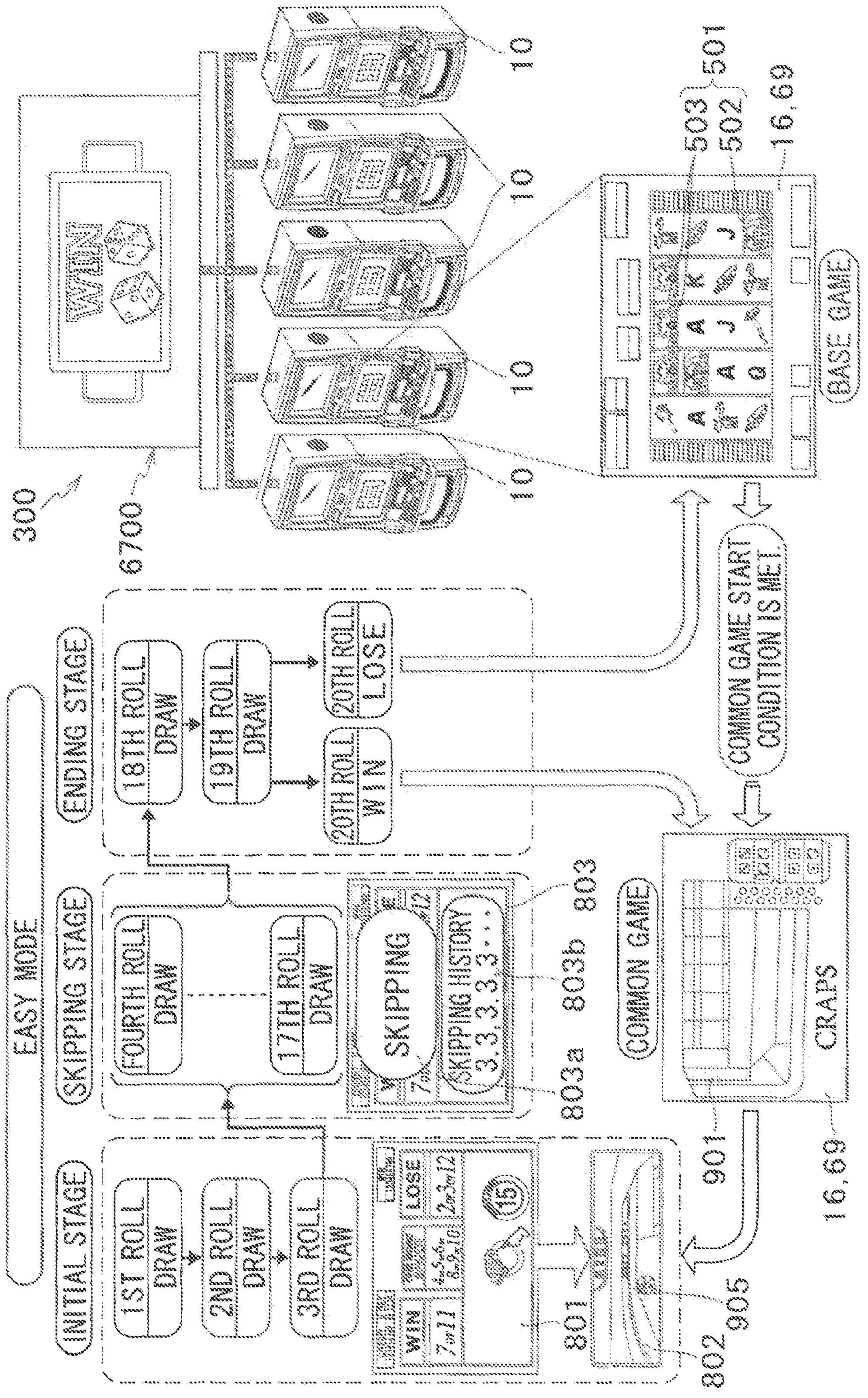
FIG. 1 is an explanatory diagram of a playing method of a gaming machine.
Figure 2:
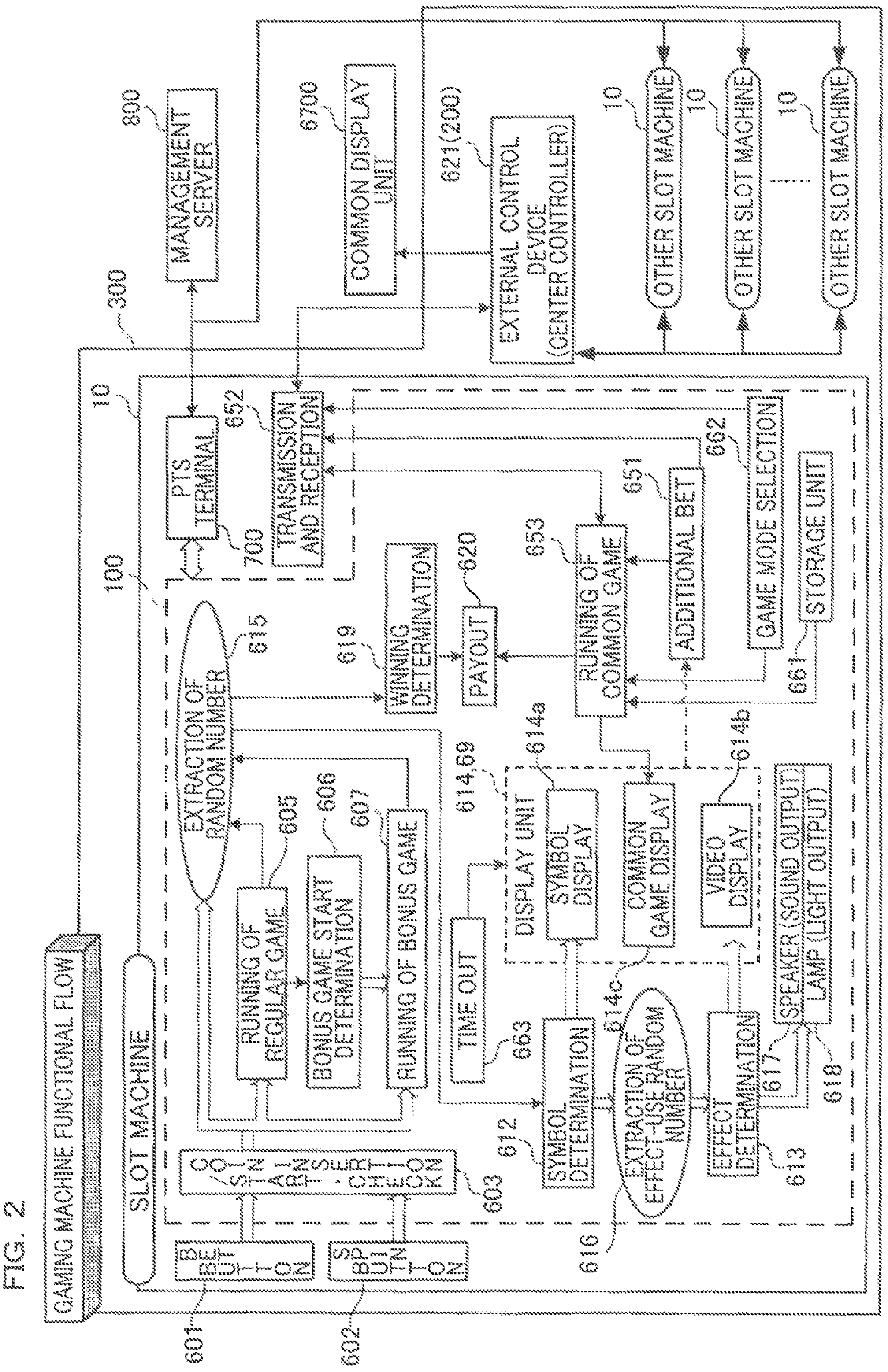
FIG. 2 is an explanatory diagram of a functional flow of the gaming machine.
Figure 3:
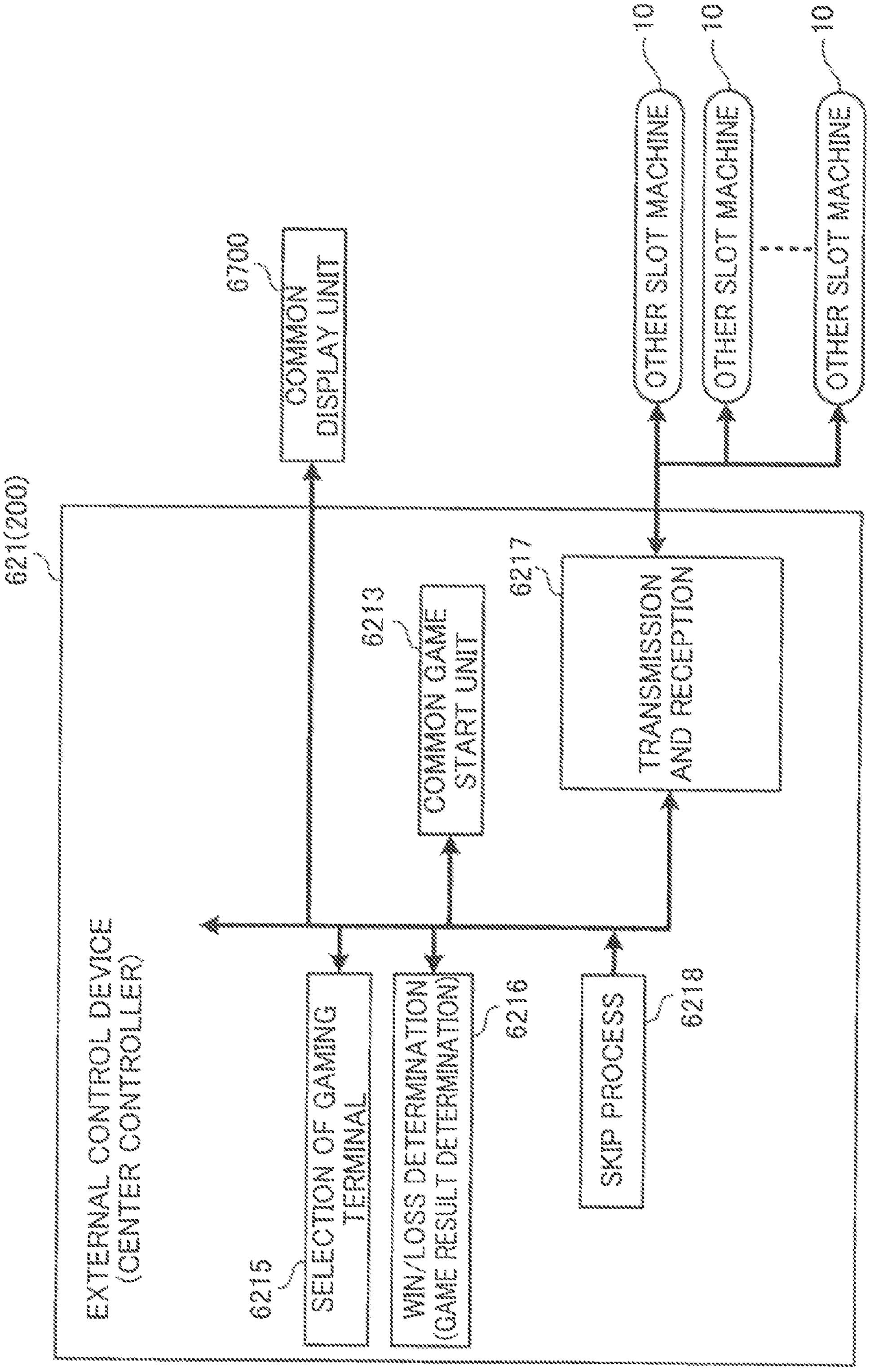
FIG. 3 is an explanatory diagram of a functional flow of the gaming machine.

Specifically, with the first structure, the gaming machine 300 has a multi-player type structure, where a plurality of slot machines 10 each provided as a gaming terminal are connected to a center controller 200 so as to allow data communication therebetween, as shown in FIGS. 1 to 3. The gaming machine 300 is configured in such a manner that a base game such as slot game is runnable individually at each slot machine 10, and a crap game as common game is runnable in synchronization among each slot machine 10. Further, when running crap games, the gaming machine 300 skips at least partially, the game results indicating a draw, and runs crap games until a game result other than a draw is resulted. Note that the connection between the slot machines 10 and the center controller 200 may be wireless, wired, or a combination of these. Further, a unit of a bet amount may be a national or regional currency such as dollar, yen, and Euro, or a game point passable only at a hall where the gaming machine 300 is installed or an industry related to the gaming machine 300.

More specifically, with the first structure, the gaming machine 300 includes the slot machines 10 and a center controller 200. The slot machines 10 each have an input device which accepts an external input, and a terminal controller which runs the base game and which is programmed to execute steps (a1) to (a3) below in order to run a common game executed at more than one of the slot machines 10. The center controller is connected in communication with the slot machines 10 and is programmed to execute steps (b1) to (b3) below.

Specifically, steps (a1) to (a3) executed by the terminal controller of each slot machine 10 are as follows: (a1) running a base game in response to a start operation input through the input device;

(a2) running a common game in response to a game start command from the center controller 200, which common game includes a game result indicating a draw;

(a3) determining a game result of the common game based on game result information from the center controller 200, and when the game result is a draw, running a common game again based on next game result information.

Note that the common game such as crap game may substitute for the base game, and the base game and the crap game may be run in parallel.

Specifically, steps (b1) to (b3) executed by the center controller 200 of the gaming machine 300 are as follows: (b1) outputting a game start command to a slot machine 10 having satisfied a game running condition, at a predetermined timing;

(b2) collectively performing determination of a game result, sequentially in relation to a series of common games, until a game result other than a draw occurs;

(b3) among the game results of the series of crap games thus determined in (b2), skipping at least partially one or more game results each indicating a draw, and sequentially outputting remaining one or more game results as game result information to each of the slot machines 10.

The "game running condition" in (b1) is a condition for being qualified to participate in the common game such as crap game. Examples of the game running condition include a cumulative value of a base game bet amount equal to or greater than a minimum bet amount, and the number of base game played being equal to or greater than a minimum number of bets. Note that the game running condition can be satisfied at the will of a player before the common game is begun. For example, when the cumulative value of bet amounts in the base game falls short of the minimum bet amount and the game running condition is not satisfied for this reason, the game running condition can be satisfied by paying a bet amount to compensate the differential between the minimum bet amount and the cumulative value of the bet amounts or making a payment for satisfying a predetermined condition, immediately before the common game is started. Further, in cases where the number of base games falls short, the game running condition can be satisfied by payment corresponding to the shortage, or by making a payment for satisfying a predetermined condition.

Further, the "predetermined timing" at which a game start command is outputted in (b1) is a timing when a common game start condition has been satisfied at any one of the slot machines 10. Here, examples of the common game start condition include: information of accumulated bet amounts, and an accumulated base game count. Note that the present embodiment is described using the gaming machine 300 having a center controller 200 aside from the slot machines 10; however, the present invention is not limited to this. In other words, the gaming machine 300 may be configured in such a manner that at least one slot machine 10 has a function of the center controller 200, and the slot machines 10 may be connected with each other so as to allow data communication therebetween.

The "slot machines 10" each are a type of gaming terminal in the gaming machine 300. Note that the present embodiment is described using slot machines 10 as an example of gaming terminals; however, the present invention is not limited to this: The present invention may adopt a model which has a terminal controller capable of independently running some base game.

The "base game" in the present embodiment is run by the slot machines 10. The base game is a slot game where a plurality of symbols 501 are rearranged. Note that the base game is not limited to slot game: The base game may be any type as long as it is independently runnable at gaming terminals such as slot machines 10.

Rearrangement of the symbols 501 in the slot game is executed on a symbol display device 16. The slot game includes processes of: running a regular game on condition that a game value is bet, in which regular game the symbols 501 are rearranged on the symbol display device 16, and a regular payout according to the symbols 501 rearranged is awarded; when the symbols 501 are rearranged on a predetermined condition, running a bonus game where the symbols 501 are rearranged under such a condition that a payout rate thereof is greater than that of the regular game, and a bonus payout is awarded according to the symbols 501 rearranged; and when a rescue start condition is met, running a rescue process.

Figure 25:
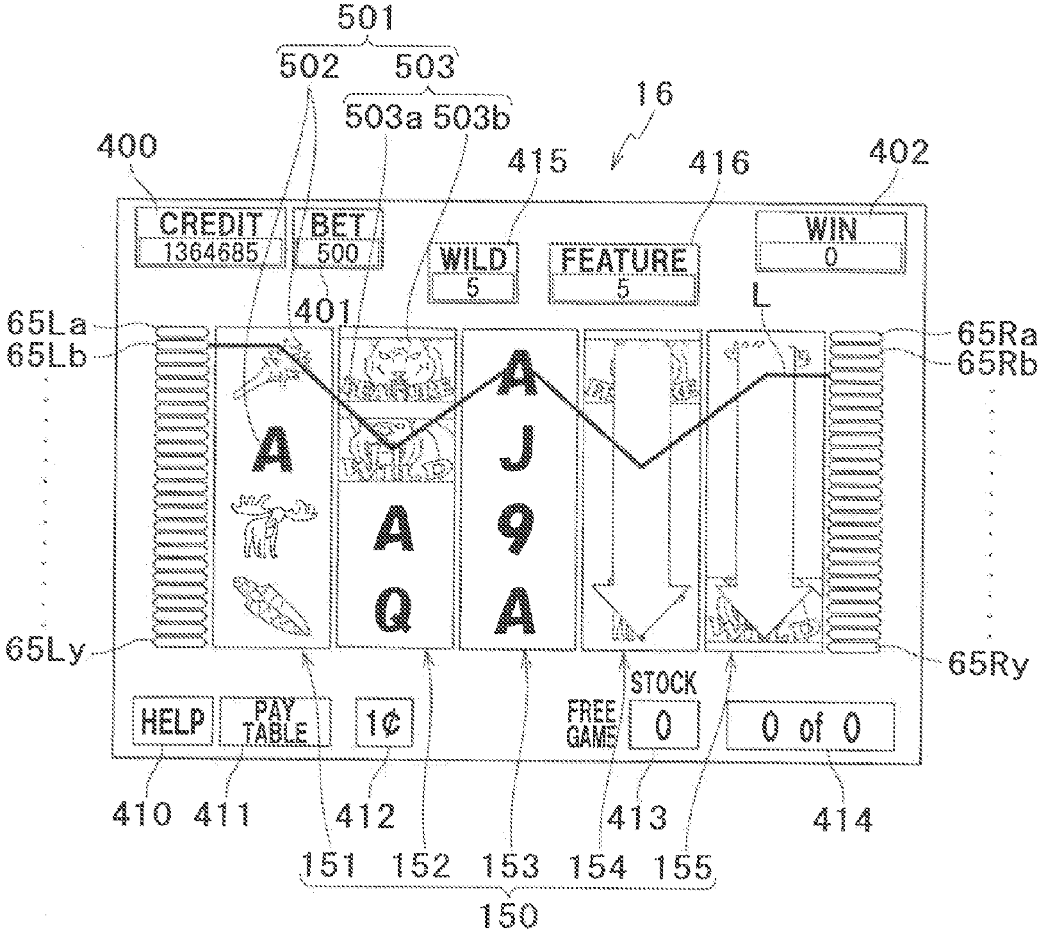
FIG. 25 is an explanatory diagram of a display state of a symbol display device.

The symbols 501 include "specific symbols 503" and "regular symbols 502." That is, the "symbols 501" is a superordinate conception of the specific symbols 503 and regular symbols 502. The specific symbols 503 include wild symbols **503*a* and trigger symbols 503*b*, as shown in FIG. 25. Each of the wild symbols 503*a* is a symbol substitutable for any type of symbols 501. Each of the trigger symbols 503*b* is a symbol which triggers at least a bonus game. That is, a trigger symbol 503*b* triggers transition from the regular game to the bonus game, and triggers stepwise increases in the number of specific symbols 503 at an interval from the start of the bonus game. Further, the trigger symbol 503*b* triggers increases in the number of specific symbols 503 in the bonus game, that is, the trigger symbol 503*b* triggers increases in the number of trigger symbols 503*b* and/or wild symbols 503*a*. Note that the trigger symbol 503*b*** may trigger an increase in the number of games in the bonus game.

The "game value" is a coin, paper money, or electronic valuable information corresponding to these. Note that the game value in the present invention is not particularly limited. Examples of the game value include game media such as medals, tokens, cyber money, tickets, and the like. A ticket is not particularly limited, and a later-mentioned barcoded ticket may be adopted for example.

The "bonus game" has a same meaning as a "feature game." In the present embodiment, the bonus game is a game in which free games are repeated. However, the bonus game is not particularly limited and may be any type of game, provided that the bonus game is more advantageous than the regular game for a player. Another bonus game may be adopted in combination, provided that a player is given more advantageous playing conditions than the regular game. For example, the bonus game may be a game that provides a player with a chance of winning more game values than the regular game or a game that provides a player with a higher chance of winning game values than the regular game. Alternatively, the bonus game may be a game that consumes fewer amounts of game values than the regular game. In the bonus game, these games may be provided alone or in combination.

The "free game" is a game runnable with a bet of fewer game values than the regular game. Note that "bet of fewer amounts of game values" encompasses a bet of zero game value. The "free game" therefore may be a game runnable without a bet of a game value, which free game awards an amount of game values based on symbols 501 rearranged. In other words, the "free game" may be a game which is started without consumption of a game value. To the contrary, the "regular game" is a game runnable on condition that a game value is bet, which regular game awards an amount of game value based on the symbols 501 rearranged. In other words, the "regular game" is a game which starts with consumption of a game value.

The expression "rearrange" in this specification means dismissing an arrangement of symbols 501, and arranging symbols 501 once again. "Arrangement" means a state where the symbols 501 can be visibly confirmed by a player.

The "regular payout according to rearranged symbols 501" means a regular payout corresponding to a winning combination achieved as a result of the rearrangement. In addition, the "bonus payout according to rearranged symbols 501" means a bonus payout corresponding to a winning combination achieved as a result of the rearrangement. When a "winning combination" is formed, a winning is achieved. The winning combination is detailed later.

The "condition that a payout rate is higher than that of the regular game" is, for example, a free game, a state where the number of wild symbols 503*a* or trigger symbols 503*b* has increased, or a game using a replaced symbol table. The "rescue start condition" is, for example, the extremely large number of repetitions of regular games, that is, a state where the number of repetitions of regular games is a predetermined number or more. Alternatively, it is, for example, an extremely small total amount of payout obtained, that is, a case where a total amount of payouts (base payouts or bonus payouts), which has been obtained by one player as a result of repeating games a predetermined number of times or more, is equal to or less than a predetermined value. The "rescue process" is a process for rescuing a player. Examples of the rescue process include: running a free game, providing a state where the number of wild symbols 503*a* or trigger symbols 503*b* is increased, running a game using a replaced symbol table, or awarding an insurance payout.

The gaming machine 300 with the first structure as described above realizes a gaming method which, when running in each of the slot machines 10 common games such as crap games each of which can result in a draw, (i) skips at least partially the game results indicating a draw, and (ii) running common games until a game result other than a draw is yield. In other words, the gaming machine 300 is at least configured to be operated by a game control method which, when running in each of the slot machines 10 common games each of which can result in a draw, (i) skips at least partially the game results indicating a draw, and (ii) running common games until a game result other than a draw is yield.

Specifically, the gaming method and the game control method of the gaming machine 300 are executed at a gaming machine having slot machines 10 and the center controller 200. The slot machines 10 each have: an input device capable of receiving an external input; and a terminal controller for running the base game individually and running the common game executed at the slot machines 10. The center controller 200 is connected in communication with the slot machines 10 and is for exercising the common game run communally at the slot machines 10.

The terminal controller of each slot machine 10 executes the steps of: running a base game in response to a start operation inputted through the input device; running a common game response to a game start command from the center controller, which common game can result in a draw; determining a game result based on game result information from the center controller 200, and when the game result determined indicates a draw, running a common game again based on the next game result information.

The center controller 200 executes the steps of: outputting a game start command at a predetermined timing to a slot machine 10 having satisfied the game running condition; collectively performing determination of a game result, sequentially in relation to a series of common games, until a game result other than a draw occurs; among the game results of the series of crap games thus determined sequentially through collectively performed determination of game results, skipping at least a partially one or more game results each indicating a draw, and sequentially outputting remaining one or more game results as game result information, to each of the slot machines 10.

With the gaming machine 300 with the first structure, the gaming method having the steps described above, and the game control method, game results of a series of common game are sequentially determined and at least a part of the game results are skipped in the center controller 200, With the structure, the center controller 200 collectively performs determination of a game result, sequentially in relation to a series of common games. Then, of the game results thus determined, those indicating a draw are skipped at least partially, and the remaining one or more game results are output as the game result information to the slot machines 10. Accordingly, at least a part of common games which are to result in a draw are omitted in the slot machines 10. Therefore, even when several game results determined each indicate a draw, adjusting the number of crap games to be skipped prevents an excessive number of repetitions of common games. As a result, this prevents a player from losing his/her interest in playing a crap game, because of an excess waiting time due to repetitions of common games each resulting in a draw. Thus, the gaming machine 300 is able to possess a function of a common game capable of realizing a high entertainment characteristic.

Further, in addition to the first structure, the gaming machine 300 has a second structure where the center controller 200 executes (b2) on condition that a predetermined count of common games are consecutively run. According to the above structure, the number of common games repeated is determined within a certain range such the player is not kept waiting for an excessively long period of time due to the repeated common games resulting in a draw. Thus, it is possible to provide a common game to the player without making him/her lose his/her interest in common games.

Further, in addition to the first and the second structures, the gaming machine 300 may have a third structure where the center controller 200, in (b3), (i) randomly determines a re-execution count of the common games indicating the count of common games re-executed at the slot machine 10, based on the game result information, and (ii) when a count of consecutive game results which are determined in (b2) and indicates a draw is greater than the re-execution count, determines a skip count (i.e. the number of results skipped) of the game results indicating a draw so that the count of the game results indicating a draw equals the re-execution count. According to the above structure, the re-execution count, which indicates a count of common games re-executed before the common game resulting in a win or loss, is unspecified. This prevents a player from predicting a timing at which common games end.

Further, instead of any one of the first to third structures, the gaming machine 300 may have a fourth structure where the center controller 200 executes (b3) on condition that game results determined in (b2) each of which game results indicates a draw are consecutively yield for a predetermined number of times. According to the above structure, the number of common games repeated is determined within a certain range such the player is not kept waiting for an excessively long period of time due to the repeated common games resulting in a draw. Thus, it is possible to provide a common game to the player without making him/her lose his/her interest in common games.

In addition to any one of the first to fourth structures, the gaming machine 300 has a fifth structure where the center controller 200: executes (b2) on condition that the number of common games run equals to the repetition count in (b3), each of which common games results in a draw; and skips all the game results indicating a draw out of the game results determined in (b2); and outputs a last one of the game results as game result information to each of the slot machines 10.

According to the above structure, when common games are repeated for the number of times equal to a repetition count determined in advance, which common games result in a draw, a series of game results for a series of common games are determined. Thereafter, all game results indicating a draw are skipped, out of the determined series of game results, and a common game corresponding to a last one of the game results is run. Thus, a win or a loss is surely resulted from the common game following the number of previous common games equal to the repetition count, each of which previous common games are to result in a draw. This easily prevents an excess gaming time during which common games are run.

In addition to any one of the first to fifth structures, the gaming machine 300 has a sixth structure. In the gaming machine 300 with the sixth structure, the slot machines 10 each has a symbol display device 16, and the terminal controller of each slot machine 10 executes (a4) where the terminal controller causes the symbol display device 16 to display skip information from the center controller 200. Further, in the gaming machine 300 with the sixth structure, the center controller 200 executes (b4) where the center controller 200 outputs one or more skipped game results indicating a draw, which are skipped in (b3), as skip information to each slot machine 10. According to the above structure, skipped one or more game results indicating a draw are displayed on the symbol display device 16 of each slot machine 10. This allows a player to confirm the number of common games skipped.

Further, the gaming machine 300 may be configured to include slot machines 10 each having a terminal controller programmed to execute steps (c1) to (c4) below, and the center controller 200 connected in communication with the slot machines 10 and programmed to execute steps (d1) to (d5) below.

Specifically, the terminal controller of each slot machine 10 executes the steps of: (c1) running a base game in response to a start operation input through and input device;

(c2) running a crap game in response to a game start command from the center controller 200;

(c3) determining whether the slot machine 10 is designated to be a shooter of the crap game based on a shooter command from the center controller 200, and when the slot machine 10 is designated to be the shooter accepting a roll operation input through the input device and enabling a roll operation command output to the center controller 200. (c4) determining a game result of the crap game based on game result information from the center controller 200, and when the game result indicates a draw, runs a crap game again based on the next game result information.

Meanwhile, the center controller 200 executes the steps of: (d1) determining whether a crap game start condition is met, based on a running state of a base game at each slot machine 10;

(d2) when the crap game start condition is met, outputting a game start command to a slot machine 10 having satisfied a game running condition;

(d3) after the game start command has been output, selecting a specific slot machine 10 from among one or more slot machines 10 having satisfied the game running condition, and outputting a shooter command to the specific slot machine 10;

(d4) collectively perform determination of a game result, sequentially in relation to a series of crap games, in response to a roll operation command from the specific slot machine 10, until a game result other than a draw occurs;

(d5) skipping at least a part of game results indicating a draw out of the game results determined in (d4), and sequentially outputting remaining one or more game results as game result information to each of the slot machines 10.

Here, the word "shooter" refers to a player who rolls dice in a crap game. In the common game of the present invention, the word "shooter" refers to a player who plays at the slot machine 10 which is the first one to start running the crap game. Further, the "roll operation" in a crap game refers to an action of rolling dice, while in the common game, the word refers to starting a common game.

According to the above structure, the gaming machine 300 allows a player who meets the crap game start condition to be the shooter of the crap game who determines the game result of the crap game. Thus, in addition to the effects brought by the first to sixth structures, the gaming machine 300 is capable of making a player play the base game with desire to be the shooter of the crap game.

Note that the gaming machine 300 may further have the below structures, in addition to the first to sixth structures.

Specifically, the gaming machine 300 may have a structure where the center controller 200, in (b3) skips one or more game results each indicating a draw, on condition that the number of game results each indicating a draw consecutively occur for a predetermined number of times. According to the above structure, the number of common games repeated is determined within a certain range such the player is not kept waiting for an excessively long period of time due to the repeated common games resulting in a draw. Thus, it is possible to provide an ordinary common game to the player without making him/her lose his/her interest in common games.

Further, the gaming machine 300 may have a structure where the center controller 200, in (b3) randomly determines the skip count, the game results each indicating a draw. According to the above structure, the skip count is randomly determined, each of which game results indicates a draw. Thus, the number of common games to be repeated until a win or loss is resulted is unfixed. This prevents a player from predicting a timing at which common games end.

Further, in the gaming machine 300, the terminal controller may be configured to execute the step of selecting a specific game mode from among a plurality of game modes in a common game. Here, the "game mode" may be set in accordance with a difficulty level or the complexity of the common game itself, or the complexity of a betting method of the common game.

Specifically, the gaming machine 300 may have a function where a common game is a crap game, and the crap game has an easy mode and an advanced mode. The easy mode allows only a simplified automatic bet on a pass line. The advanced mode is a more complicated bet process which allows manual bet on other than the pass line in addition to an automatic bet. The gaming machine 300 may further have a structure whereby a crap game whose game result is a draw is skipped only when the crap game is played in the easy mode. In this case, a player is allowed to participate in crap games with different difficulty levels by selecting different game modes. Moreover, it is possible to finish playing a crap game in a short period of time with the skip process in the easy mode where the betting process is simplified.

Further, the gaming machine 300 may have a structure where the slot machines 10 each include a symbol display device 16 serving as a terminal display device, and where the gaming machine 300 causes the symbol display device 16 to display a movie related to a roll operation during a period of time after the slot machine 10 outputs a roll operation command to the center controller before the slot machine 300 receives game result information from the center controller 200. An example of the "movie related to a roll operation" is a movie showing a rolling dice image. According to the gaming machine 300 having the structure, the movie related to the roll operation is displayed after a roll operation has been executed before game result information is received. This directs each player's interest towards the crap game.

Further, the gaming machine 300 may have a common display device 6700 provided to a position where the common display device 6700 is noticeable from operating positions of all the slot machines 10, and the center controller 200 may cause the common display device 6700 to display a screen showing a state until the crap game start condition is met. Note that an operating position is at the eye level of a player who operates a slot machine 10. According to the gaming machine 300 having the structure, the common display device 6700 displays a screen showing a state until the crap game start condition is met. This allows each player to anticipate waiting time before the crap game begins.

(Functional Flow of Gaming Machine 300: Slot Machine)

The gaming machine 300 having the above structure has slot machines 10 and an external control device 621 (center controller 200) connected to the slot machine 10 so as to allow data communication therebetween, as shown in FIGS. 2 and 3. The external control device 621 is connected to the slot machines 10 installed in a hall so as to allow data communication therebetween.

The slot machines 10 each include a bet button unit 601, a spin button unit 602, a display unit 614, and a game controller 100 which controls these units. Note that the bet button unit 601 and the spin button unit 602 each are a kind of an input device. Further, the slot machine includes a send-receive unit 652 which enables data communication with the external control device 621.

The bet button unit 601 has a function of accepting a bet amount through a player's operation. The spin button unit 602 has a function of accepting a start of a game such as regular game through a player's operation, that is, a start operation. The display unit 614 has a function of displaying still-image information and moving-image information. Examples of the still-image information are various types of symbols 501, numeral values, and signs. Examples of the moving-image information include effect video. Further, the display unit 614 has a touch panel 69 as an input device, and has a function which accepts various commands inputted through a player's push operation. The display unit 614 has a symbol display region 614*a*, a video display region 614*b*, and a common game display region 614*c*. The symbol display region 614*a* displays symbols 501, as shown in FIG. 1. The video display region 614*b* displays various types of effect video information to be displayed during a game, in the form of a moving image or a still image. The common game display region 614*c* is a region where a common game such as a jackpot game is displayed. Note that the common game display region 614*c* may be formed with the symbol display region 614*a* and a video display region 614*b*. The common game display region 614*c* may appear only when the common game is run, in replacement of the symbol display region 614*a* or the video display region 614*b*.

The game controller 100 includes: a coin insertion/start-check unit 603; a regular game running unit 605; a bonus game start determination unit 606; a bonus game running unit 607; a random number extraction unit 615; a symbol determination unit 612; an effect-use random number extraction unit 616; an effect determination unit 613; a speaker unit 617; a lamp unit 618; a winning determination unit 619; and a payout unit 620.

The regular game running unit 605 has a function of running a regular game on condition that the bet button unit 601 has been operated. The bonus game start determination unit 606 determines whether to run a bonus game, based on a combination of rearranged symbols 501 resulted from the regular game. In other words, the bonus game start determination unit 606 has functions of: (i) determining that the player is entitled to a bonus game when one or more trigger symbols 503*b* rearranged satisfy a predetermined condition; and (b) activating the bonus game running unit 607 so as to run a bonus game from the subsequent unit game.

Note that a unit game includes a series of operations executed within a period between a start of receiving a bet and a point where a winning may be resulted. For example, bet reception, rearrangement of symbols 501 having been stopped, and a payout process to award a payout are executed once each within a single unit game of the regular game. Note that a unit game in a regular game is referred to as a unit regular game.

The bonus game running unit 607 has a function of running a bonus game which repeats free games for a plurality of times equivalent to the number of games, merely in response to an operation on the spin button unit 602.

The symbol determination unit 612 has functions of: determining symbols 501 to be rearranged with a random number given from the random number extraction unit 615; rearranging the determined symbols 501 in the symbol display region 614*a* of the display unit 614; outputting information on rearrangement of the rearranged symbols 501 to the winning determination unit 619; adding the increased specific symbols 503 as part of symbols 501 used for symbol determination; replacing part of or the entire symbols 501 used for symbol determination with part of or the entire specific symbols 503; outputting an effect designation signal to the effect-use random number extraction unit 616, based on the rearrangement of the symbols 501.

The effect-use random number extraction unit 616 has functions of: when receiving the effect instruction signal from the symbol determination unit 612, extracting an effect-use random number; and outputting the effect-use random number to the effect determination unit 613. The effect determination unit 613 has functions of: determining an effect by using the effect-use random number; outputting video information on the determined effect in the video display region 614*b* of the display unit 614; outputting audio and illumination information on the determined effect to the speaker unit 617 and the lamp unit 618, respectively.

The winning determination unit 619 has functions of: determining whether a winning is achieved when information on symbols 501 rearranged and displayed on the display unit 614 is given; calculating an amount of payout based on a winning combination formed when it is determined that a winning has been achieved; outputting to the payout unit 620 a payout signal which is based on the amount of payout. The payout unit 620 has a function of paying out a game value to a player in the form of a coin, a medal, a credit, or the like. Further, the payout unit 620 has a function of adding credit data to credit data stored on an IC card 500 inserted into a later-described PTS terminal 700, the credit data to be added corresponding to the credit to be paid out.

Further, the game controller 100 has a storage unit 661 which stores therein various types of bet amount data. The storage unit 661 is a device which re-writably stores data in a hard-disk device, a memory, or the like.

Further, the game controller 100 has a common game running unit 653, an additional bet unit 651, and a game mode selection unit 662. The additional bet unit 651 has a function of allowing a bet increase through the touch panel 69 of the display unit 614, at the start of a common game or when no win or loss is resulted from a common game. The game mode selection unit 662 has a function of enabling a selection of a specific game mode from among the game modes of the common game. For example, the game mode selection unit 662 has a function of switching between the later-described easy mode and advanced mode.

The common game running unit 653 has functions if: outputting bet amount information to the external control device 621 for each unit base game, the bet amount information being based on a bet amount placed as a bet on a regular game; running a common game in response to a game start command from the external control device 621; accepting a bet input through the bet button unit 601, based on a bet amount stored in the storage unit 661 and corresponding to common game bet amount data indicating a bet amount bettable on the common game.

Further, the common game running unit 653 has functions of: determining a game result of a common game based on game result information from the external control device 621, and when the game result indicates a draw, running a common game again based on the next game result information; running a process of displaying on a display device skip information from the center controller 200; and determining whether the slot machine 10 is designated to be the shooter of the crap game run as the common game, based on the shooter command from the external control device 621, and when the slot machine 10 is designated to be the shooter, accepting a roll operation input to enable a roll operation command output to the external control device 621. Here, "game result information" is a result of a common game, and has three modes: win, loss and draw. Further, "skip information" refers to one or more of game results, which indicates a draw and are skipped, out of game results of a series of common games determined sequentially through determination of a game result collectively performed until a game result other than a draw occurs.

Further, the common game running unit 653 has functions of: (i) determining a win or loss which causes a common game to end, based on game result information from the external control device 621, and (ii) when a win is resulted, awarding a winning payout while awarding a special payout when the slot machine 10 has been designated to be the shooter; executing the easy mode where a bet amount on the common game is automatically placed, the bet amount corresponding to the winning payout of the common game; executing the advanced mode where an additional bet is allowed in addition to an automatic bet; and selecting between the easy mode and the advanced mode with the game mode selection unit 662, and executing the selected mode.

Further, the game controller 100 is connected to the PTS terminal 700. The PTS terminal 700 is a unit where an LCD 719, microphones 704 and 705, human body detection cameras 712 and 713 are integrally configured. The PTS terminal 700 has a function of communicating with the game controller 100 to execute a game effect, for example. Particularly, the PTS terminal 700 is provided with a card insertion slot 706, where an IC card 500 can be inserted. Thus allows a player to use a credit stored on an IC card 500 at a slot machine 10, by inserting the IC card 500 into the card insertion slot 706. Note that a mechanical structure of the PTS terminal 700 is detailed later.

Further, when receiving credit data from the PTS terminal 700, the game controller 100 updates a credit display on the display unit 614. Further, when a cash out occurs, the game controller 100 outputs cash-out credit data to the PTS terminal 700.

Further, the PTS terminal 700 of each of the slot machines 10 constituting the gaming machine 300 is connected in communication with a management server 800, which performs central management of image downloading, IC cards 500, and credits.

(Functional Flow of Gaming Machine 300: External Control Device)

The slot machines 10 as described above are connected to the external control device 621 serving as the center controller 200. The external control device 621 has a function of remotely operating and remotely monitoring an operating status of each slot machine 10 and a process such as change in various game set values. The external control device 621 further has a function of determining a common game start condition for each slot machine 10, and running the common game such as a crap game at the slot machines 10 when a determination result is obtained at any one of the slot machines 10, the determination result satisfying the common game start condition. Further, the external control device 621 collectively perform determination of a game result, sequentially in relation to a series of common games, until a game result other than a draw occurs. The external control device 621 then skips at least partially the game results indicating a draw out of the determined game results, and sequentially outputs the remaining game results as game result information to each slot machine 10.

Specifically, as shown in FIG. 3, the external control device 621 has a common game start unit 6213, a gaming terminal selection unit 6215, a win/loss determination unit 6216 (game result determination unit), a send-receive unit 6217, and a skip process unit 6218.

The common game start unit 6213 has functions of: determining whether the common game start condition is met, based on information of accumulated bet amounts transmitted from each slot machine 10 for each unit base game; outputting a game start command to the slot machines 10; and displaying on the common display device 6700 a screen showing a state until the common game start condition is met.

Note that the determination of whether the common game start condition is met is made based on the information of accumulated bet amounts, as well as all the accumulated values which increase according to repetition of the unit base games. Examples of the accumulated value includes a game count of the base game, and a gaming time of the base game.

Further, the common game start unit 6213 has a function of outputting a game start command to a slot machine 10 whose cumulative value satisfies an amount required for meeting the game running condition, the cumulative value increasing in accordance with a repetition of a base game. Accordingly, the common game start unit 6213 does not qualify the one or more slot machines 10 whose accumulated value is less than the minimum set value to participate in the common game. This motivates the player to proactively repeat base games.

Further, the common game start unit 6213 has functions of monitoring the no-input period during which no start operation is executed, and outputting a game start command to all the slot machines 10 except one or more slot machines 10 whose no-input period equals or exceeds the time-out period. Thus, the common game start unit 6213 is capable of determining that no player is present at a slot machine 10 where no base game is run for a period of time equal to or longer than the time-out period, thus preventing such a slot machine 10 from running the common game.

The gaming terminal selection unit 6215 has a function of selecting a specific slot machine 10 from among the slot machines 10, and outputting a shooter command signal to the specific slot machine 10. The win/loss determination unit 6216 has a function of determining a game result of the common game, based on a roll operation command from the specific slot machine 10. The send-receive unit 6217 has a function of enabling data transmission and reception among the slot machines 10.

The skip process unit 6218 has functions of: collectively performing determination of a game result, sequentially in relation to a series of common games, until a game result other than a draw occurs; and skipping at least a part of game results each indicating a draw; and sequentially outputting the remaining game results as game result information to each of the slot machines 10. Thus, the skip process unit 6218 is capable of omitting at least a part of common games at a slot machine 10, each of which omitted common games would result in a draw. Therefore, even when several game results determined each indicate a draw, adjusting the number of crap games to be omitted prevents an excessive number of repetitions of crap games.

Further, the skip process unit 6218 has a function of skipping one or more game results indicating a draw, on condition that the number of game results each indicating a draw consecutively occurs for a predetermined number of times. Here, the skip process unit 6218 is capable of keeping repetitions of common games within a certain range to prevent a player from being required to endure excessive waiting time, the common games resulting in a draw. Thus, it is possible to provide a common game to the player without making him/her lose his/her interest in common games. Further, the skip process unit 6218 has a function of randomly determining the skip count, the game results to be skipped each indicating a draw. Accordingly, the skip process unit 6218 randomly determines the number of game results each indicating a draw. Therefore the number of common games to be repeated until a win or loss is resulted is unfixed. This prevents a player from predicting a timing at which common games end.

Further, the skip process unit 6218 has a function of, when a predetermined count of common games are consecutively repeated, collectively performing determination of a game result, sequentially in relation to a series of common games, until a game result other than a draw occurs. Thus, the skip process unit 6218 is capable of keeping repetitions of common games within a certain range to prevent a player from being required to endure excessive waiting time, the common games resulting in a draw. Thus, it is possible to provide a common game to the player without making him/her lose his/her interest in common games.

Further, the skip process unit 6218 has a function of: (i) randomly determining a re-execution count of the common games indicating the count of common games re-executed at the game controller 100, based on the game result information, and (ii) when a count of consecutive game results which are determined through collective determination of a game results and which indicates a draw is greater than the re-execution count, determining a skip count of the game results indicating a draw so that the count of the game results indicating a draw equals the re-execution count. With the above structure of the skip process unit 6218, the re-execution count, which indicates a count of common games re-executed before the common game resulting in a win or loss, is unspecified. The skip process unit 6218 therefore is able to prevent a player from predicting a timing at which common games end.

Further, the skip process unit 6218 has functions of causing the center controller 200 to skip at least a part of game results each indicating a draw, on condition that a series of determined game results each indicating a draw are to consecutively occur for a predetermined number of times, and to sequentially output the remaining game results as game result information to each slot machine 10. Thus, the skip process unit 6218 is capable of keeping repetitions of common games within a certain range to prevent a player from being required to endure excessive waiting time, the common games resulting in a draw. Thus, it is possible to provide a common game to the player without making him/her lose his/her interest in common games.

Further, the skip process unit 6218 may have a function of skipping all game results indicating a draw out of the series of game results determined and treat the last one of the series of game results as game result information, on condition that common games to result in a draw are repeated for the number of times equal to the repetition count. Thus, the skip process unit 6218 is capable of surely yielding a win or loss from the common game following the number of common games previously run, which number of common game equal to the repetition count, and the common games previously run each resulting in a draw. This easily prevents an excessive gaming time during which common games are run.

Further, the skip process unit 6218 has a function of outputting skipped game results each indicating a draw to each slot machine 10 as skip information. Accordingly, the skip process unit 6218 is capable of causing the display device of each slot machine 10 to display skipped one or more game results each indicating a draw. This allows a player to confirm the number of common games skipped.

(Operations of Gaming Machine 300)

Figure 4:
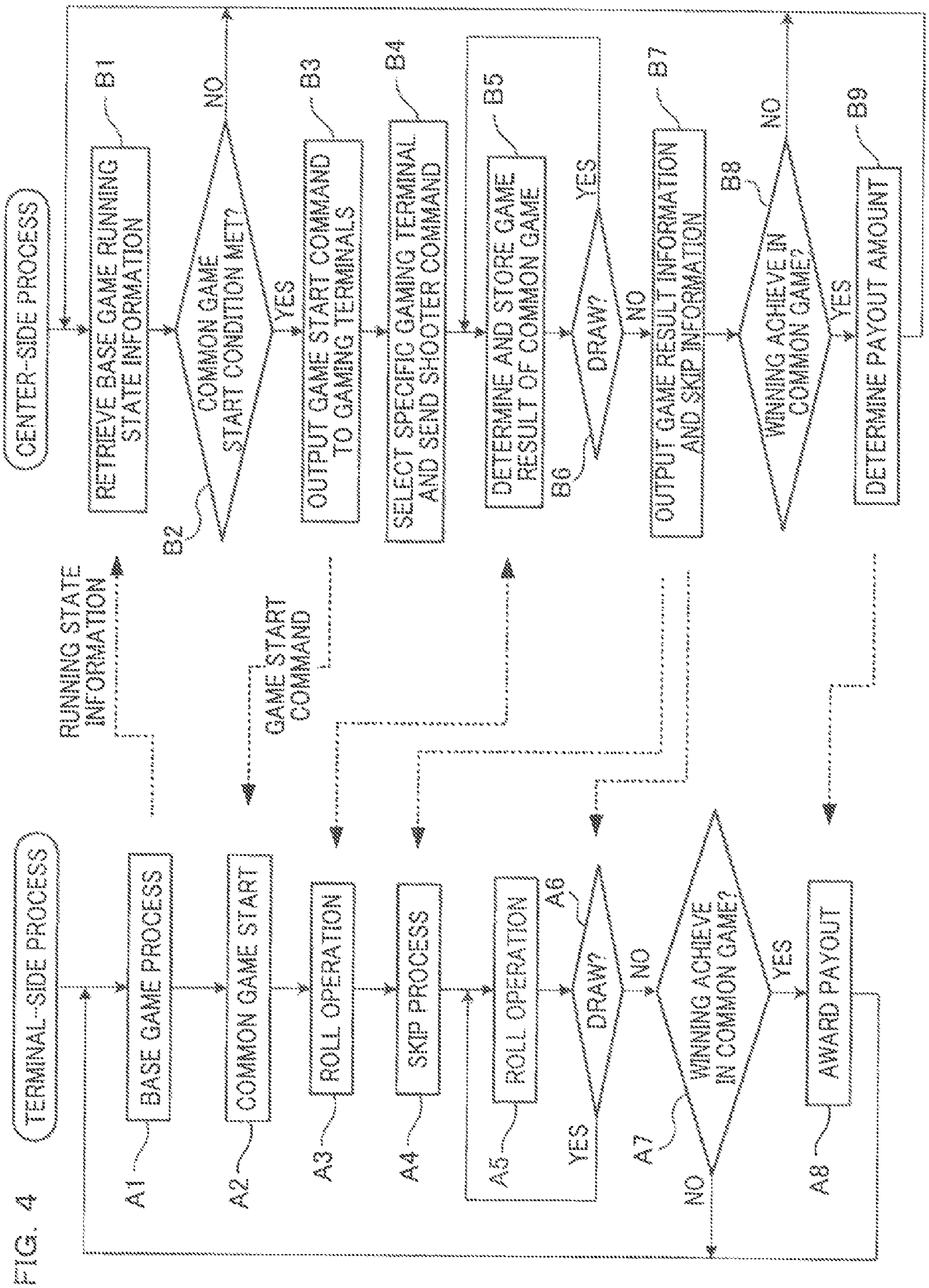
FIG. 4 is a flow chart showing a playing method of the gaming machine.

The following describes operations of the gaming machine 300 structured as described in the above functional block, with reference to the flow chart of FIG. 4. Note that in the present embodiment, the "gaming terminal" in the flow chart refers to a slot machine 10 which runs a slot game. The "gaming terminal"; however, is not limited to this.

(Operations of Slot Machine 10)

The slot machine 10 provided as a gaming terminal executes a terminal-side process having steps (A1) to (A7). Specifically, a base game process (regular game and the like) is run first (A1). A series of operations described below are executed.

(Coin Insertion/Start-Check)

First, the slot machine 10 checks whether the bet button unit 601 and the spin button unit 602 are sequentially pushed by a player in this order.

(Symbol Determination)

Next, when the player presses the spin button unit 602, the slot machine 10 extracts a random number for symbol determination. Then, for each video reel displayed on the display unit 614, the slot machine 10 determines symbols 501 to be presented to the player when scrolling of symbol columns is stopped.

(Symbol Display)

Next, the slot machine 10 starts scrolling a symbol column of each video reel, and stops the scroll so that the symbols 501 determined are presented to the player.

(Winning Determination)

Next, when the symbol column of each video reel stops scrolling, the slot machine 10 determines whether a combination of the symbols 501 presented to the player yields a winning.

(Paying Out)

Next, when a combination of the symbols 501 presented to the player yields a winning, the slot machine awards the player a benefit according to the combination of the symbols 501.

For instance, when a combination of symbols 501 is displayed which awards a payout of one or more coins to the player, the slot machine 10 pays out the number of coins according to the combination of symbols 501.

Next, whether a bonus combination is formed is determined. When a bonus combination is formed, a bonus game process is run. Meanwhile, when no bonus combination is formed, a regular game is run again. During a period of time where a base game including a regular game and a bonus game is run, the running state information is transmitted to the external control device 621, the running state information indicating a start and an end of a regular game and the bet amount placed on a unit game. This allows the external control device 621 to execute centralized control of the running state information of each slot machine 10.

When the slot machine 10 receives a game start signal from the external control device 621, the slot machine 10 starts and runs a common game such as a common crap game (A2). Thus, as shown in FIG. 1, a screen display showing a base game is switched to a screen display showing the bet table 901. Then, a moving image or another type of image suggesting the player to the common game such as the crap game is displayed.

Next, the slot machine 10 determines whether the slot machine 10 is designated to be the shooter of the common game, based on a shooter command from the external control device 621. In other words, when the shooter command is attended to the slot machine 10, the slot machine 10 determines that it is designated to be the shooter and accepts a roll operation input (A3). Thus, the slot machine 10 receives a roll operation input through the input device such as a touch panel to enable output of a roll operation command to the external control device 621. When the player performs a roll operation, the slot machine 10 designated to be the shooter transmits a roll operation command to the external control device 621. Note that when the shooter command is not attended to the slot machine 10, the slot machine 10 determines that it is not designated to be a shooter and keeps displaying a movie of the common game.

Next, the slot machine 10 executes a skip process (A4). In other words, the slot machine 10 receives skip information from the external control device 621, and when skip information is received, performs display based on the skip information on the display device. Thereafter, the slot machine 10 determines a win or loss which causes the common game to end, based on game result information. When the game result indicates a draw (not a win or loss), a common game is run again based on the next game result information.

When a common game is run again, the slot machine 10 accepts a roll operation input through the input device such as a touch panel, and enables output of a roll operation command to the external control device 621, in the same manner as the roll operation process of step A3. When the player executes a roll operation, a roll operation command is transmitted from the slot machine 10 designated as the shooter to the external control device 621.

The slot machine 10 receives game result information thereafter, and determines whether a common game ends in a draw, based on the game result information (A6). When the common game ends in a draw, that is, when no win or loss is resulted (A6, YES), the common game is continued and there is executed a process such as a process of designating determining if the slot machine 10 is designated to be the shooter based on the shooter command, or a process of displaying a movie related to the common game.

Meanwhile, when the common game does not end in a draw, that is, when a win or loss is resulted (A6, NO), it is determined whether a win has been resulted from the common game at the slot machine 10 (A7). When a loss is resulted from the common game at the slot machine 10 (A7, No), a base game of step A1 is run again. Meanwhile, when the slot machine 10 has won the common game (A7, YES), a payout is awarded based on payout information from the external control device 621. A base game of step A1 is run thereafter.

(Operations of External Control Device 621)

While the Slot Machine 10 is Operating as Described above, the external control device 621 executes a center-side process (B1) to (B9) described below, in synchronization with the slot machine 10.

First, the external control device 621 receives running status information from each of the slot machines to retrieve a running state information of the base game run at each slot machine 10 (B1). Thereafter, it is determined whether the common game start condition is met at any one of the slot machines 10, based on the number of base games repeated, a cumulative bet amount, or the like (B2). When the common game start condition has not been met (B2, NO), the process of B1 is repeated, and the base game running status at each slot machine 10 is retrieved.

Meanwhile, when the common game start condition is met (B2, YES), a game start command is simultaneously outputted to one or more slot machines 10 having met the game running condition (B3). Thereafter, a specific slot machine 10 is selected from among one or more slot machines 10 which satisfy the game running condition, and a shooter command is outputted to the specific slot machine 10 (B4).

Next, the external control device 621 waits until it receives a roll operation command outputted from the specific slot machine 10. When the roll operation command is received, the received roll operation command triggers determination of a common game result indicating a win or loss. That is, it is determined whether the common game results in a win or loss, or ends in a draw. The game result determined is temporarily stored, for use as game result information or skip information (B5). Thereafter, it is determined whether the game result is a draw (B6). When the game results in a draw (B6, YES), the step B5 is executed again and the next game result is determined and stored. Thus, determination of a game result is executed collectively, sequentially in relation to a series of games until a game result other than a draw is to occur.

When it is determined in B6 that the game result does not indicate a draw (B6, NO), at least a part of game results indicating a draw are skipped out of a series of game results temporarily stored, and the remaining game results are sequentially outputted to each slot machine 10 as game result information. Further, the skipped game results are sequentially outputted to each slot machine 10 as skip information.

Thereafter, it is determined whether a common game results in a win, based on a game result indicating either a win or loss (B8). When the common game ends in a loss (B8, No), the process is repeated from B1, and a running status of the base game run at each slot machine 10 is newly retrieved. Meanwhile, when the common game ends in a win (B8, Yes), a payout is calculated based on a bet amount placed at each slot machine 10 on the common game, and transmitted to each slot machine 10 as payout information (B9).

As described above, the gaming machine 300 has the slot machines 10 each of which runs the terminal-side process (A1) to (A8), and the external control device 621 which runs the center-side process (B1 to (B9).

Thus, the gaming machine 300 causes the external control device 621 to collectively perform determination of a game result, sequentially in relation to a series of common games. Then, of the game results thus determined, those indicating a draw are skipped at least partially, and the remaining one or more game results are output as the game result information to the slot machines 10. Here, at least a part of common games which are to result in a draw are omitted at each of the slot machines 10. Therefore, even when several game results determined each indicate a draw, adjusting the number of common games to be skipped prevents an excessive number of repetitions of common games. This prevents a player from being required to endure excessive waiting time due to repetitions of common games resulting in a draw. Thus, it is possible to prevent a player from losing his/her interest in common games.

(Entire Structure of Gaming System)

The following describes a gaming system 350 having the gaming machine 300 with the above structure.

Figure 5:
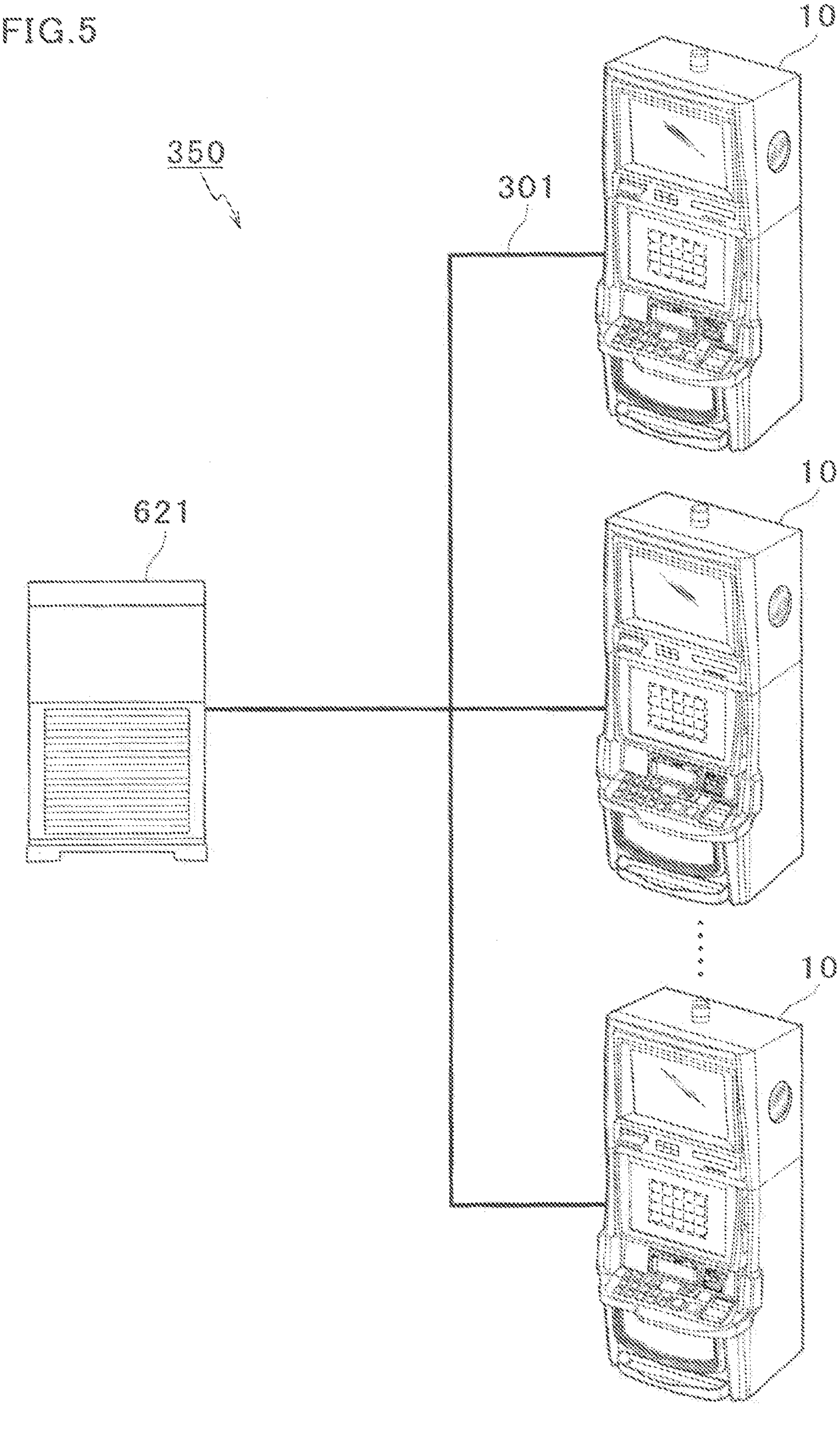
FIG. 5 is a perspective view of an entire gaming machine.

As shown in FIG. 5, the gaming system 350 includes a plurality of slot machines 10, and an external control device 621 which is connected to the slot machines 10 through communication lines 301.

The external control device 621 is for controlling the slot machines 10. In the present embodiment, the external control device 621 is a so-called hall server installed in a game arcade where the plurality of slot machines 10 are provided. Each slot machine 10 is allotted a unique identification number. The external control device 621 distinguishes an origin of data transmitted from each slot machine 10. Further, the external control device 621 determines transmission destination of data with the identification number when transmitting data to a slot machine 10.

Note that the gaming system 350 may be installed in one game arcade where various games take place such as a casino, or between a plurality of game arcades. In a case of the gaming system 350 being installed in one game arcade, gaming systems 350 may be provided for each floor or each section of the game arcade. The communication line 301 may have a wired or wireless structure. A dedicated line or exchange line may be employed as the communication line 301.

Figure 6:
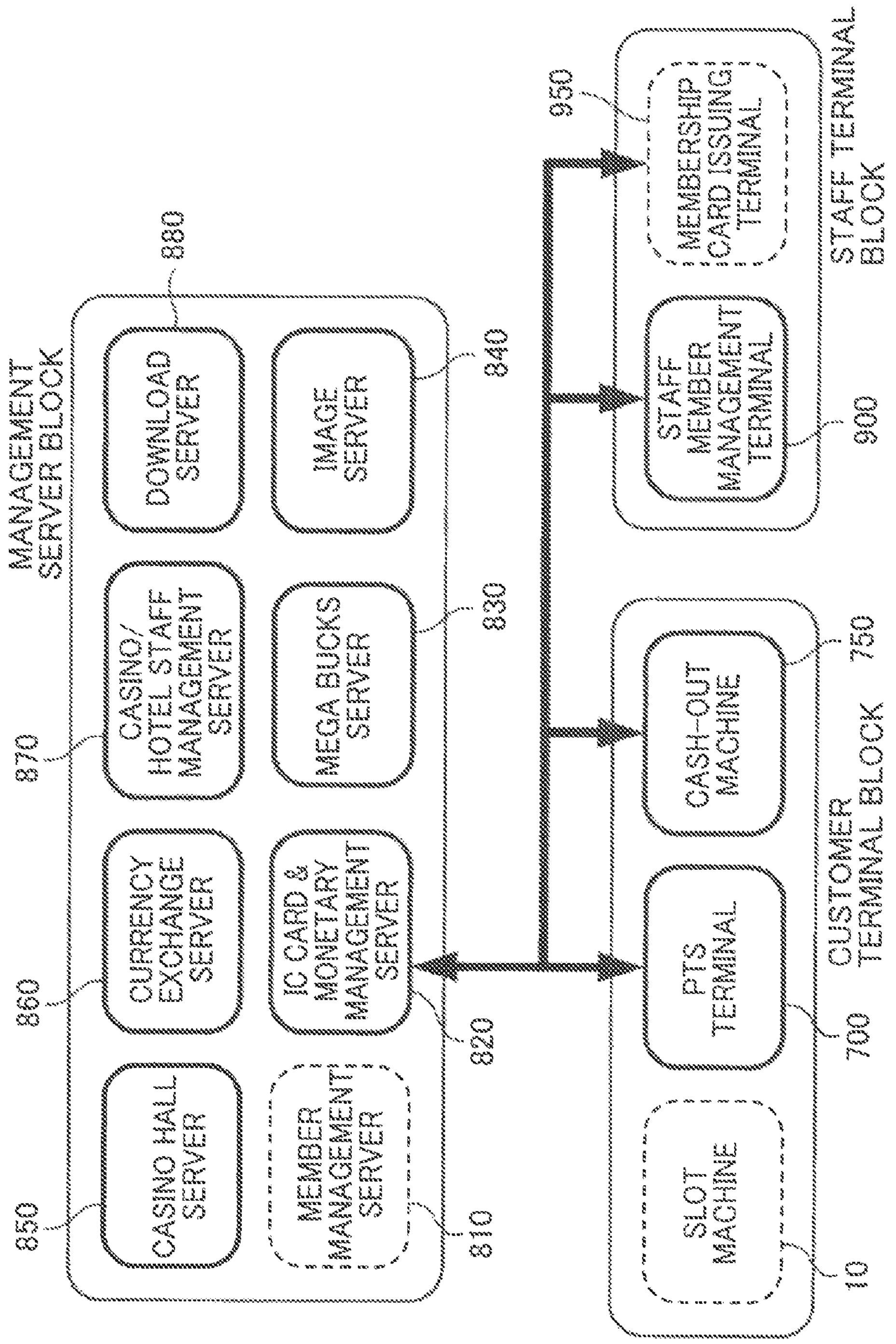
FIG. 6 is a block diagram of a gaming system.

As shown in FIG. 6, the gaming system 350 is divided into three major blocks: a management server block, a customer terminal block, and a staff terminal block. The management server block has a casino hall server 850, a currency exchange server 860, a casino/hotel staff management server 870, and a download server 880.

The casino hall server 850 manages an entire casino hall where slot machines 10 are installed. The currency exchange server 860 creates currency exchange rate data, based on currency exchange information and the like. The casino/hotel staff management server 870 manages the casino hall, or staff members of a hotel associated with the casino hall. The download server 880 downloads the newest information such as information or news related to a game, and informs a player to the newest information through the PTS terminal 700 of each slot machine 10.

Further, the management server block has a member management server 810, an IC card & monetary management server 820, a mega bucks server 830, and an image server 840.

The member management server 810 manages membership information of a player who plays at the slot machine 10. The IC card & monetary management server 820 manages an IC card 500 utilized at the slot machine 10. Specifically, the IC card & monetary management server 820 stores broken number cash data in association with an identification code, outputs the broken number cash data to the PTS terminal 700, and the like. Note that the IC card & monetary management server 820 creates and manages denominate data and the like. The mega bucks server 830 manages a mega bucks which is a game where a total amount of wagers is utilized as a payout, the wagers being placed at slot machines 10 provided at a plurality of casino halls and the like, for example. The image server 840 downloads a newest image such as an image or news related to a game, and informs the player thereof, through the PTS terminal 700 of each slot machine 10.

The customer terminal block includes a slot machine 10, a PTS terminal 700, and a cash-out machine 750. The PTS terminal 700 is attachable to a slot machine 10, and is capable of communicating with the management server 800. The cash-out machine 750 performs a cash-out by converting cash data into cash, stores coins or paper money as cash data onto the IC card 500, and the like, the cash data being stored on the IC card 500 carried by the player.

The staff terminal block has a staff member management terminal 900 and a membership card issuing terminal 950. The staff member management terminal 900 for a staff member at the casino hall to manage various types of slot machines 10. Particularly in the present embodiment, the staff member management terminal 900 allows a staff member at the casino hall to check for a possible excess number of IC cards 500 stocked in the PTS terminal 700, or shortage of IC cards 500 in the PTS terminal 700. The membership card issuing terminal 950 is for a player who plays games at the casino hall to obtain a membership card.

(PTS Terminal 700)

Figure 7:
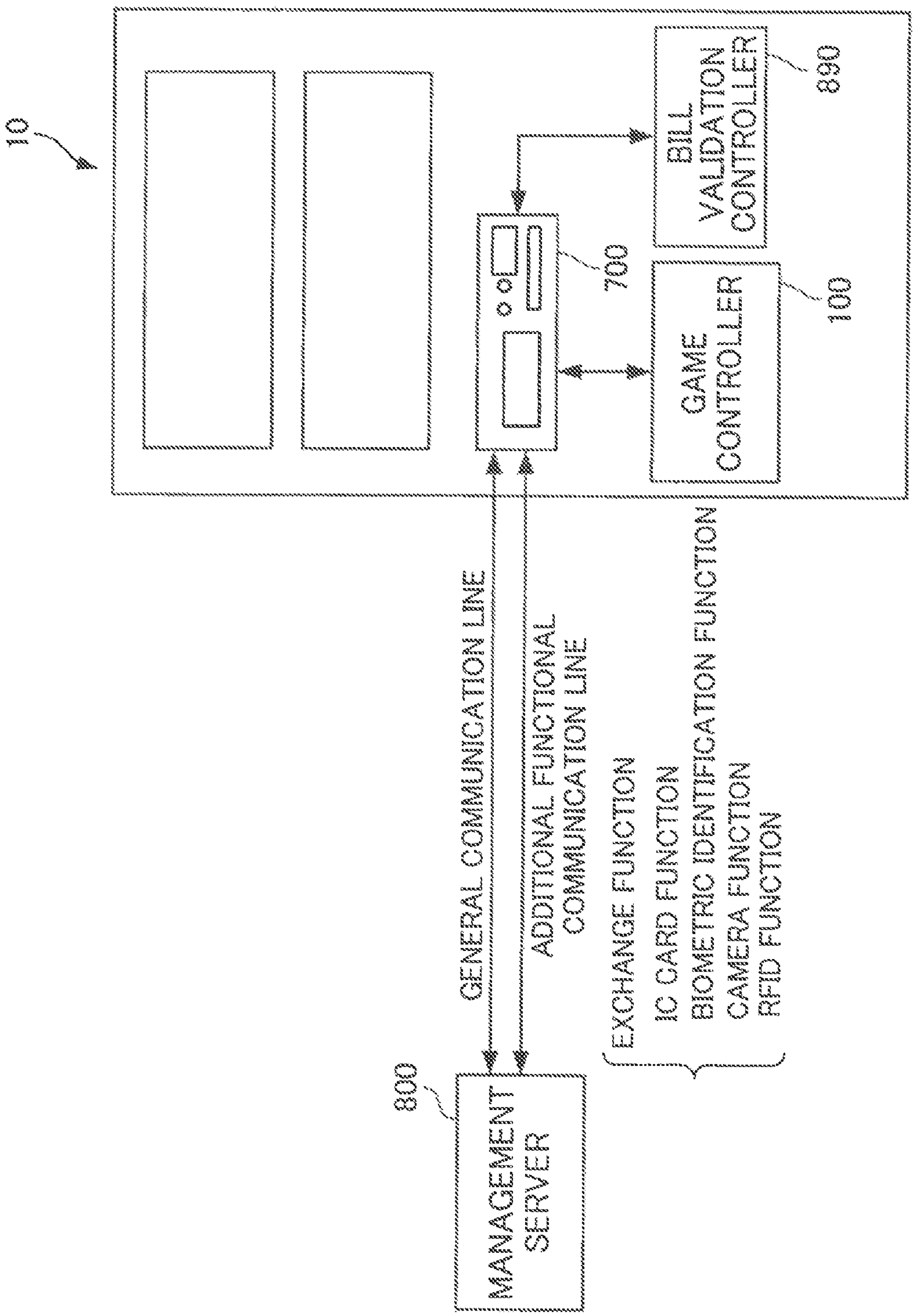
FIG. 7 is a block diagram of a PTS system.

The PTS terminal 700 is incorporated in a PTS system, as shown in FIG. 7. The PTS terminal 700 provided to a slot machine 10 is connected in communication with the game controller 100 and a bill validation controller 890 of the slot machine 10.

Through communication with the game controller 100, the PTS terminal 700 executes an effect of a game with a sound or an image, updates credit data, and the like. Further, through communication with the bill validation controller 890, the PTS terminal 700 transmits credit data necessary for a cash-out.

Further, the PTS terminal 700 is connected in communication with the management server 800. The PTS terminal 700 communicates with the management server 800 through the two lines: a general communication line and an additional functional communication line.

Through the general communication line, the PTS terminal 700 communicates data such as gash data, identification code data, player membership information, and the like. Meanwhile, through the additional functional communication line, the PTS terminal 700 executes communication related to an additional function. In the present embodiment, through the additional functional communication line, the PTS terminal 700 executes communication related to an exchange function, and IC card function, a biometric identification function, a camera function, a RFID (Radio Frequency Identification) function which is for executing a solid-matter identification function with radio wave.

(Functional Structure of Slot Machine)

Figure 8:
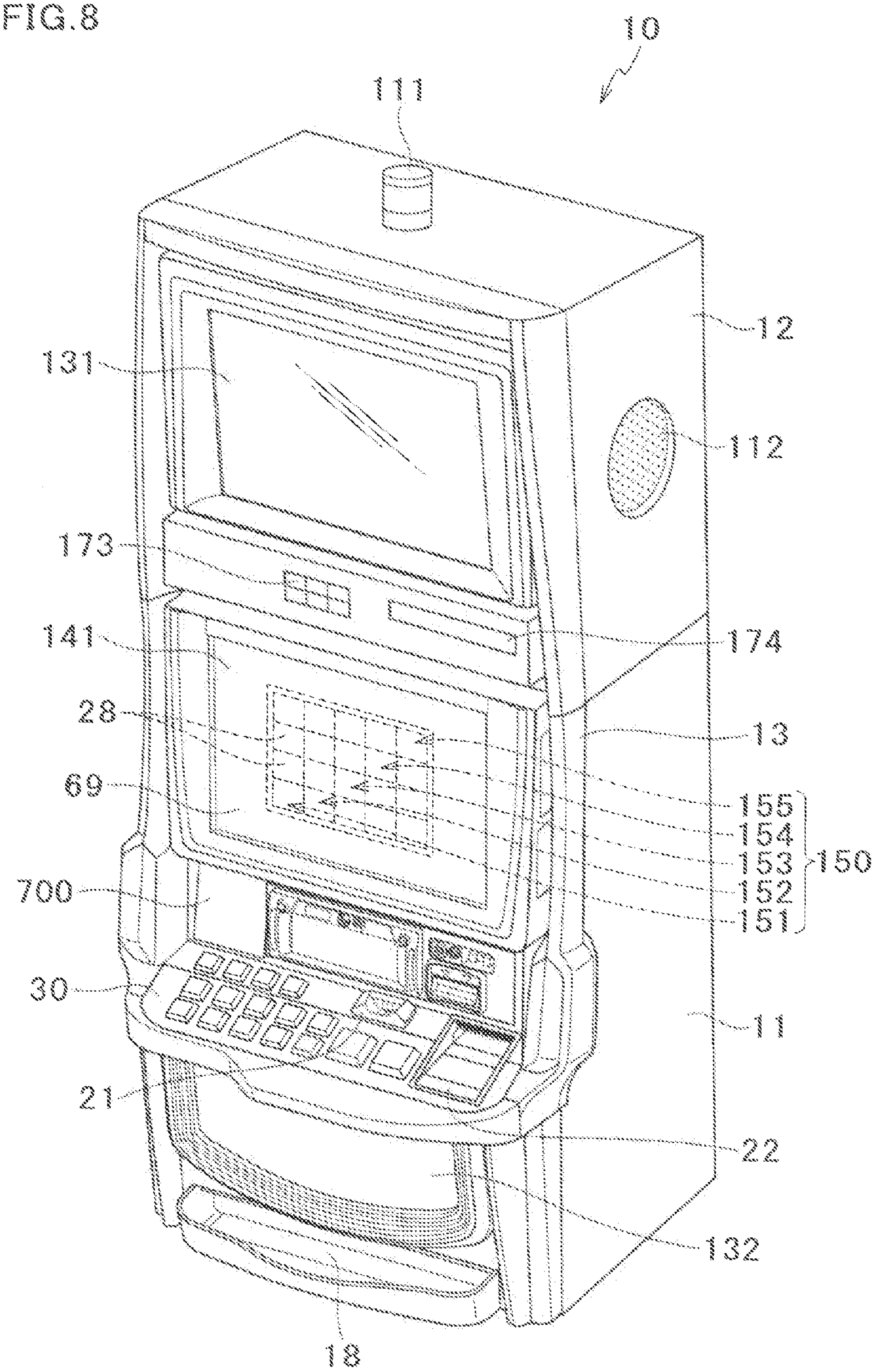
FIG. 8 is a perspective view of a slot machine in the gaming machine.
Figure 9:
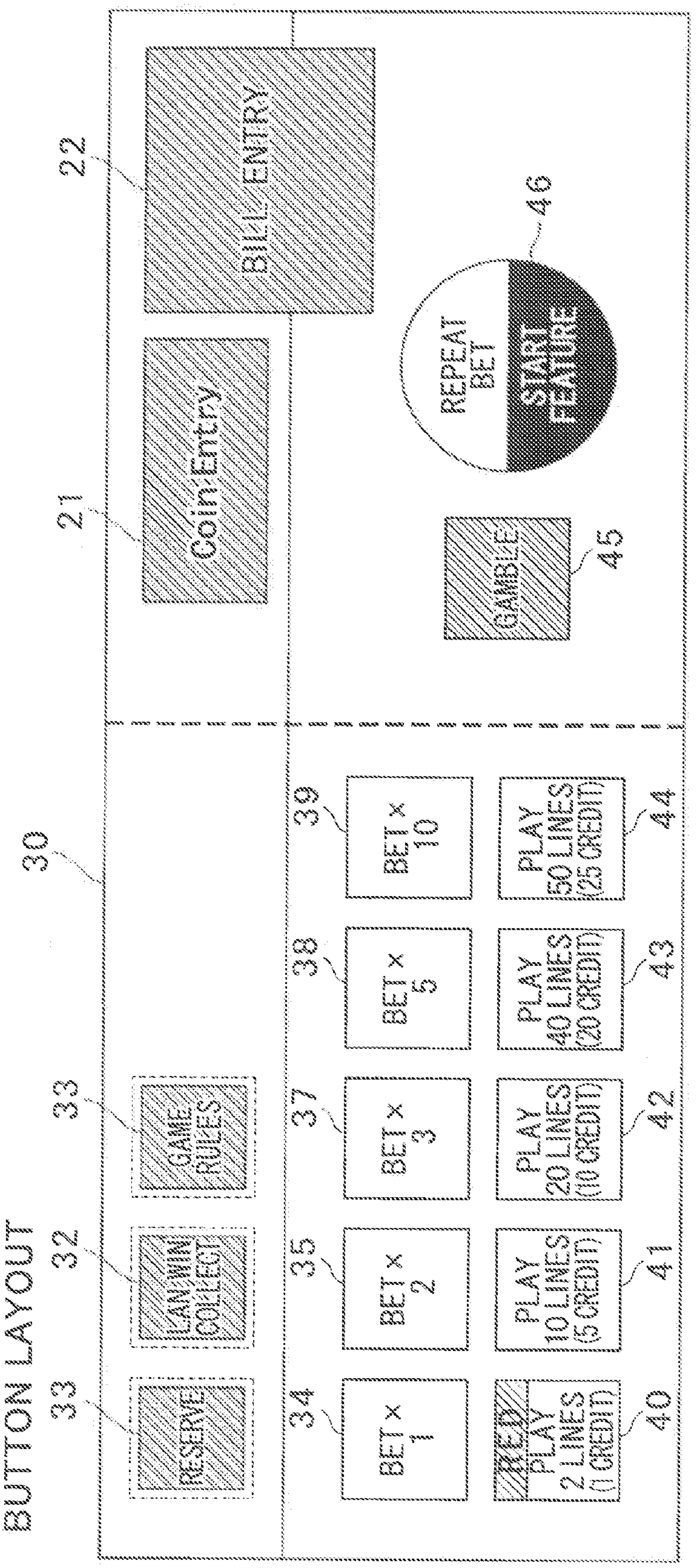
FIG. 9 is an explanatory diagram of a button layout of a control panel.

The following describes an entire structure of a slot machine 10 with reference to FIG. 8.

At a slot machine 10, a coin, paper money, or electronic valuable information corresponding to these are utilized as game medium. Specifically, credit-related data such as cash data stored on the IC card 500 is utilized in the present embodiment.

The slot machine 10 has a cabinet 11, a top box 12 provided above the cabinet 11, and a main door 13 provided on the front face of the cabinet 11.

The main door 13 has the symbol display device 16 which is also referred to as a lower image display panel 141. The symbol display device 16 is made of a transparent liquid crystal panel. A screen displayed on the symbol display device 16 has display windows 150 at its center portion. The display window 150 includes twenty display blocks 28 which are arranged in five columns and four rows. The columns form simulated reels 151 to 155, each having four display blocks 28. The four display blocks 28 in each of the simulated reels 151 to 155 are displayed as if all the display blocks 28 are moving downward at various speeds. This enables rearrangement, in a manner that symbols 501 respectively displayed in the display blocks 28 are rotated in a longitudinal direction and stopped thereafter.

Here, as shown in FIG. 25, payline occurrence columns are provided to the left and the right of the display windows 150 in a symmetrical manner. A payline occurrence column on the left when viewed from the player includes 25 payline occurrence parts 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, 65Ls, 65Lt, 65Lu, 65Lv, 65Lw, 65Lx, and 65Ly).

On the other hand, a payline occurrence column on the right includes 25 payline occurrence parts 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, 65Rs, 65Rt, 65Ru, 65Rv, 65Rw, 65Rx, and 65Ry).

Each payline occurrence part 65L is paired with one of the payline occurrence parts 65R. Paylines L are prescribed, each extending from one of the payline occurrence parts 65L to one of the payline occurrence parts 65R which are paired with each other. Although there are 25 paylines L in the present embodiment, FIG. 25 only shows one payline L for the sake of easier understanding.

Each payline L is activated when the payline L connects a pair of payline occurrence parts 65L and 65R. The payline L otherwise is inactivated. The number of paylines L to be activated is determined based on a bet amount. In such a case where a MAXBET indicating the maximum amount of bet allowed, the maximum number of paylines L, that is, 25 paylines L are activated. Various winning combinations of symbols 501 are formed along activated paylines L. Winning combinations are detailed later.

The present embodiment deals with a case where the slot machine 10 is a so-called video slot machine. However, the slot machine 10 of the present invention may partially adopt a so-called mechanical reel in place of the simulated reels 151 to 155.

Further, as shown in FIG. 8, a touch panel 69 is disposed on a front face of the symbol display device 16, and a player is able to input various instructions by operating the touch panel 69. From the touch panel 69, an input signal is transmitted to the main CPU 71.

Provided below the lower image display panel 141 is a control panel 30. In addition to various buttons, the control panel 30 has a coin entry 21 which accepts coins into the cabinet 11, and a bill entry 22.

Specifically, the control panel 30 has a reserve button 31, a collect button 32, and a game rule button 33 to an upper left region thereof. The control panel 30 further includes a 1-bet button 34, a 2-bet button 35, a 3-bet button 37, a 5-bet button 38, and a 10-bet button 39 to a middle left region thereof. Moreover, the control panel 30 further includes a play 2 line button 40, a play 10 lines button 41, a play 20 lines button 42, and a play 40 lines button 43, and a max lines button 44 provided to a lower left region thereof.

Further, the control panel 30 has the coin entry 21 and the bill entry 22 in an upper right region thereof, and a gamble button 45 and a start button 46 in a lower right region thereof.

The reserve button 31 is an operation button used when a player leaves the seat, or when requesting a staff member at the game arcade exchange of money. The collect button 32 is a so-called cashout button which adds credit data related to a credit obtained in various games to credit data stored on the IC card 500 inserted into the PTS terminal 700. The game rule button 33 is pushed when an operation method of a game or the like is unclear. Pushing the game rule button 33 causes a later-described upper image display panel 131 or the lower image display panel 141 to display various types of help information.

Each time a 1-bet button 34 is pushed, a credit is bet on each active payline L, the credit being currently owned by the player. The 2-bet button 35 is for starting a game with two bets placed on each active payline L. The 3-bet button 37 is for starting a game with three bets placed on each active payline L. The 5-bet button 38 is for starting a game with five bets placed on each active payline L. The 10-bet button 39 is for starting a game with ten bets placed on each active payline L. Thus, pushing which one of 1-bet button 34, the 2-bet button 35, the 3-bet button 37, the 5-bet button 38, and the 10-bet button 39 determines the amount of bet to be placed on each active payline L.

Pushing the play 2 line button 40 activates a payline L. This activates two paylines L. Pushing the play 10 lines button 41 activates paylines L. Pushing the play 10 lines button 41 thus activates ten paylines. Pushing the play 20 lines button 42 activates paylines L. Pushing the 20 lines button 42 thus activates twenty paylines L. Pushing the play 40 lines button 43 activates paylines L. Pushing the play 40 lines button 43 thus activates forty paylines L. Pushing the max lines button 44 activates paylines L. Pushing the max lines button 44 thus activates the maximum number of paylines L: fifty paylines L.

The gamble button 45 is for causing transition from the bonus game to a gamble game or the like after the bonus game has ended. Here, the gamble game is run with an obtained credit.

The start button 46 is for starting scrolling of the symbols 501. The start button 46 also serves as a button for starting a bonus game, adding a credit obtained in the bonus game, and the like. The coin entry 21 is for accepting a coin into the cabinet 11. The bill entry 22 is for validating legitimacy of paper money, and accepting legitimate paper money into the cabinet 11.

As shown in FIG. 8, on a lower part of a front face of the main door 13, that is, below the control panel 30 is a coin accepting slot 18 for inserting coins, and a belly glass 132 with a character related to the slot machine 10 shown thereon.

Provided on a front face of the top box 12 is the upper image display panel 131. The upper image display panel 131 is made of a liquid crystal panel, and it constitutes a display unit. The upper image display panel 131 displays an image related to an effect, or an image showing introduction or rules of the game. Further, the top box 12 is provided with a speaker 112 and a lamp 111. At the slot machine 10, an effect is executed with an image display and sound and light output.

Below the upper image display panel 131 is a data displayer 174 and the keypad 173. The data displayer 174 is made of a fluorescent display, an LED, and the like. The data displayer 174 displays membership data read our from the IC card 500 inserted into the PTS terminal 700, and data inputted by the player through the keypad 173, for example. The keypad 173 is for inputting data.

(Mechanical Structure of the PTS Terminal)

Figure 10:
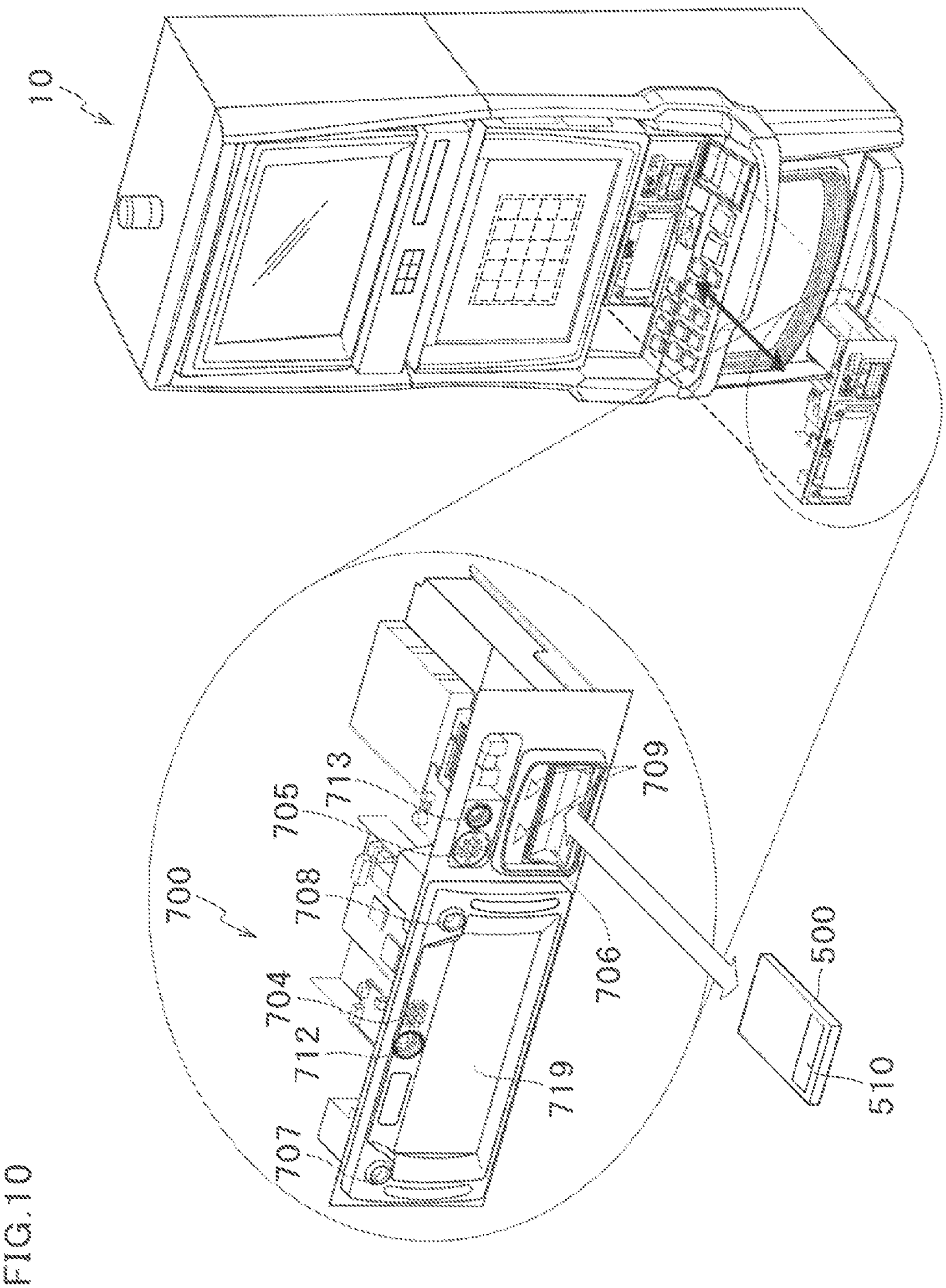
FIG. 10 is a magnified perspective view of a PTS terminal.

Further, between the lower image display panel 141 and the control panel 30 is the PTS terminal 700. The PTS terminal 700 has an LCD 719, as shown in FIG. 10. The LCD 719 is provided to a center portion of the PTS terminal 700. The LCD 719 displays an effect image which brings an effect into the game, for example.

Provided to an upper portion of the PTS terminal 700 is human body detection cameras 712 and 713, microphones 704 and 705, and bass reflex speakers 707 and 708.

The human body detection cameras 712 and 713 detects presence of a player with the camera function thereof, and outputs a signal to a later-described unit controller 730. The microphones 704 and 705 is utilized for allowing a player to vocally participate in a game, authenticating a player through vocal authentication, and the like. The speakers 707 and 708 execute an effect through a sound, and output a notification sound when an IC card 500 is left. The speakers 707 and 708 also output a notification sound when authentication of an IC card 500 inserted fails. Note that the speakers 707 and 708 is disposed to allow a sound to reach beyond the LCD (to the player) 719 from the back of the LCD 719 through a duct. This saves space where the speakers 707 and 708 are provided.

Further, the PTS terminal 700 is provided with an LED 718 and a card insertion slot 706. The LED 718 lights up in multiple colors to report the number of IC cards 500 stored in the later-described card stacker 714. Specifically, the LED 718 lights in yellow when five or fewer IC cards 500 are left, blue when 6 to 24 IC cards 500 are left, and green when 25 or more IC cards 500 are left. Note that when no IC cards 500 is left, or 30 IC cards 500 are left, the LED 718 lights in gray and the ongoing game is halted. Thus, the LED 718 lighting in yellow enables a staff member at the casino hall to immediately determine that there are a few IC cards 500 left so that he/she can replenish IC cards 500. Meanwhile, the LED 718 lighting in green enables a staff member at the casino hall to immediately determine that the card stacker 714 is full of IC cards 500 left, so that he/she can remove some IC cards 500 therefrom. A staff member inserts his/her exclusive IC card 500 into the card insertion slot 706 when replenishing IC cards 500. On the other hand, a staff member inserts what is called a replenish card through the card insertion slot 706 to remove 10 IC cards 500 and the replenish card. Accordingly, staff members are not required to confirm the number of IC cards 500 left in the slot machine 10 on the management server, or actually open the main door 13 of the slot machine 10 to confirm the number of IC cards 500 left. This improves the security of the casino hall.

The card insertion slot 706 has a mechanism which allows insertion and ejection of IC cards 500. An IC card 500 is inserted with a display unit 510 on its upper side and in such a manner that the IC card 500 faces the direction opposite to the card insertion slot 706. Further, the IC card 500 is completely inside the slot machine 10 while the player is playing a game. The IC card 500 is ejected in such a manner that the display unit 510 is exposed during a cash-out. This allows the player to confirm credit-related data such as updated cash data. Note that the IC card 500 is not required to completely stay inside the slot machine 10 while the player is playing a game. Instead, the IC card 500 may be kept in such a manner that the display unit 510 is exposed during the game. This allows the player to constantly confirm the credit being updated during the game. When the human body detection cameras 712 and 713 detects absence of the player during a credit cash out, the IC card 500 is drawn into the slot machine 10 and kept in the card stacker 714. This prevents such an occurrence where the IC card stays inserted into the card insertion slot 706 for a long period of time, even when a player having confirmed few credits left on the IC card 500 displayed on the display unit 510 leaves the seat with the IC card 500 purposely left inserted therein. Note that in the present embodiment, that card stacker 714 is capable of holding 30 and fewer IC cards 500.

As described above, the PTS terminal 700 of the present embodiment is configured as a unit where various devices having the microphone function, the camera function, the speaker function, the display function, and the like are put together integrally. This realizes a small space necessary for the PTS terminal 700. Accordingly, this prevents such an inconvenience which is possible with each mechanism configured as a single device, where an LCD facing the player hinders the speakers to be provided facing the player.

(Electrical Structure of Slot Machine 10)

Figure 11:
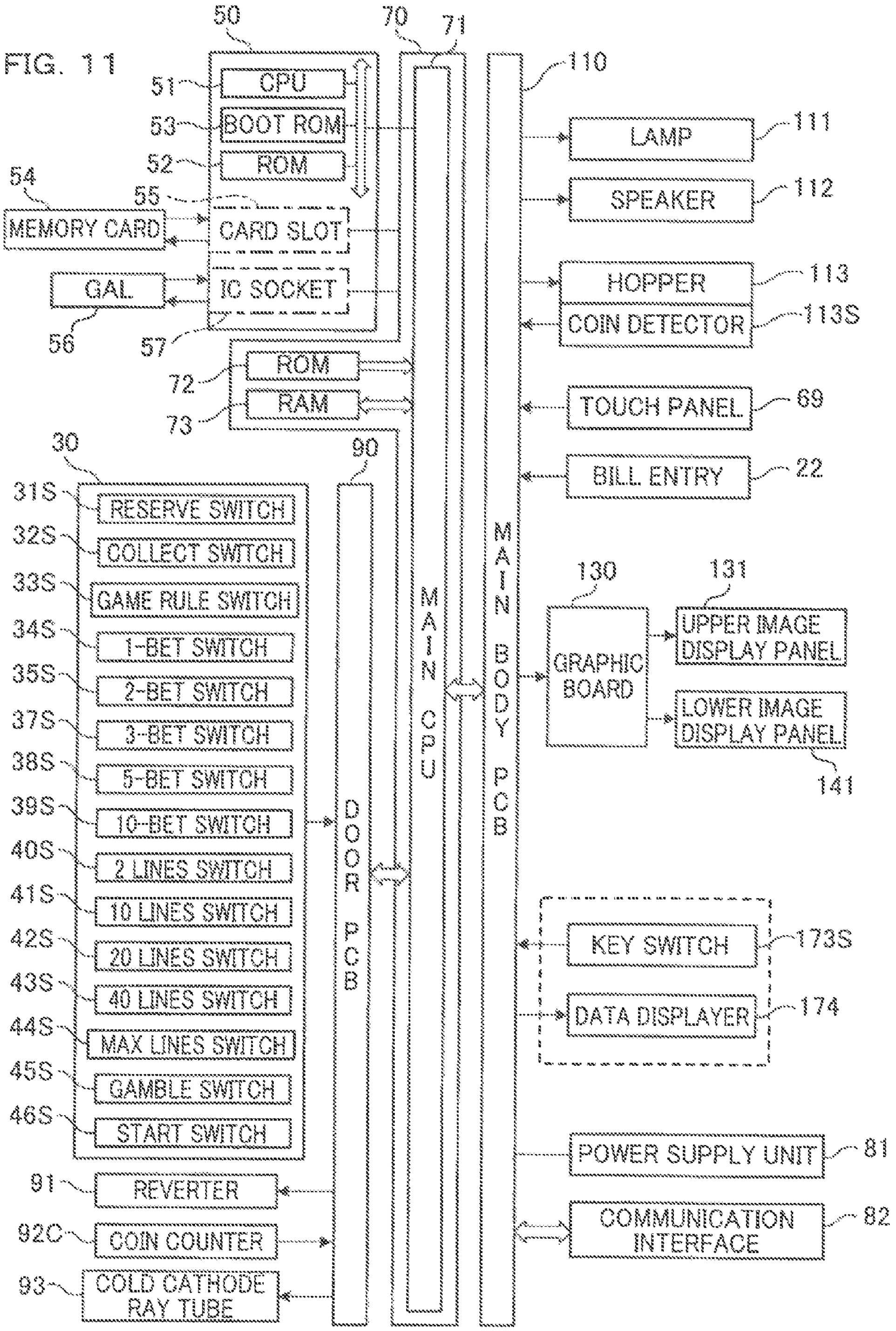
FIG. 11 is an electrical block diagram of the slot machine.

The following describes a circuitry structure of the slot machine 10, with reference to FIG. 11.

The gaming board 50 has a CPU 51, a ROM 52, a boot ROM 53 which are connected via an internal bus, a card slot 55 corresponding to the memory card 54, and an IC socket 57 corresponding to a GAL (Generic Array Logic) 56.

The memory card 54 is of a non-volatile memory, and stores therein a game program and a game system program. The game program includes a program related to progress of a game, and a program for executing an effect with an image and a sound. Further, the game program includes a symbol determination program. The symbol determination program is for determining symbols to be rearranged in the display blocks 28.

Further, the game program includes: a regular game symbol table data showing a regular game symbol table showing each symbol of each symbol column of the display blocks in association with a code No. and a random number (see FIG. 14); a bonus game symbol table data showing a bonus game symbol table showing each symbol of each symbol column of the display blocks in association with a code number and a random number (see FIG. 15); symbol number determination table data showing a symbol column determination table (see FIG. 16); a code No. determination table data showing a code No. determination table (see FIG. 17); wild symbol increase number determination table data showing a wild symbol increase number determination table (see FIG. 18); trigger symbol increase number determination table data showing a trigger symbol increase number determination table (see FIG. 19); odds data showing the number and types of symbols to be rearranged on a payline L in association with a payout amount (see FIG. 20); and the like.

Further, the card slot 55 is structured to allow insertion and ejection of a memory card 54. The card slot 55 is connected to the motherboard 70 through an IDE bus. Thus, it is possible to remove a memory card 54 from the card slot 53S, write another game program onto the memory card 54, and insert the memory card 54 back into the card slot 53S to change the type or content of a game to be run at the slot machine 10.

The GAL 56 is a type of a PLD (Programmable Logic Device) having an OR fixed array structure. The GAL 56 has input ports and output ports. When an input port receives a predetermined input, corresponding data is outputted through an output port.

Further, the IC socket 57 is structured to allow insertion/removal of the GAL 56. The IC socket 57 is connected to the motherboard 70 through a PCI bus. The content of a game to be run at the slot machine 10 can be changed by replacing a memory card 54 with another one with another program written thereon, or replacing the program written onto the memory card 54 with another program.

The CPU 51, the ROM 52, and the boot ROM 53 connected to each other through internal buses are connected to the motherboard 70 through a PCI bus. The PCI bus transmits signals between the motherboard 70 and the gaming board 50, and supplies power from the motherboard 70 to the gaming board 50.

The ROM 52 stores an authentication program. The boot ROM 53 stores a pre-authentication program, a program (boot code) for the CPU 51 to boot the auxiliary authentication program, and the like.

The authentication program is for authenticating a game program and a game system program (tamper check program). The pre-authentication program is for authenticating the authentication program. The authentication program and the pre-authentication program is described along procedures for authenticating (authentication procedure) that program to be authenticated is not falsified.

The motherboard 70 is constituted with a motherboard for market use (printed circuit board with fundamental parts of a personal computer built thereon), and includes a main CPU 71, a ROM (Read Only Memory) 72, a RAM (Random Access Memory) 73, and a communication interface 82. Note that the motherboard 70 corresponds to the game controller 100 of the present embodiment.

The ROM 72 is made of a memory device such as a flash memory. The ROM 72 stores therein a program such as a BIOS (Basic Input Output System) run by the main CPU 71, and permanent data. When the main CPU 71 runs the BIOS, predetermined peripheral devices are initialized. Further, the game program and the game system program stored in the memory card 54 are installed via the gaming board 50. Note that, in the present invention, the ROM 72 may be rewritable or non-rewritable.

The RAM 73 stores data utilized when the main CPU 71 operates, program such as a symbol determination program, and the like. For example, the game program, game system program, and the authentication program are stored in the RAM 73 after the programs are installed. Further, the RAM 73 is provided with an operation region for executing the above programs. Examples of the operation region is a region for storing a counter which manages a game count, a bet amount, a payout amount, and a credit amount, and a region for storing a symbol determined by a lottery (code number).

The communication interface 82 is for communicating with the external control device 621 such as a server, through the communication line 301. Further, the motherboard 70 is connected to a later-described door PCB (Printed Circuit Board) 90 and the main body PCB 110 via USBs. The motherboard 70 is connected to a power supply unit 81. Further, the motherboard 70 is connected to the PTS terminal 700 via a USB.

When power is supplied from the power supply unit 81 to the motherboard 70, the main CPU 71 of the motherboard 70 is booted, and power is supplied to the gaming board 50 via the PCI bus and the CPU 51 is booted.

The door PCB 90 and the main body PCB 110 is connected to an input device such as a switch and a sensor, and peripheral devices whose operations are controlled by the main CPU 71.

The door PCB 90 is connected to the control panel 30, a reverter 91, a coin counter 92C and a cold cathode tube 93.

The control panel 30 is provided with a reserve switch 31S, a collect switch 32S, a game rule switch 33S, a 1-bet switch 34S, a 2-bet switch 35S, a 3-bet switch 37S, a 5-bet switch 38S, a 10-bet switch 39S, a play 2 lines switch 40S, a play 10 lines switch 41S, a play 20 lines switch 42S, a play 40 lines switch 43S, a max lines switch 44S, a gamble switch 45S, and a start switch 46S, respectively corresponding to the buttons described above. Each switch detects that it is pushed by a player, and outputs a signal to the main CPU 71.

Inside the coin entry 36 is provided with the reverter 91 and the coin counter 92C. The reverter 91 detects validity of a coin inserted into the coin entry 21, and discharges those other than valid coins through a coin payout exit. Further, a coin counter 92C detects valid coins accepted, and counts the numbers thereof.

The reverter 91 operates based on a control signal outputted from the main CPU 71, and distributes valid coins determined by the coin counter 92C into a hopper 113 or a not-shown cash box. When the hopper 113 is not full of coins, a valid coin is distributed there. On the other hand, when the hopper 113 is filled with coins, a valid coin is distributed into the cash box.

The cold cathode tube 93 functions as a backlight provided at a back of the upper image display panel 131 and the lower image display panel 141. The cold cathode tube 93 lights based on a control signal from the main CPU 71.

The main body PCB 110 is connected to the lamp 111, the speaker 112, the hopper 113, the coin detection unit 1135, the touch panel 69, the bill entry 22, the graphic board 130, the key switch 1735, and the data displayer 174.

The lamp 111 lights based on a control signal outputted from the main CPU 71. The speaker 112 outputs a sound such as background music, based on a control signal outputted from the main CPU 71.

The hopper 113 operates based on a control signal outputted from the main CPU 71, and pays out the number of coins determined to be paid out to a not-shown coin tray through the coin payout exit. The coin detection unit 113S detects a coin to be paid out from the hopper 113, and outputs a signal to the main CPU 71.

The touch panel 69 detects a position touched on the lower image display panel 141 by a player with a finger, and outputs a signal corresponding to the position detected to the main CPU 71.

The bill entry 22 is for detecting validity of a piece of paper money and accepts a valid piece of paper money into the cabinet 11. The paper money accepted into the cabinet 11 is converted into coins, and credits corresponding to the number of coins calculated are added as credits that the player has.

The graphic board 130 controls display of an image to be displayed on the upper image display panel 131 and the lower image display panel 141, based on a control signal outputted from the main CPU 71. The graphic board 130 has a VDP (Video Display Processor) which generates image data, a video RAM which stores the image data generated by the VDP, and the like. Note that the image data utilized when image data is generated by the VDP is included in a game program read out from the memory card 54 and stored in the RAM 73.

Further, the graphic board 130 is provided with a VDP (Video Display Processor) for generating image data on the basis of a control signal from the main CPU 71, a video RAM for temporarily storing the image data generated by the VDP, and the like. Note that image data used at the time of generating the image data by the VDP is in a game program which is read out from the memory card 54 and stored in the RAM 73.

The key switch 173S is provided to the keypad 173. The key switch 173 outputs a predetermined signal to the main CPU 71 when the player operates the keypad 173.

Based on a control signal output from the main CPU 71, the data displayer 174 displays data read by the card reader 172, or data inputted through the keypad 173 by the player.

(Electrical Structure of PTS Terminal)

Figure 12:
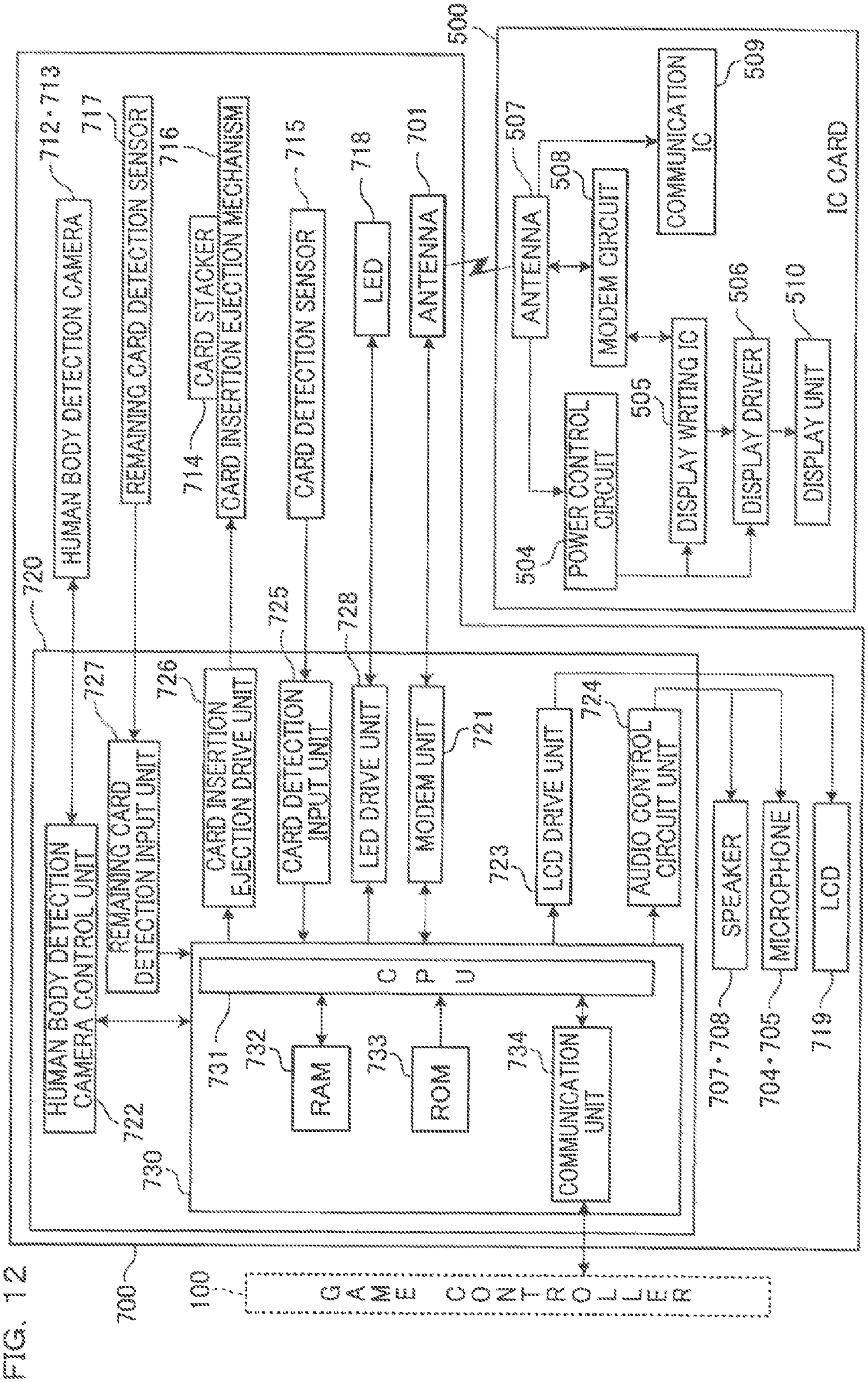
FIG. 12 is an electrical block diagram of the PTS terminal.

The following describes a structure of a circuitry provided to the PTS terminal 700, with reference to FIG. 12.

A PTS controller 720 which controls the PTS terminal 700 is connected to various functional parts as a unit controller 730 its main part. The PTS controller 720 has a CPU 731, a communication unit 734, a ROM 733, and a RAM 732.

The CPU 731 runs various programs stored in the later-described ROM 733, executes calculation, and the like. Specifically, the CPU 731 runs a credit update program and converts credit data retrieved from the game controller 100 into cash data, adds the cash data to broken number cash data in the management server 800, and transmits the data to the IC card 500.

Further, the CPU 731 runs a human body detection operation program. When the credit amount based on the credit data retrieved by the game controller 100 does not equal "0," the CPU 731 determines whether to accept the IC card 500 into the card stacker 714, with the human body detection cameras 712 and 713.

Further, the CPU 731 runs the authentication program to cross verify an identification code on the IC card 500 and the identification code in the management server 800.

Further, the CPU 731 runs an audio control program to control a later-described audio control circuit unit 724 based on a result of the authentication. The audio control here refers to such a control where in the case of authentication failure, the CPU 731 controls the audio control circuit unit 724 and reports authentication failure through the speakers 707 and 708. The communication unit 734 enables communication with the game controller 100.

Further, the CPU 731 runs a device program to control operations of the LCD 719, the microphones 704 and 705, and the speakers 707 and 708. The CPU 731 runs the LED control program to cause the LED 718 to light in accordance with the remaining number of IC cards 500.

The ROM 733 is made of a memory device such as a flash memory. The ROM 733 stores therein permanent data to be executed by the CPU 731. For example, the ROM 733 stores therein a credit update program which re-writes credit data stored on the IC card 500 on the basis of an instruction from the game controller 100, a human body detection operation program, an authentication program, an audio control program, a device program, and an LED control program.

The RAM 732 temporarily stores therein data necessary for running the various programs stored in the ROM 733. For example, the RAM 732 stores credit data to be updated, based on a signal from the game controller 100. Further, the RAM 732 stores the time that a player is detected with the human body detection cameras 712 and 713, and the period of time which is counted from the point that the player is detected.

Further, the unit controller 730 is connected to a human body detection camera control unit 722, an LCD drive unit 723, an audio control circuit unit 724, a remaining card detection input unit 727, a card insertion ejection drive unit 726, a card detection input unit 725, an LED drive unit 728, and a modem unit 721.

The human body detection camera control unit 722 controls the operations of the human body detection cameras 712 and 713, on the basis of an instruction from the unit controller 730.

The LCD drive unit 723 controls operations of the LCD 719, on the basis of an instruction from the unit controller 730.

The audio control circuit unit 724 controls operations of the microphones 704 and 705, and the speakers 707 and 708, no the basis of an instruction from the unit controller 730.

The remaining card detection input unit 727 inputs to the unit controller 730 a signal for determining the remaining number of IC cards 500 stacked in the card stacker 714 determined by the remaining card detection sensor 717. Here, the remaining card detection sensor 717 has a function of detecting the remaining number of IC cards 500 stacked in the card stacker 714, with a not-shown infrared detection mechanism or the like, for example.

The card insertion ejection drive unit 726 controls operations of the card insertion ejection mechanism 716, on the basis of an instruction from the unit controller 730. Here, the card insertion ejection mechanism 716 has a mechanism for receiving an IC card 500 inside, and a mechanism for ejecting the IC card 500 to outside.

The card detection input unit 725 is for inputting a signal from the card detection sensor 715 to the unit controller 730. Here, the card detection sensor 715 obtains various types of data such as cash data and an identification code, from the inserted IC card 500.

The LED drive unit 728 controls operations of the LED 718 on the basis of an instruction from the unit controller 730, to light the LED 718.

The modem unit 721 converts a high frequency signal from an antenna 701 to a signal controllable by the unit controller 730, and converts a signal from the unit controller 730 to a signal transmittable to the IC card 500 through the antenna 701.

Note that the unit controller 730, the card insertion ejection drive unit 726, the card detection input unit 725, and the modem unit 721 are also referred to as a card unit controller as a unit.

(Electrical Structure of Ic Card)

Figure 13:
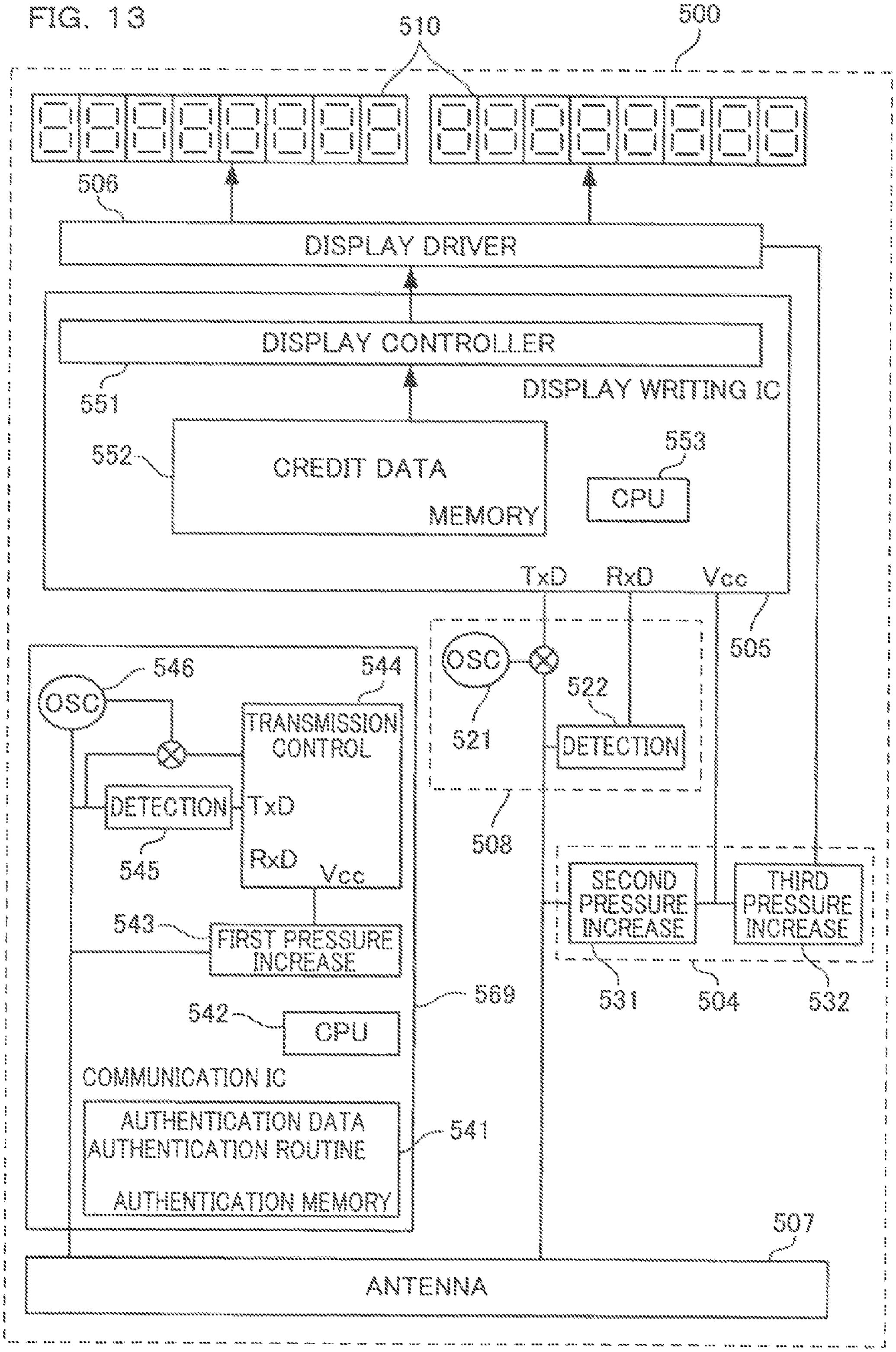
FIG. 13 is an electrical block diagram of an IC card.

The following describes a circuit of the IC card 500, with reference to FIGS. 12 and 13.

As shown in FIG. 12, the IC card 500 has an antenna 507, a power control circuit 504, a modem circuit 508, a display writing IC 505, a display driver 506, and a display unit 510.

The antenna 507 transmits and receives various signals which belong to the PTS terminal 700, via the antenna 701.

The power control circuit 504 has a second voltage increase circuit 531 and a third voltage increase circuit 532. The second voltage increase circuit 531 raises the voltage of a signal from the antenna 507 to a voltage that the later-described modem circuit 508 can handle. The third voltage increase circuit 532 raises the voltage to a voltage with which the later-described display driver 506 can be driven.

The modem circuit 508 has a transmitter 521 and a detection circuit 522. The transmitter 521 outputs a signal having a specific frequency, and converts the signal to a signal which the later-described display writing IC 505 can handle, by mixing the signal with a signal received from the antenna 507. The detection circuit 522 detects a signal received from the antenna 507.

The display writing IC 505 has a CPU 553, a credit data memory 552, and a display controller 551.

The CPU 553 rewrites and updates cash data stored in the credit data memory 552, based on cash data retrieved from the PTS terminal 700.

Further, the CPU 553 controls the display controller 551 so as to cause the display controller 551 uses the cash data stored in the credit data memory 552 as data for displaying cash data, and to display the cash data on the display unit 510 through the later-described display driver 506.

The credit data memory 552 stores therein the cash data rewrite and update program, and credit-related data such as cash data, an identification code and cash data for display. Note that the credit-related data stored in the credit data memory 552 is also utilized for calculation and display.

The display controller 551, based on a control signal from the CPU 553, retrieves credit data for display stored in the credit data memory 552, and displays it on the display unit 510 via the display driver 506.

The IC card 500 has a communication IC 509. The communication IC 509 has a first pressure increase circuit 543, a transmitter 546, a detection circuit 545, a transmission control unit 544, a CPU 542, and an authentication memory 541. The first pressure increase circuit 543 increases the voltage of terminal-side authentication data retrieved from the PTS terminal 700 to a voltage that the CPU 542 can handle.

The transmitter 546 outputs a signal having a specific frequency, and converts it to a signal that the CPU 542 can handle, by mixing the signal with a signal received from the antenna 507. The detection circuit 522 detects a signal received from the antenna 507.

The CPU 542 runs an authentication routine program and transmits an identification code stored in a later-described authentication memory 541 to the PTS terminal 700, when an authentication request is issued by the PTS terminal 700. The authentication memory 541 stores therein an authentication routine program used by the CPU 542 and an identification code.

(Symbols, Combinations, and the Like)

The symbols 501 displayed on the simulated reels 151 to 155 of the slot machine 10 forms symbol columns. Each symbol 501 forming a symbol column is given any one of the code Nos. 0 to 19 or more, as shown in FIG. 14.

Each symbol column has a combination of symbols 501 which are: "WILD," "FEATURE," "A," "Q," "J," "K," "BAT," "HAMMER," "SWORD," "RHINOCEROS," "BUFFALO," and "DEER."

As shown in FIG. 8, any four consecutive symbols 501 of a symbol column are displayed (arranged) in the uppermost tier, the upper tier, the lower tier, and the lowermost tier of the corresponding one of the simulated reels 151 to 155, respectively, thereby forming a symbol matrix of five columns and four rows under the display window 150. Scrolling of symbols 501 forming a symbol matrix starts when a game is started at least by pushing the start button 46. The scrolling of the symbols 501 stops (rearrangement) after a predetermined period of time has elapsed since the scrolling began.

Further, various winning combinations are set beforehand for each symbol 501. A formed winning combination means achieving a winning. A winning combination is a combination of symbols 501 stopped on the payline L, which combination of symbols 501 puts a player into an advantageous state. Examples of the advantageous state includes: when a predetermined number of coins corresponding to the winning combination are paid out; when the number of coins to be paid out is added to a credit amount; when a bonus game is started; and the like.

In the present embodiment, a winning combination is a combination of symbols 501 which is formed on an activated payline L and includes a predetermined number of at least one kind of the following symbols 501: "WILD," "FEATURE," "A," "Q," "J," "K," "BAT," "HAMMER," "SWORD," "RHINOCEROS," "BUFFALO," and "DEER."

When a predetermined kind of symbols 501 are set as scatter symbols, a winning combination is regarded as to be formed if a predetermined number or more of those symbols are rearranged, irrespective of the activation/inactivation status of the paylines L.

Specifically, a winning combination relative to "FEATURE" (a trigger symbol 503*b*) stopped on a payline L serves as a bonus trigger and causes (i) transition of the gaming modes from the regular game to the bonus game and (ii) a payout according to the bet amount. Further, when a winning combination relative to a symbol 501 of "BAT" stops on a payline L during the regular game, there is paid out an amount of coins (value) which is a product of a basic payout amount corresponding to the "BAT" multiplied by the bet amount.

(Regular Game Symbol Table)

FIG. 14 shows a table used for determining symbols 501 to be rearranged during a regular game. The regular game symbol table indicates symbols 501 of each symbol column for the display blocks 28, code Nos. respectively associated with the symbols 501, and twenty number ranges respectively associated with the code Nos. ranging from 0 to 65535.

Note that the above numbers may be equally or unequally divided into twenty ranges. The latter case enables adjustment of a rearrangement probability for each symbol 501 by adjusting the associated range of random numbers. Further, the range of random numbers associated with "FEATURE" corresponding to the trigger symbol 503*b* among the specific symbols 503, or "WILD" corresponding to the wild symbol 503*a* among the specific symbols 503 may be narrower than ranges of random numbers associated with other symbols 501. This allows easier adjustment of winning or losing, by lowering probability of winning of a valuable symbol 501 in accordance with the status of a game.

For example, when a random number randomly selected for the first column is "10000," the symbol "J" whose code No. "3" is associated with a range of random numbers including "10000" is selected as a symbol to be rearranged in the first simulated reel 151. Further, for example, when a random number randomly selected for the fourth column is "40000," the symbol "FEATURE" whose code No. "12" is associated with a range of random numbers including "40000" is selected as a symbol to be rearranged in the fourth simulated reel 151.

(Bonus Game Symbol Table)

FIG. 15 is a table used at the time of determining symbols 501 to be rearranged during a bonus game. As is the case with regular game symbol table, the bonus game symbol table contains symbols 501 of each symbol column for the display blocks 28, code Nos. respectively associated with the symbols 501, and number ranges respectively associated with the code Nos. The number ranges cover the numbers 0 to 65535. These numbers 0 to 65535 are divided into the ranges in the same manner as the case with the regular game symbol table.

Further, the bonus game symbol table includes additional specific symbols 503 or specific symbols 503 replacing the other symbols. The wording "replacing" means that new symbol data is written over already existing symbol data. The number of symbols to be added or replaced, or the symbol column to be subject such an addition or replacement may be randomly selected, or determined in advance. In the present embodiment, the number of symbols to be added or replaced are randomly selected with the wild symbol increase number determination table of FIG. 18 and a trigger symbol increase number determination table of FIG. 19. When symbol data is replaced with another set of symbol data, an image based on the overwritten data (replacement data) may be displayed, in place of a symbol 501 having been stopped and displayed.

For example, in the bonus game symbol table of FIG. 15, ten wild symbols 503*a* are evenly added to symbol columns (L1) to (L5). This achieves conditions whereby a wild symbol 503*a* is more likely to be selected through random selection, in all the symbol columns (L1) to (L5).

(Symbol Column Determination Table)

FIG. 16 shows a symbol column determination table used at the time of determining a symbol column, out of the symbol columns (L1) to (L5), in which addition of or replacement with the specific symbols 503 takes place. The symbol column determination table indicates symbol column Nos. and random number ranges respectively associated with the symbol column No. A symbol column Nos. 1 to 5 respectively indicate first to fifth columns of display blocks 28.

The present embodiment deals with a case where an increase in the number of specific symbols 503 or the number of specific symbols 503 to replace the other symbols is determined for each symbol column based on the random number extracted and the symbol column determination table. The present invention, however, is not limited to this. For example, the number of specific symbols 503 to be increased or to replace the other symbols may be determined in advance for each symbol column. Further, an increase in the number of specific symbols 503 or the number of specific symbols 503 to replace the other symbols may be determined for each type of the specific symbols 503.

(Code No. Determination Table)

FIG. 17 shows a code No. determination table. The code No. determination table indicates code Nos. and random number ranges respectively associated with the code Nos. For example, when the random numbers for the first symbol column No. (the first column) are 40567, 63535, 65323, then "12," "end," and "end" are selected as the code Nos., respectively.

The present embodiment deals with a case where the code Nos. of specific symbols to be increased is determined for each of the symbol columns based on the random numbers obtained and the code No. determination table. The present invention however is not limited to this. For example, the code No. of a specific symbol 503 to be increased may be set in advance for each symbol column.

(Wild Symbol Increase Number Determination Table)

FIG. 18 shows a wild symbol increase number determination table. The wild symbol increase number determination table indicates a list of wild symbol increase counts and random number ranges respectively associated therewith.

The wild symbol increase count has five numerical values: "10," "30," "50," "70," and "90."

For example, when the random number is 17235, the additional wild symbol count selected is "30."

Note that the list of wild symbol increase counts is not particularly limited provided that the list includes more than one integers of 1 or greater. Further, the increases in the number may be variable at a predetermined timing; e.g. at every unit game.

(Trigger Symbol Increase Number Determination Table)

FIG. 19 shows a trigger symbol increase number determination table. The trigger symbol increase number determination table indicates a list of trigger symbol increase counts and associated random numbers. The trigger symbol increase number has five numerical values: "2," "4," "6," "8," and "10." For example, when the random number is 17235, the trigger symbol increase number selected is "4." Note that the list of trigger symbol increase counts is not particularly limited provided that the list includes more than one integers of 1 or greater. Further, the list of increments may be variable at a predetermined timing; e.g. at every unit game.

(Payout Table)

FIG. 20 shows a payout table which manages payouts each awarded in association with a winning combination. This payout table is stored in the ROM 72 of the motherboard 70, and information on a payout (payout multiplying factor) is associated with a type of winning combination. For example, a payout multiplying factor corresponding to a winning combination including three "A"s is "4." This means that a player is awarded a payout where the bet amount is multiplied by four. A payout multiplying factor corresponding to a winning combination including five "BUFFALO"s is "100." Note that the setting of payout multiplying factor for the regular game is the same as that of the free game; however, the present invention is not limited to this. That is, the setting of payout multiplying factor may be different between the regular game and the free game.

Data of each of the above tables is stored in the ROM 72 or the RAM 73 of the motherboard 70 (game controller 100) of the slot machine 10. Thus, the slot machine 10 is capable of running a base game even when it is separated from the external control device 621 (center controller 200) to operate as a single machine.

(Gaming Terminal Management Table)

FIG. 21 is a gaming terminal management table for the center controller 200 to manage a state of a base game being run at each slot machine 10. The management table has a gaming terminal column, a game type column, a game state column, and a cumulative game count column. The gaming terminal column stores therein unique machine numbers respectively assigned to the slot machines 10. For instance, when five slot machines 10 are connected, the machine numbers "001" to "005" are stored.

The game type column stores therein a type of base game being run at each slot machine 10 in association with the machine number. Examples of types of the base game include the regular game and the bonus game. The slot machine 10 allotted machine number "001," for instance, has been repeating unit games of the regular game, since the game type column thereof indicates the "regular game."

The game status column stores a state of a base game ongoing at each slot machine 10, that is, a game state of a unit game, in association with the machine number. The gaming states include "run" and "stop." For example, at the slot machine 10 allotted machine number "002," a win or loss has been resulted in a unit game of the regular game and the next unit game is to begin, since the indicated game type is "regular game," and the indicated game state is "stop." At the slot machine 10 allotted machine number "004," a unit game of the bonus game is being run, since the indicated game type is "bonus game," and the indicated game state is "run."

The accumulated game number column stores an accumulated game number of unit games of the regular game as an accumulated game number. The accumulation starts when the crap game has ended and the slot game has resumed. The accumulated game count at each of the slot machines 10 is used for calculation of a total accumulated game count by combining the accumulated game counts at all the slot machines 10. The total accumulated game count is used for a determination of whether the common game runnable condition is met.

(Common Game Management Table)

FIG. 22 is a common game management table which manages at the center controller 200 a common game state at each slot machine 10. The management table includes a gaming terminal column, a bet amount Sn column, a payout multiplying factor An column, a shooter column, an accumulated bet amount Bn column, a special bet amount Cn column, a base bet amount Dn column, a common game bet amount Tn column, a base bet total amount F column, a special bet total amount G column, a mode H column, an easy-mode total amount I column, an advanced mode total amount J column, a payout ratio Kn (contribution level En) column, corrected special bet amount Ln column, a total bet amount Mn column, a next-game carry-over amount Nn column.

The gaming terminal column stores therein unique machine numbers respectively allotted to the slot machines 10. In the present embodiment, machine numbers "001" to "005," which are the machine numbers of five slot machines 10, are stored. The bet amount Sn column stores, for each unit game, a bet amount on a slot game which is the base game. For example, a bet amount of "10.4" is placed on the current slot game at the slot machine 10 allotted machine number "001." A bet amount of "12.4" is placed on the current slot game at the slot machine 10 allotted machine number "004."

The payout multiplying factor An column stores a payout multiplying factor An of the common game. In the present embodiment, the payout multiplying factor An is "double," thus winning the common game yields the same amount of payout as the bet amount on the common game. In other words, winning the common game causes the bet amount to remain the same, as is the case of a common game ending in a draw.

The shooter column stores numbers "1" and "0," respectively indicating that the slot machine 10 is designated to be the shooter and not. In the present embodiment, the slot machine 10 allotted machine number "002" is designated to be the shooter.

The accumulated bet amount Bn column stores accumulated bet amounts Bn calculated by the equation $Bn=\Sigma(Sn-Cn-Dn)$. In other words, the accumulated bet amount Bn is a bet mount to which a bet amount calculated by subtracting the special bet amount Cn and the base bet amount Dn from a base game bet amount is added for each unit base game. The special bet amount Cn column stores a special bet amount Cn calculated by the equation $Cn=Bn\times 3\%$. Note that the percentage 3 in the equation is an example, and may be changed as needed. The special bet amount Cn is employed as a basis of calculation of the special bet total amount G which is added to the bet amount placed at the slot machine 10 designated to be the shooter of the common game.

The base bet amount Dn column stores base bet amount Dn calculated by the equation $Dn=Bn\times 7\%$. Note that the percentage 7 in the equation is an example, and may be changed as needed. The base bet amount Dn is interchangeable with a common bet amount Tn of the common game bet amount Tn column. The common game bet amount Tn is a bet amount to be bet on the common game first, and is a minimum bet amount bettable on the common game. For instance, at the slot machine 10 allotted machine number "002," a common game bet amount of "7.20" is placed on the current common game. At the slot machine 10 allotted machine number "004," a common game bet amount of "3.60" is placed on the current common game.

The base bet total amount F column stores the base bet total amount F calculated by the equation $F=\Sigma Dn$. The base bet total amount F is a total amount of base bet amount Dn placed at all the slot machines 10, and used for calculation of a payout ratio Kn (contribution level En) at each slot machine 10. The special bet total amount G column stores a special bet total amount G calculated by the equation $G=\Sigma Cn$. The special bet total amount G is a total amount of a special bet amount Cn at all the slot machines 10, and is added to a common game bet amount Tn at the specific slot machine 10 designated to be the shooter.

The mode H column stores data of various types of game modes in the common game. Specifically, the mode H column stores one of letters "P" and "E," respectively indicating an advanced mode and an easy mode. In the present embodiment, the slot machines 10 respectively allotted machine numbers "001" and "002" run the common game in the advanced mode, and the slot machines 10 allotted machine numbers "003," "004," and "005" run the common game in the easy mode.

The easy-mode total amount I column stores an easy-mode total amount I calculated by the equation $I=G\times(I/5)$. Here, the ratio i/5 refers to the ratio of the number of slot machines 10 running the common game in the easy mode (i) to the total number of slot machines 10 (five slot machines 10). As the total number of slot machines 10 increases or decreases, the number, i.e., "five (5)" is changed accordingly. In the present embodiment, there are three slot machines 10 running the common game in the easy mode. Thus, the easy-mode total amount I is calculated by the equation of $G\times 3/5$.

The advanced mode total amount J column stores the advanced mode total amount J calculated by the equation $I=G\times(5-i)/5$. Here, $(5-i)/5$ refers to the ratio of the number of slot machines 10 running the common game in the advanced mode $(5-i)$ to the total number of slot machines (five slot machines 10). As the total number of slot machines 10 increases or decreases, the number, i.e., "five (5)" is changed accordingly. In the present embodiment, the number of slot machines 10 running the common game in the easy mode "E" is three. Thus, the advanced mode total amount J is calculated by the equation $G\times(5-3)/5$.

The payout ratio Kn (contribution level En) column stores the payout ratio Kn calculated by the equation $Kn=Dn/Dmax$. Here, the Dmax refers to a maximum base bet amount Dn in the same game mode. For example, the slot machines 10 allotted machine numbers "001" and "002" run the common game in the advanced mode, and the slot machines 10 allotted machine numbers "003," "004," and "005" run the common game in the easy mode.

The corrected special bet amount Ln column stores a corrected special bet amount Ln calculated by the equation $Ln=(I \text{ or } J)\times Kn$. The corrected special bet amount Ln is the total bet amount in each mode calculated taking into account the contribution level (payout ratio) at slot machines 10 running a game in the same game mode. The total bet amount Mn column stores a total bet amount Mn calculated by the equation $Mn=Ln+Dn$. The total bet amount Mn is a bet amount to be placed when the slot machine 10 is designated to be the shooter. The next-game carry-over amount Nn column stores a next-game carry-over amount Nn carried over to each common game bet amount Tn. The next-game carry-over amount Nn is an amount calculated by subtracting the common game bet amount Tn of the corresponding slot machine 10 from a maximum common game bet amount Tmax in the same game mode. The next-game carry-over amount Nn is employed as an initial value of the common game bet amount Tn in the next common game, when the current common game ends.

(Die Pip Storage Table)

FIG. 23 shows a data table which stores pips of dice of crap games which are repeated at the center controller 200 until a win or loss is resulted. This table includes a cumulative game count column and a die pip column. The cumulative game count column stores the game counts of crap games which are repeated until a win or loss is resulted. The table stores a count of crap games by indicating "1" for the first crap game, "2" for the second crap game, and the like. Meanwhile, the die pip column stores the pips of dice which are randomly determined for each game count. With this, the die pip storage table enables confirmation of the pips of dice having lead each crap game to a draw, in relation to each game count. The die pip storage table also enables confirmation of the pips of dice having lead the last crap game to a win or loss.

(Subtraction Value Determination Table)

FIG. 24 is a data table for determining the number of crap games to be run after one or more crap games are skipped at the center controller 200, which crap games to be run are to result in a draw. This table includes a subtraction value column and a random number range column.

The subtraction value column includes three types of subtraction values which consist of "1," "2," and "3."

When a subtraction value "1" is selected, one crap game resulting in a draw and a crap game to result in win or loss are to be run after one or more crap games to result in a draw are skipped. Meanwhile, when a subtraction value "2" is selected, two crap games resulting in a draw and a crap game to result in win or loss are to be run after one or more crap games to result in a draw are skipped. Note that the subtraction values are not limited to three, as long as they have more than two values. Further, the subtraction values are not necessarily sequential numbers: The subtraction values may be "3," "5," "7," "0," and the like.

The random number range column is associated with each subtraction value of the subtraction value column. Subtraction value "1" is associated with the random numbers ranging from 0 to 77, subtraction value "2" is associated with the random numbers ranging from 78 to 205, and subtraction value "3" is associated with the random numbers ranging from 206 to 255. Thus, in the subtraction value determination table, a number is randomly determined within the random number ranging from 0 to 255, and a subtraction value associated with the random number value where the selected number belongs is determined with a predetermined probability.

(Display State)

The following specifically describes a display state of the symbol display device 16 while the slot machine 10 is in operation.

(Slot Game: Regular Game Screen)

FIG. 25 shows an example of a regular game screen which is a screen showing a regular game displayed on the symbol display device 16.

Figure 26:
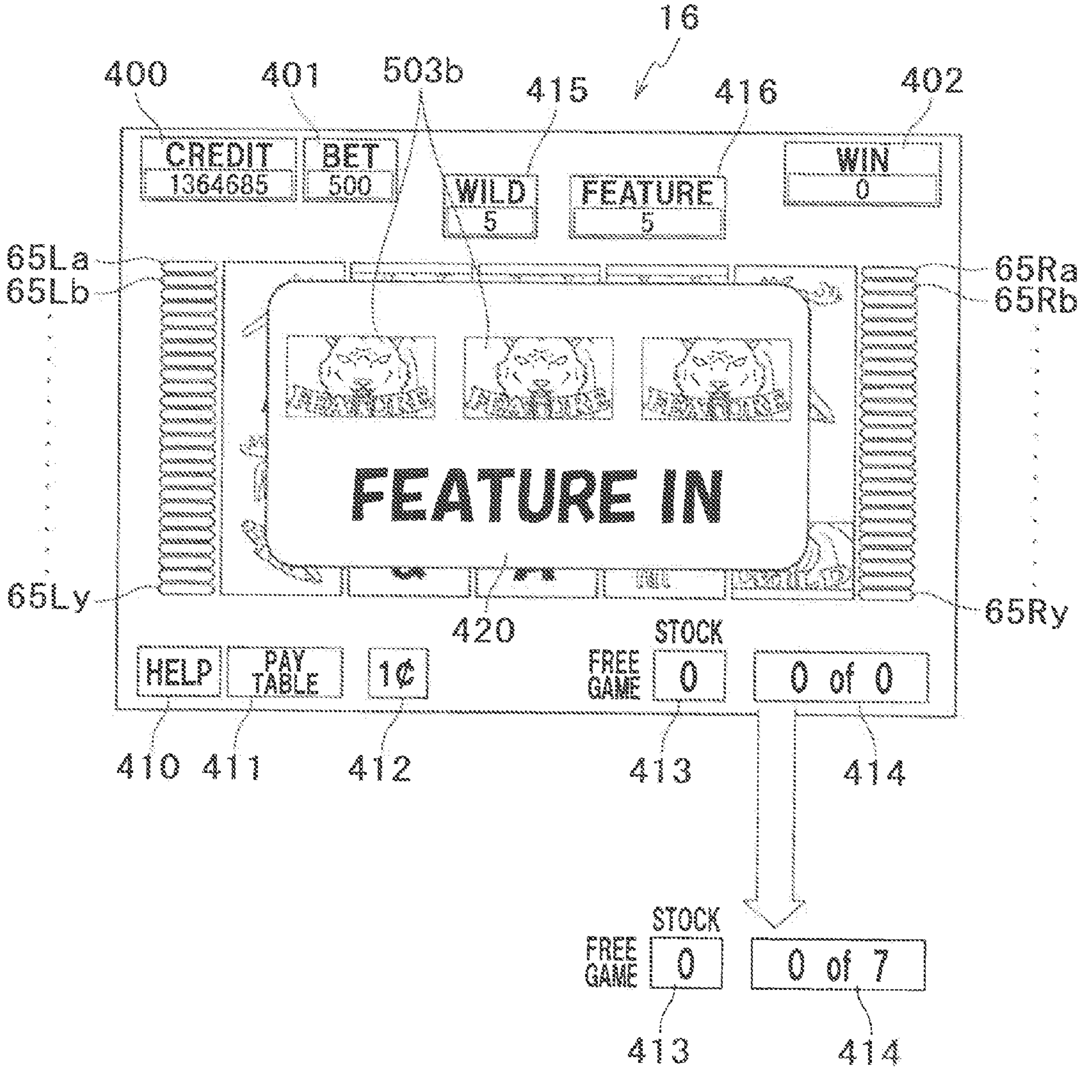
FIG. 26 is an explanatory diagram of a display state of the symbol display device.

More specifically, the regular game screen is arranged in a center portion of the symbol display device 16, and includes: the display window 150 having the five simulated reels 151 to 155, and the payline occurrence parts 65L and 65R which are arranged on both sides of the display window 150 and symmetrical with respect to the display window 150. Note that FIG. 26 shows a regular game screen in which the first to third simulated reels 151, 152, and 153 are stopped, while the fourth and fifth simulated reels 154 and 155 are rotating.

Above the display window 150 are: the credit amount display unit 400, a broken number cash display unit the bet amount display unit 401, a wild symbol count display unit 415, a trigger symbol count display unit 416, and the payout display unit 402. These units 400, 401, 415, 416, and 402 are sequentially arranged in this order from the left side to the right side when viewed from a player.

The credit amount display unit 400 displays a credit amount. The broken number cash display unit displays a fractional amount of cash. The bet amount display unit 401 displays a bet amount placed on the current unit game. The wild symbol count display unit 415 displays the number of wild symbols 503*a* in a unit game in progress. With this, it is possible to notify the player in advance that there are five wild symbols 503*a* in the regular game. The trigger symbol count display unit 416 displays the number of trigger symbols 503*b* in a unit game in progress. The trigger symbol count display unit 416 displays the number of trigger symbols 503*b* in a unit regular game in progress. The payout display unit 402 displays the number of coins to be paid out when a winning combination is achieved.

Blow the display window 150 are: a help button 410; a pay-table button 411; a bet unit display unit 412; a stock display unit 413; and a free game count display unit 414. These units 410, 411, 412, 413, and 414 are sequentially arranged in this order from left to right when viewed from the player.

The help button 410, when pressed by a player, activates a help mode. The help mode provides a player with information to solve his/her problem regarding the game. The pay-table button 411, when pressed by a player, activates a payout display mode in which an amount of payout is displayed. The payout display mode displays to the player a guidance screen indicating relation of a winning combination to the payout multiplying factor.

The bet unit display unit 412 displays a bet unit (payout unit) at the current point. With the bet unit display unit 412, the player is able to know that, for example, he/she is allowed to participate in a game with a bet by an increment of one cent.

The stock display unit 413 displays a bonus game carry-over number. Here, the "bonus game carry-over number" means the remaining number of bonus games runnable subsequently to an end of the currently-run bonus game. That is, when the stock display unit 413 displays "3," three more bonus games are consecutively runnable after the currently-run bonus game. Note that the stock display unit 413 displays the number "0" in the regular game.

The free game count display unit 414 displays the total number of times the bonus game is to be repeated, and how many times the bonus game has been repeated. In other words, when the free game count display unit 414 displays "0 OF 0," the total number of times free games are to be repeated ("free game total number") is 0, that is, the game in progress is not a bonus game. Further, when the free game count display unit 414 displays "5 OF 8," during the bonus game, the free game total number is eight, and the current game in progress is the fifth free game.

(Bonus Winning Screen During Regular Game)

FIG. 26 displays shows a screen displayed for a certain period of time after a bonus is won. More specifically, the screen shows that a bonus is won with three trigger symbols 503*b* being rearranged. The trigger symbol 503*b* preferably has a readable text such as "FEATURE", so as to have a player clearly understand the symbol relates to a winning of bonus.

On this screen, a bonus winning screen 420 is displayed as a popup to notify a player of the winning of bonus using a symbol image and an image of text "FEATURE IN." Then, at the same time or immediately after displaying the bonus winning screen 420, the free game total number "0" of the free game count display unit 414 is switched to "7." Thus, the player is able to know that he/she has won a bonus, and that the game will shift to a bonus game in which the free game is repeated seven times.

(Slot Game: Bonus Game Screen)

Figure 27:
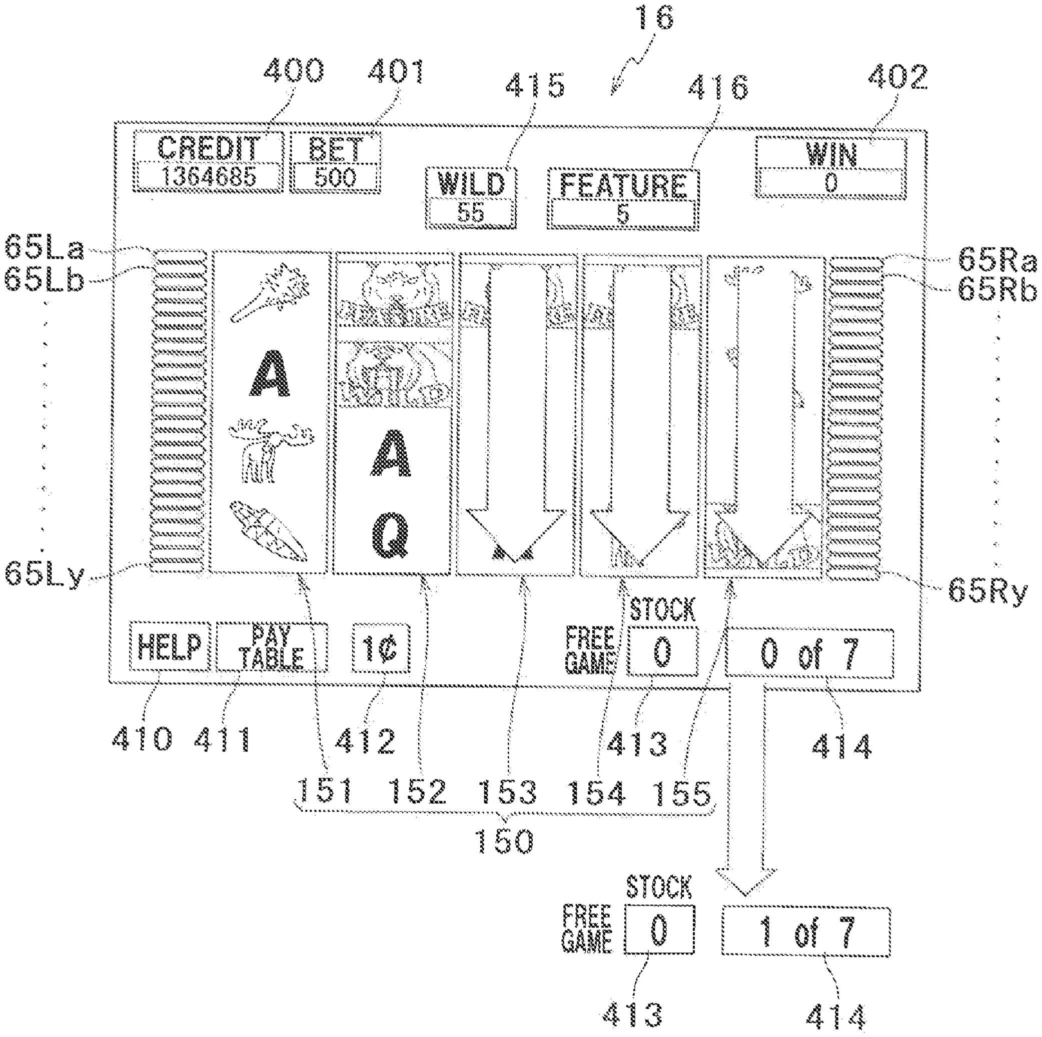
FIG. 27 is an explanatory diagram of a display state of the symbol display device.

FIG. 27 shows an example of a bonus game screen which is a screen displayed on the symbol display device 16 during the bonus game.

Specifically, the free game count display unit 414 displays the free game total number and the game number of the current game. For example, the free game count display unit 414 indicates that the first free game out of seven free games is running. Other operations are the same as those of the regular game.

(Crap Game Screen)

Figure 28:
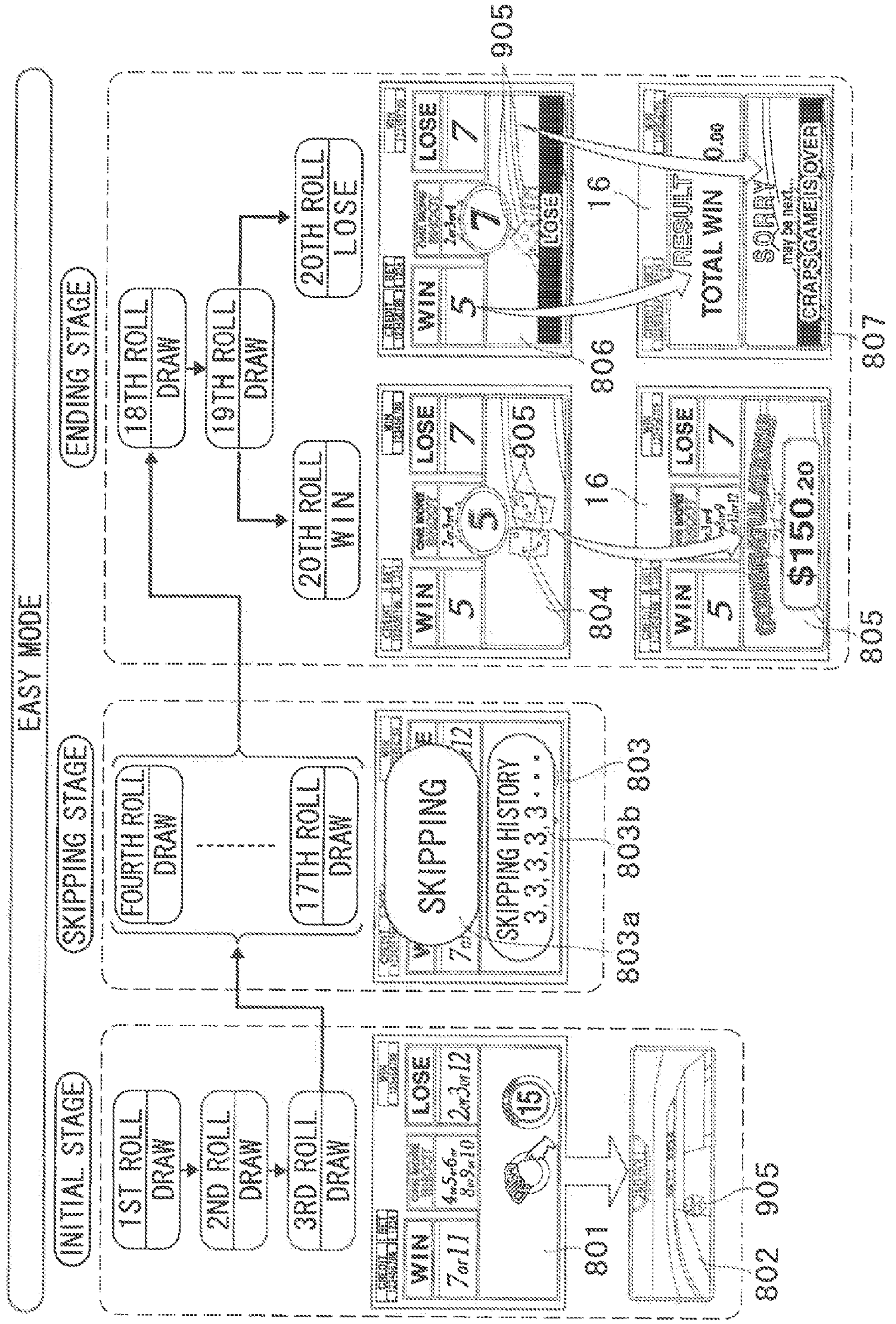
FIG. 28 is an explanatory diagram of a game progress of a crap game.

FIG. 28 shows an example of a screen which displays each step which takes place in the easy mode in the crap game.

During an initial stage after the first crap game begins before a few crap games are run, a roll request screen 801 for roll operation and a die movie screen 802 showing a moving image of dice being rolled by a roll operation are displayed for each crap game. Thereafter, during the skipping stage, a skip screen 803 is displayed. The skip screen 803 has a skip notify unit 803*a* and a die pip display unit 803*b*. The skip notify unit 803*a* shows that the skip process is in progress, in which process crap games each with a game result of a draw are processed collectively so as to end crap games in a short period of time. The die pip display unit 803*b* displays a list of pips of dice resulted in the crap games skipped by the skip process. The skip screen 803 is displayed during a processing time lasting for a few seconds and the like.

Next, during an ending stage, a few crap games which result in a draw are run. The screens displayed during the time are the roll request screen 801 and the die movie screen 802, which are the same screens as those displayed in the initial stage. When the last crap game resulting in a win is run, a winning screen 804 showing winning pips of dice is displayed, and a payout screen 805 indicating that a win is resulted and indicating a payout amount is displayed thereafter. On the other hand, when the last crap game resulting in a loss is run, a loss screen 806 showing losing pips of dice is displayed, before a game result screen 807 is displayed.

(Operations of Slot Machine 10: Regular Game Running Process)

Figure 29:
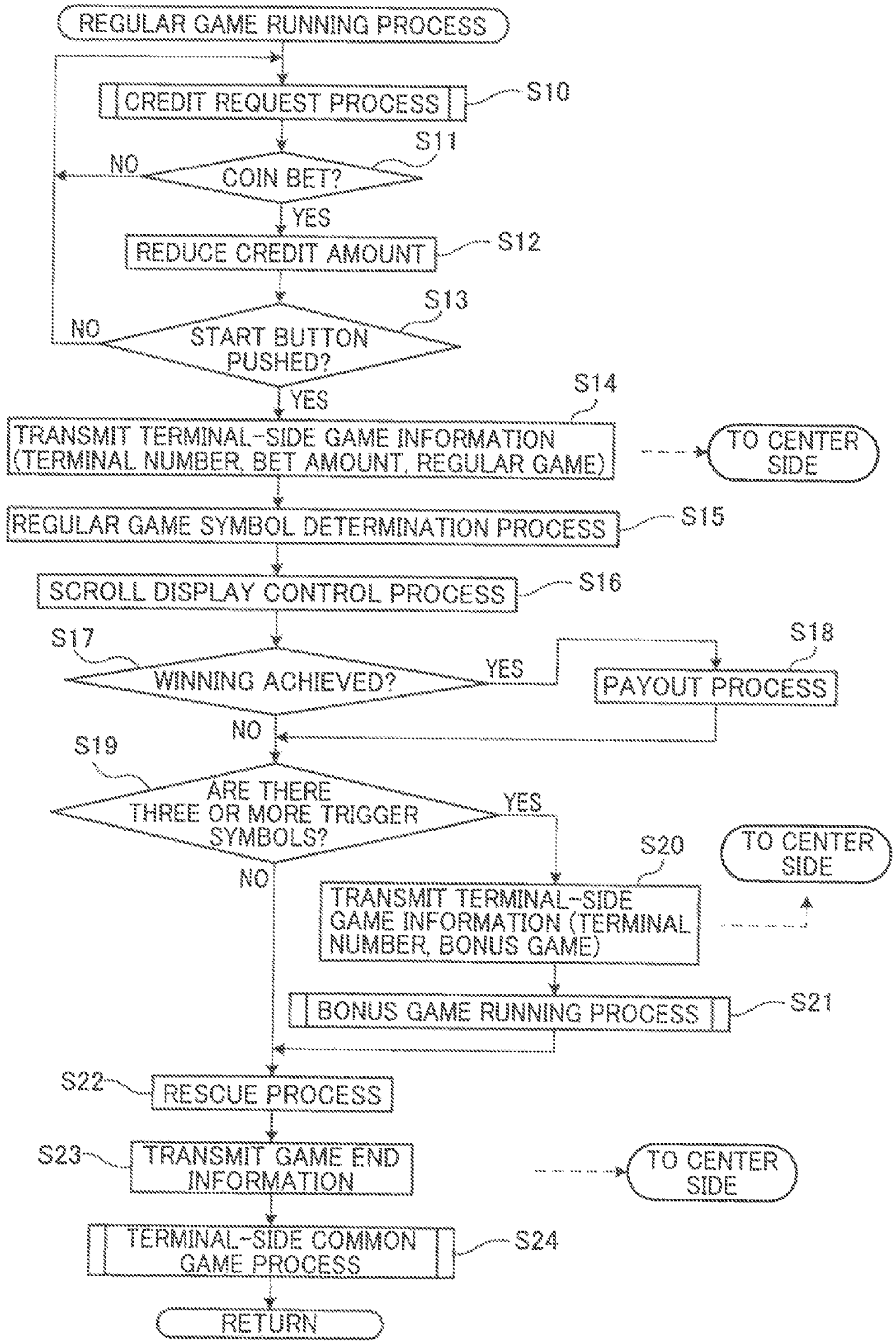
FIG. 29 is a flow chart showing a regular game running process.

The following describes the operations of the slot machine 10 with the above structure. The regular game running process shown in FIG. 29 is run by the main CPU 71 of the slot machine 10. Note that the slot machine 10 is started before this process.

As shown in FIG. 29, the main CPU 71 first runs a credit request process (S10). During the process, the player determines whether to use some of the credits stored on the IC card 500.

The main CPU 71 determines whether a coin is bet (S11). During the process, the main CPU 71 determines whether an input signal to be output from the 1-bet switch 34S when the 1-bet button 34 is operated, and/or an input signal to be output from the 10-bet switch 39S when the 10-bet button 39 is operated is received. When the main CPU 71 determines that no coin is bet, the process is brought back to step S10.

Meanwhile, when the main CPU 71 determines that a coin is bet in step S11, the main CPU 71 executes a process to reduce the credit amount stored in the RAM 73 (S12). Note that when the number of coins bet exceeds the credit amount stored in the RAM 73, the main CPU 71 brings the process back to step S11 without the reduction of the credit amount stored in the RAM 73. Further, when the number of coins bet exceeds the maximum value bettable on one game (500 coins in the present embodiment), the process moves onto step S13 without the reduction of the credit amount stored in the RAM 73.

Next, the main CPU 71 determines whether the start button 46 is pushed (S13). During the process, the main CPU 71 determines whether an input signal to be output from the start switch 46S when the start button 46 is pushed is received. When it is determined that the start button 46 is not pushed, the process is brought back to S11. Note that when the start button 46 is not pushed (for example, when an instruction to end a game is inputted without the start button 46 being pushed), the main CPU 71 cancels the result of the reduction executed in step S12.

Meanwhile, when the main CPU 71 determines in step S13 that the start button 46 is pushed, the main CPU 71 transmits terminal-side game information to the center controller 200 (S14) before executing a regular game symbol determining process (S15). In the regular game symbol determining process, a code Nos. associated with the symbols stopped are determined. Specifically, the main CPU 71 obtains a random number, and determines the code No. for each symbol column at the time of stopping symbol columns in the display blocks 28, based on the random number obtained, and the regular game symbol table of FIG. 14.

Next, the main CPU 71 executes a scroll display control process in step S16. The process is for controlling the display so that after scrolling of the symbols 501 has started, the symbols 501 determined in step S15 are rearranged.

Next, the main CPU 71 determines whether a winning is achieved (S17). In step S17, the main CPU 71 counts the number of symbols 501 rearranged on each payline L, among the symbols 501 rearranged in step S16. Then, the main CPU 71 determines whether two or more symbols 501 are rearranged.

When it is determined that a winning is achieved, the main CPU 71 performs a process related to coin payout (S18). In this process, the main CPU 71 refers to the odds data stored in the RAM 73, and determines the payout multiplying factor based on the number of certain symbols 501 rearranged along a payline L. The odds data indicates the number of symbols 501 rearranged on a payline L and associated payout multiplying factors (see FIG. 20). Note that each "WILD" symbol arranged on a winning payline L doubles the payout. That is, if three "WILD" symbols are displayed along the winning-achieved payline L, the payout is eight times as much as the original payout amount.

The present embodiment deals with a case where it is determined that a winning is achieved when symbols 501 arranged along a single payline L includes at least two symbols 501 of the same type. The present embodiment, however, is not limited to this. For example, the paylines may be omitted from the present invention, and it may be determine that a winning is achieved when symbols 501 rearranged in the display blocks 28 include at least two symbols 501 of the same type.

When the main CPU 71 determines that no winning is achieved in step S17, or after step S17 is executed, the main CPU 71 determines whether three or more trigger symbols 503*b* are rearranged (S19). During the process, the main CPU 71 determines whether three or more trigger symbols 503*b* are rearranged in the display blocks 28, irrespective of the payline L. In step S19, as shown in FIG. 26, when it is determined that three or more trigger symbols 503*b* are rearranged, the main CPU 71 transmits terminal-side game information to the center controller 200 (S20) before executing the bonus game running process (S21). During the bonus game running process, a free game with an increased number of wild symbols 503*a* is run. The bonus game running process is detailed later.

When it is determined in S19 that fewer than three trigger symbols 503*b* are rearranged, or after S20, the main CPU 71 runs a rescue process to rescue the player when a predetermined rescue condition has been met (S22).

Figure 31:
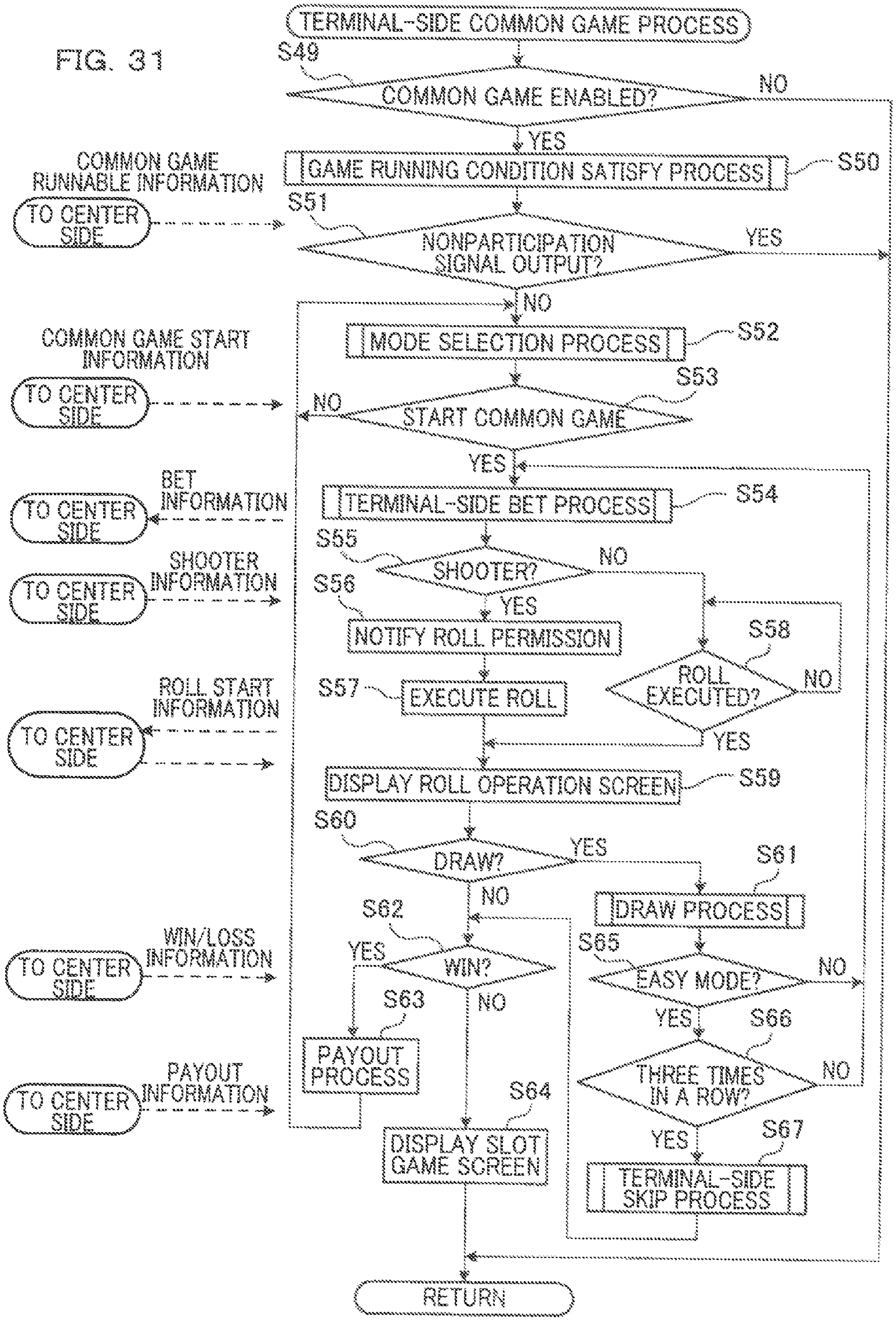
FIG. 31 is a flow chart showing a terminal-side common game process.

After step S22, the main CPU 71 transmits game end information as information for causing all the slot machines 10 to simultaneously start the common game (S23). Thereafter, a terminal-side common game process of FIG. 31 is executed (S24). Then, this sub routine ends.

(Operations of Slot Machine: Bonus Game Running Process)

Figure 30:
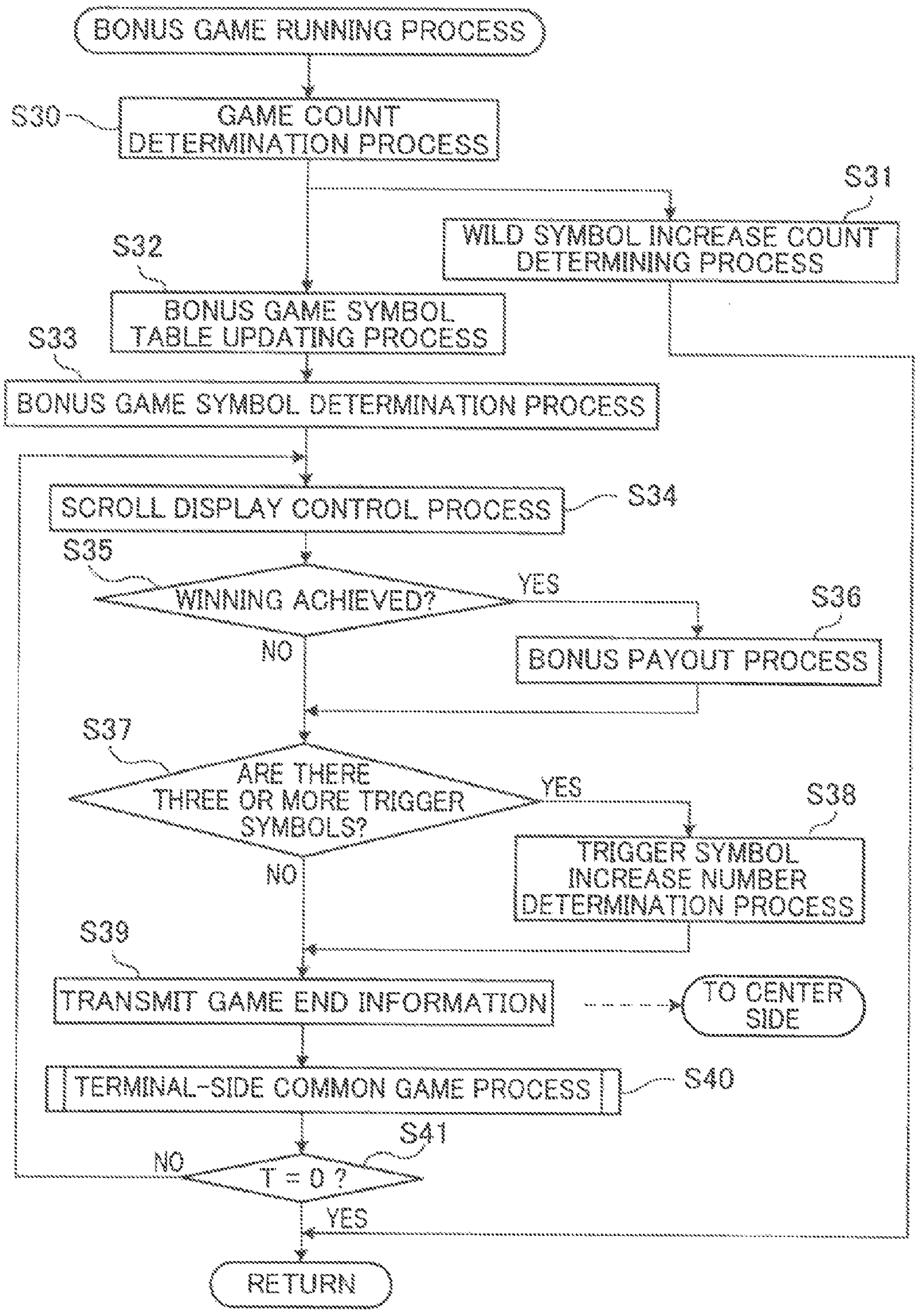
FIG. 30 is a flow chart showing a bonus game running process.

Next, the bonus game running process is executed with reference to FIG. 30.

The player is able to play a game without betting a coin in the bonus game. First, the main CPU 71 sets remaining free game count T to T=F1 (specific count=7) in a free game count storage region of the RAM 73 (S30).

Further, the main CPU 71 displays a bonus winning screen 420 on the symbol display device 16 as a popup, as shown in FIG. 26.

Next, the main CPU 71 executes a wild symbol increase count determining process (S31). Specifically, when three or more trigger symbols 503*b* are rearranged, a random number is obtained first. Then, a total increase in the number of wild symbols is determined based on that random number and the wild symbol increase number determination table. The number of wild symbols is increased in a stepwise manner, or increased as a group.

Further, the main CPU 71 executes a bonus game symbol table updating process (S32). In the bonus game symbol table updating process, the main CPU 71 updates the bonus game symbol table based on an increase in the number of wild symbols 503*a* determined in the additional wild symbol increase count determining process.

Next, in step S33, the main CPU 71 executes a symbol increase effect process.

Next, the main CPU 71 executes a bonus game symbol determining process (S34). In the bonus game symbol determining process, the main CPU 71 determines a code No. at the time of stopping the symbols 501, by running the symbol determination program stored in the RAM 73. More specifically, the main CPU 71 obtains random numbers, and determines the code No. of each symbol column of the display blocks 28, at the time of stopping the symbols, based on the random numbers obtained, and the bonus game symbol table.

Next, in step S35, the main CPU 71 executes a scroll display control process. This process is a display control whereby scrolling of symbols 501 is started and symbols determined in S34 are rearranged thereafter.

Next, the main CPU 71 determines whether a winning is achieved (S36). In the present embodiment, a winning is achieved when symbols 501 rearranged along a payline L includes at least two symbols of the same type, as described above. The "WILD" symbol which is a wild symbol 503*a* is a symbol 501 which can substitute for another type of symbol 501. In the bonus game, the number of wild symbols 503*a* is increased compared to that of the regular game. Therefore, the possibility of winning is higher than the regular game.

In step S36, the main CPU 71 counts each type of the symbols 501 rearranged on each payline L, among the symbols 501 rearranged in step S35. Then, the main CPU 71 determines whether two or more types of symbols 501 are rearranged.

When it is determined that a winning is achieved, the main CPU 71 performs a process related to coin payout (S37).

When it is determined that a winning is not achieved in S36, or after the process of S37, the main CPU 71 determines whether three or more trigger symbols 503*b* are rearranged (S38). In this process, whether or not three or more trigger symbols 503*b* are rearranged in the display blocks 28 is determined, without taking into consideration the paylines L.

In step S38, when it is determined that three or more trigger symbols 503*b* are rearranged, the main CPU 71 sets the free game remaining count T to T=T+F1 (F1=first specific count=7) in the free game count storage region in the RAM 73 (S39).

In step S38, when it is determined that fewer than three trigger symbols 503*b* are rearranged, or after step S39 is executed, the main CPU 71 sets the free game remaining count T to T=T−1 in the free game count storage region in the RAM 73 (S40).

Next, the main CPU 71 determines whether T equals 0, based on remaining count data stored in the free game count storage region of the RAM 73 (S41).

When it is determined that T does not equal 0, the main CPU 71 brings the process back to step S34. Meanwhile, when it is determined that T equals 0, the main CPU 71 ends the sub routine.

(Process of Slot Machine 10: Terminal-Side Common Game Process)

When a terminal-side common game process is executed during the regular game running process or the bonus game running process, it is first determined whether the common game is runnable based on common game runnable information from the center controller 200 (S49), as shown in FIG. 31. When the common game is not runnable (S49: NO), the routine ends, and the regular game or the bonus game is continued.

Meanwhile, when the common game is runnable (S49: Yes), the total bet amount placed on the base game is less than the minimum bet amount. Thus, the game running condition satisfy process is executed to ask the player whether to participate in the crap game, the player who plays at a slot machine 10 which has not satisfied the game running condition thus is not qualified to participate in the crap game (S50). Thereafter, it is determined whether the slot machine 10 outputs a nonparticipation signal which indicates that the slot machine 10 will not participate in the crap game (S51). When the signal is outputted (S51: Yes), the terminal-side common game process ends on the premise that the slot machine 10 will not participate in the current crap game.

Meanwhile, when the slot machine 10 has satisfied the game running condition, or when no nonparticipation signal is outputted even when the game running condition has not been satisfied such as when a participation signal is outputted (S51: NO), the slot machine 10 is treated as a slot machine 10 qualified for participating in the crap game, where the common game is runnable, thus a mode selection process is executed to select the advanced mode or the easy mode (S52). Thereafter, it is determined whether to start a common game, based on common game start information from the center controller 200 (S53). When the common game is not started (S53, No), S52 is repeated to cause a stand-by state while the come-out roll screen is being displayed.

When the common game is started (S53, Yes), a terminal-side bet process is subsequently run (S54). Next, based on shooter information from the center controller 200, it is determined whether the slot machine 10 is designated to be the shooter (S55). When the slot machine 10 is not designated to be the shooter (S55, No), it is determined whether a roll operation is executed, based on roll start information from the center controller 200 (S58). When no roll operation is executed (S58, No), S58 is repeated to cause a stand-by state. When a roll operation is executed (S58, Yes), a roll operation image is displayed (S59).

Meanwhile, when the slot machine 10 is designated to be the shooter (S55, Yes), a shooter designation image appears, the shooter designation image notifying the player that the slot machine 10 is designated to be the shooter (S56). Thus, the player can recognize that he/she is designated to be the shooter, by visually confirming the shooter designation image. When the player executes a roll operation, a roll is executed, and roll start information is transmitted to the center controller 200 (S57). Afterwards, a movie of rolling dice image 905 is displayed on the symbol display device 16 (S59). Note that the display of the moving image continues until a win or loss is resulted in the crap game.

Next, it is determined whether the crap game ends in a draw, based on win/loss information from the center controller 200 (S60). When the crap game ends in a draw (S60, Yes), a draw process is run (S61). Thereafter, it is determined whether the crap game is run in the easy mode (S65). When the crap game is not run in the easy mode (S65: NO), S54 is run again. Meanwhile, when the crap game is run in the easy mode (S65, Yes), it is determined whether the easy mode is selected three times in a row (S66). When the easy mode is not selected three times in a row (S66: NO), step S54 is repeated. Meanwhile, when the easy mode is selected three times in a row (S66: Yes), a terminal-side skip process is executed (S67).

When S67 is executed, or when the crap game does not end in a draw (S60, NO), it is determined whether the crap game ends in a win (S62). When it is determined that no win is resulted (S62, No), it is determined that a loss is resulted in the crap game, and the screen is brought back to the slot game screen displayed immediately before the crap game had begun, such as the regular game or the bonus game (S64), and this routine ends. Meanwhile, when the crap game results in a win (S62, Yes), a payout process is executed based on payout information from the center controller 200. For example, a payout process is executed where a payout amount where the base bet amount placed on the common game is doubled is paid out. Further, when the slot machine 10 is designated to be the shooter, an amount corresponding to the special bet amount is paid out (S63). Step S52 is repeated thereafter.

(Operations of Slot Machine 10: Game Running Condition Satisfy Process)

Figure 32:
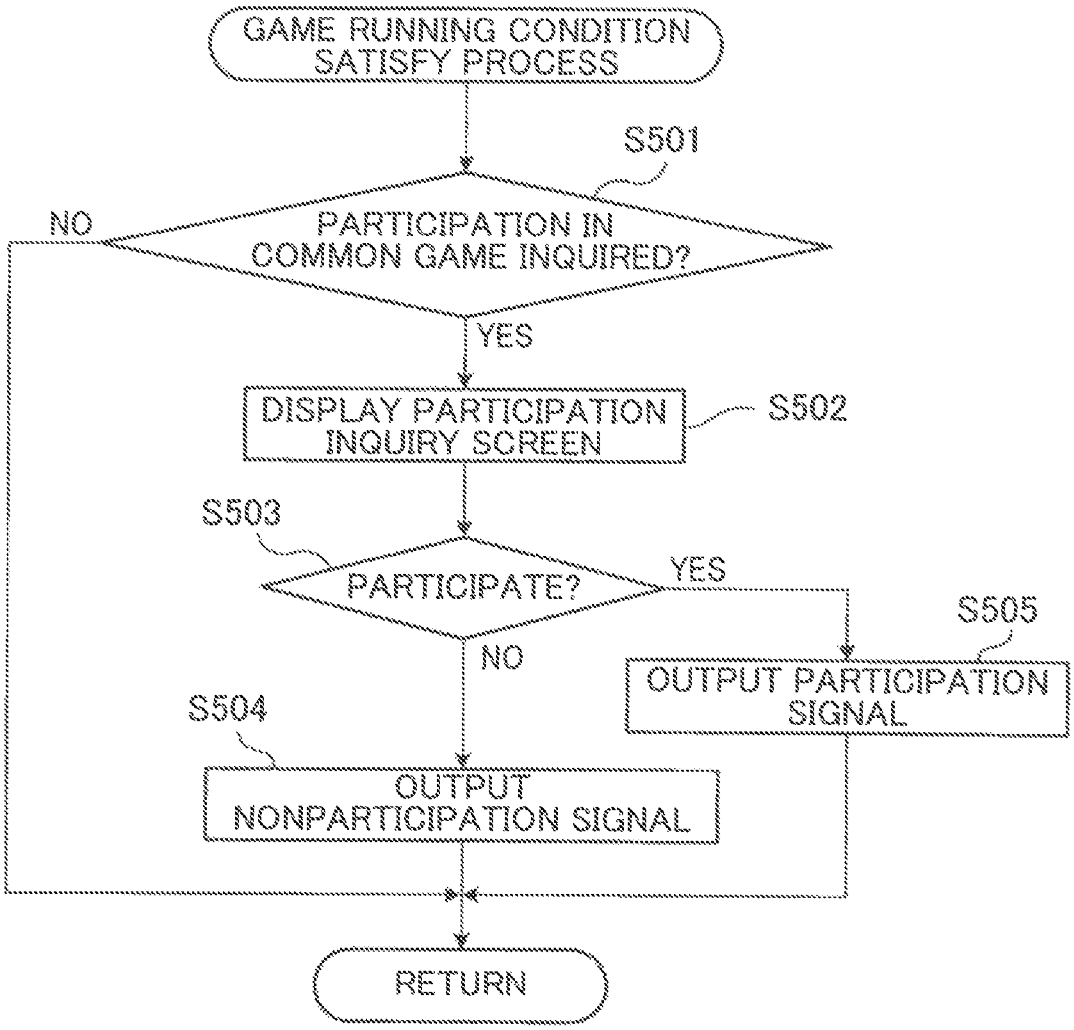
FIG. 32 is a flow chart showing a game running condition satisfy process.

When the game running condition satisfy process is run in step S50 of the terminal-side common game process, it is determined whether the slot machine 10 has received an inquiry from the center controller 200 about whether the slot machine 10 is participating in the common game, as shown in FIG. 32 (S501). When no inquiry is received (S501, Yes), it is determined that the slot machine 10 is qualified for a crap game by satisfying the game running condition, thus this routine ends.

Meanwhile, when the inquiry about participation in the common game is received (S501: YES), a participation inquiry screen is displayed, and the slot machine 10 asks the player whether he/she wishes to participate in the crap game, and how to participate in the crap game or how not to participate in the crap game is explained. An example of how to participate in the crap game is by displaying a participation button and an amount required for participation on the display screen, and making the player deposit the mount required for participation within a certain period of time after he/she has pushed the participation button. The amount required for participation may be the difference between the total bet amount placed on the base game and the minimum bet amount. Further, an example of how not to participate in the crap game is by displaying a nonparticipation button on the display screen, and making the player push the nonparticipation button (S502).

Thereafter, it is determined whether the slot machine 10 is participating in the crap game, based on the above method for how to and how not to participate in the crap game (S503). When the slot machine 10 participates in the crap game (S503, Yes), a participation signal is outputted to the center controller 200 (S505) before this routine ends. Meanwhile, when the slot machine 10 is not participating in the crap game (S503, NO), a nonparticipation signal is output from the center controller 200 (S504) before this routine ends.

(Operations of Slot Machine 10: Mode Selection Process)

Figure 33:
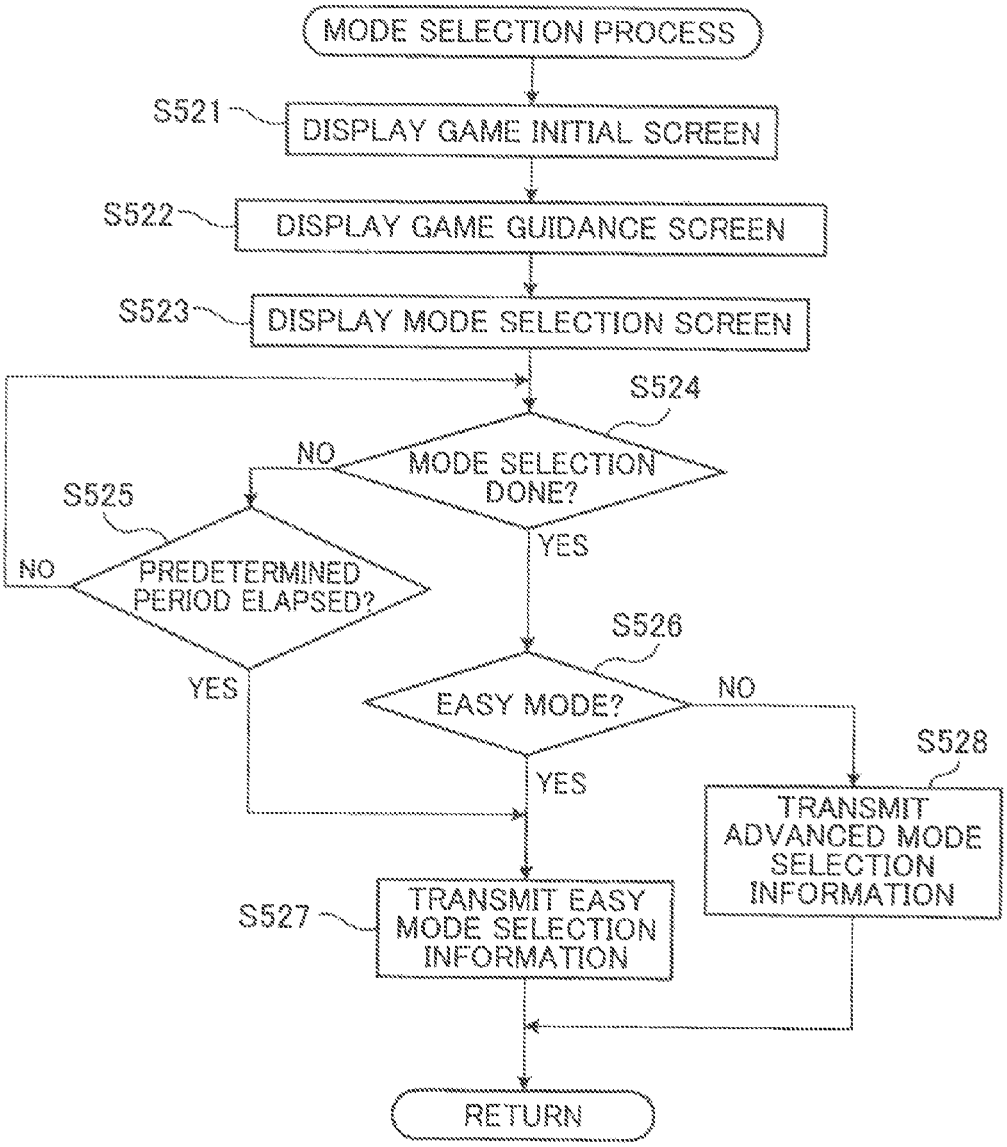
FIG. 33 is a flow chart showing a mode selection process.

When a mode selection process is executed in step S52 of the terminal-side common game process, a game initial screen is displayed as shown in FIG. 33 (S521). A game guidance screen is displayed after a certain period of time (S522) before a mode selection screen is displayed (S523).

Next, it is determined whether a mode selection is executed (S524). When no mode selection is executed (S524, No), it is determined whether a predetermined period of time has elapsed (S525). When the predetermined period of time has not elapsed (S525, No), S524 is re-run. Meanwhile, when the predetermined period of time has elapsed (S525, Yes), the easy mode is automatically selected, and easy mode selection information is transmitted, the information indicating that the easy mode is selected (S527), before this routine ends.

Meanwhile, when a mode selection is executed within the predetermined period of time (S524, Yes), it is sequentially determined whether the mode selected is the easy mode (S526). When the mode selected is the easy mode (S526, Yes), easy mode selection information is transmitted (S527) before this routine ends. Meanwhile, when the mode selected is not the easy mode (S526, No), advanced mode selection information indicating that the advanced mode is selected is transmitted (S528) before this routine ends.

(Operations of Slot Machine 10: Terminal-Side Bet Process)

Figure 34:
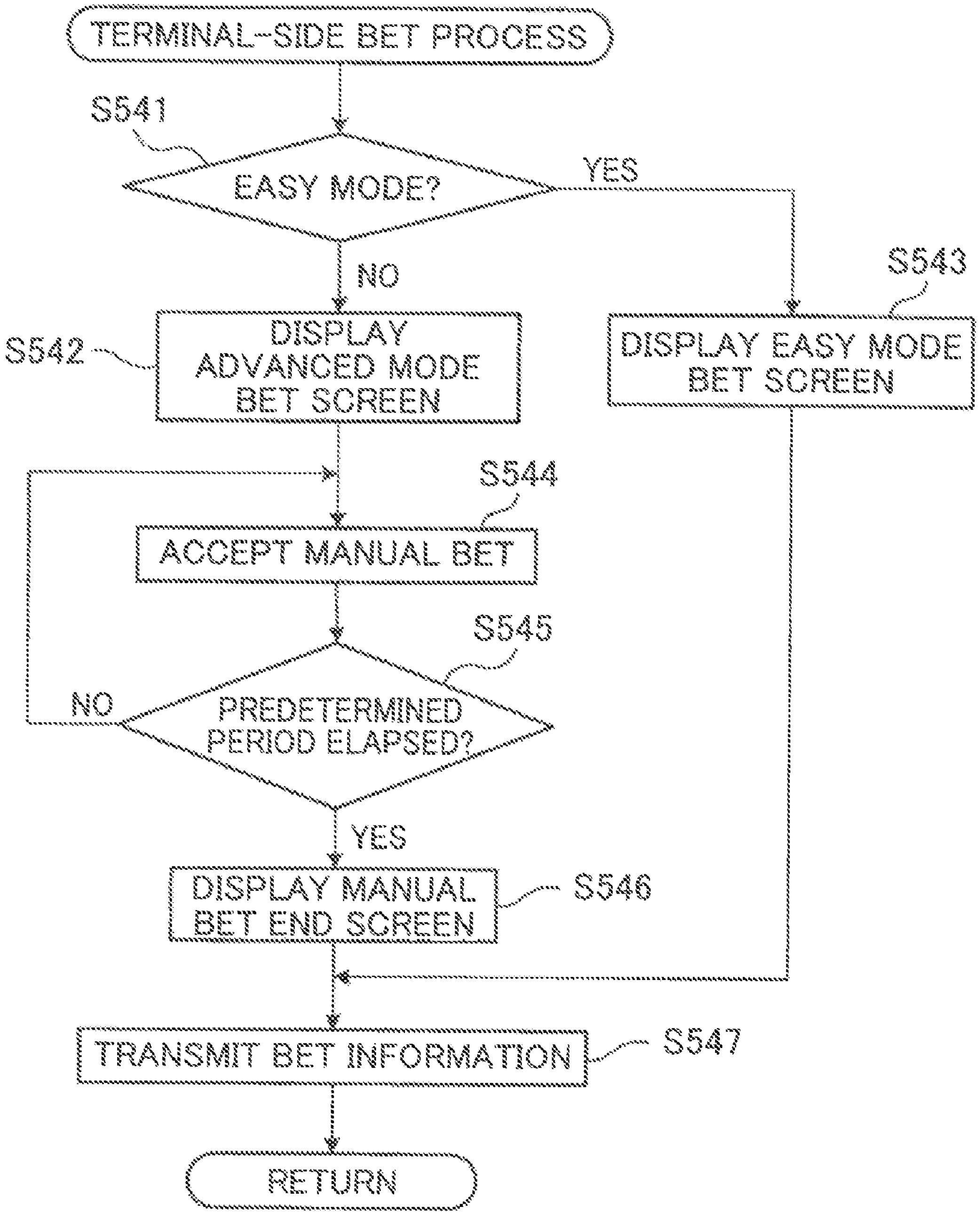
FIG. 34 is a flow chart showing a terminal-side bet process.

When a terminal-side bet process is executed in step S54 of the terminal-side common game process, it is determined whether the easy mode is selected, as shown in FIG. 34 (S541). When the easy mode is selected (S541, Yes), an easy mode bet screen is displayed, which easy mode bet screen allows a beginner to easily execute a bet operation (S543). Note that the easy mode bet screen may merely allow an automatic bet operation, or may switch from a manual bet operation to an automatic bet operation after a certain period of time. Afterwards, bet information related to an automatic or manual bet operation on the easy mode bet screen is transmitted (S547), before this routine ends.

Meanwhile, when the easy mode is not selected (S541, No), an advanced mode bet screen is displayed, which advanced mode bet screen is suitable for a skilled player who is familiar with the game (S542). Afterwards, a manual bet is accepted (S544), and it is determined whether a predetermined period of time has elapsed (S545). When the predetermined period of time has not elapsed (S545, No), step S544 is repeated. When the predetermined period of time has elapsed (S545, Yes), a manual bet end screen is displayed (S546). When a manual bet has been placed under such a circumstance, the manual bet amount placed is maintained. Meanwhile, when a manual bet operation has not been executed, an automatic bet is placed. Afterwards, bet information related to an automatic or manual bet operation on the advanced mode bet screen is transmitted (S547) before this routine ends.

(Operations of Slot Machine 10: Draw Process)

Figure 35:
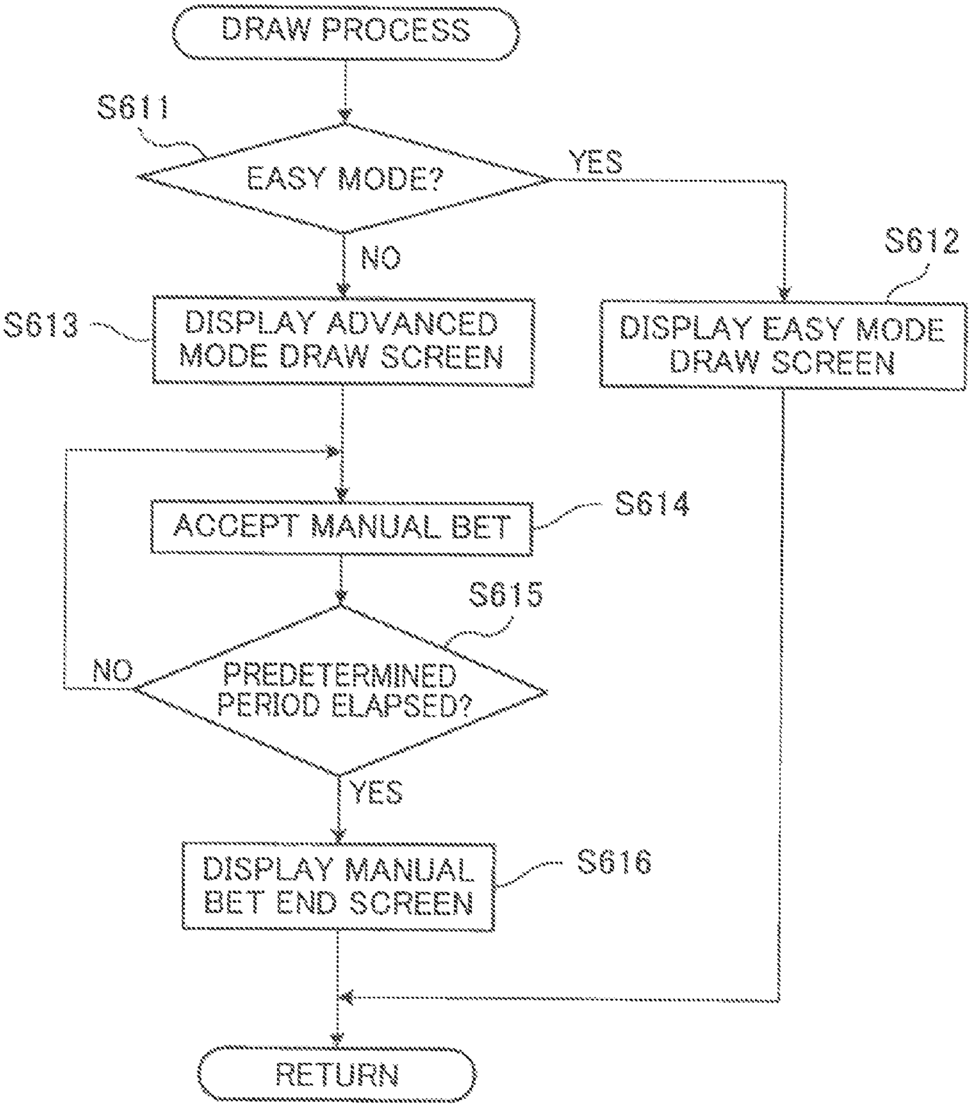
FIG. 35 is a flow chart showing a draw process.

When a draw process is executed in step S61 of the terminal-side common game process, it is determined whether the easy mode has been selected, as shown in FIG. 35 (S611). When the easy mode has been selected (S611, Yes), an easy mode draw screen is displayed (S612) before this routine ends.

Meanwhile, when the easy mode has not been selected (S611, No), it is determined that the advanced mode has been selected, and an advanced mode draw screen is displayed (S613). Afterwards, a manual bet is accepted (S614), and it is determined whether a predetermined period of time has elapsed (S615). When the predetermined period of time has not elapsed (S615, No), step S614 is repeated. Then, after the predetermined period of time has elapsed (S615, Yes), the manual bet end screen is displayed (S616) before this routine ends.

(Operations of Slot Machine 10: Terminal-Side skip Process)

Figure 36:
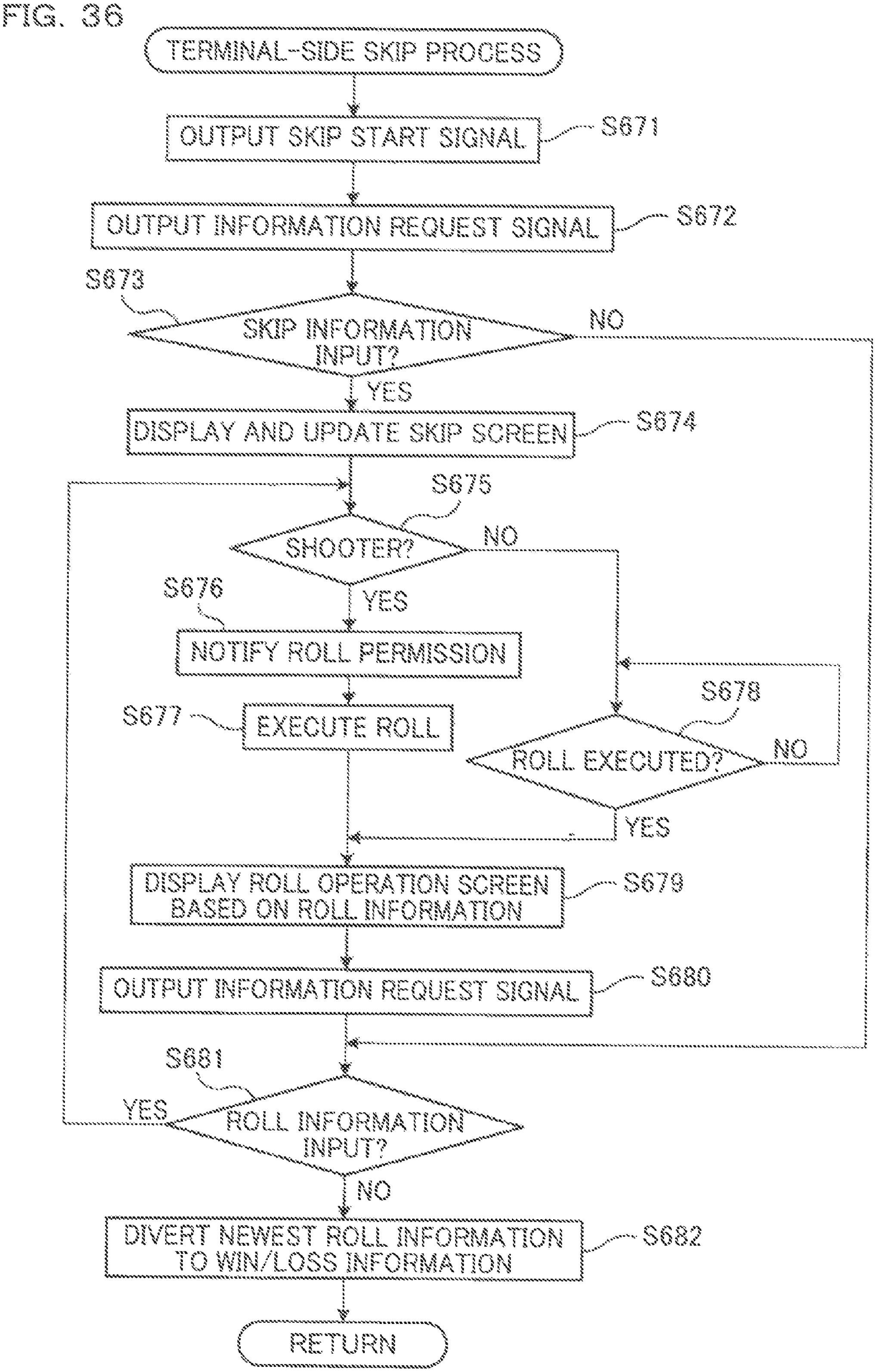
FIG. 36 is a flow chart showing terminal-side skip process.

When a terminal-side skip process is executed in step S67 of the terminal-side common game process, the center controller 200 outputs a skip start signal to execute the center-side skip process (S671), as shown in FIG. 36. Then, an information request signal is outputted in order to obtain skip information or roll information from the center controller 200 (S672).

Next, it is determined whether skip information is inputted (S673). When skip information is inputted (S673, Yes), a skip screen is displayed and updated (S674). Thereafter, it is determined whether the slot machine 10 is designated to be the shooter (S675). When the slot machine 10 is designated to be the shooter (S675, Yes), a roll permission is notified (S676) before a process for roll operation is executed (S677). Then, step S679 is executed. Meanwhile, when the slot machine 10 is not designated to be the shooter (S675, No), it is determined whether a roll operation is executed (S678), and the process is put in idle until a roll operation is executed (S678, NO). When a roll operation is executed (S678, Yes), step S679 is executed.

In step S679, a roll operation image based on roll information is displayed (S679). Then, an information request signal is outputted (S680), and it is determined whether roll information is inputted (S681). When it is determined that roll information is inputted (S681, Yes), step S675 is repeated. Meanwhile, when no roll information is inputted (S682), the newest roll information is diverted to win/loss information (S682) before this routine ends.

(Operations of Center Controller 200: Center-Side Common Game Process)

Figure 37:
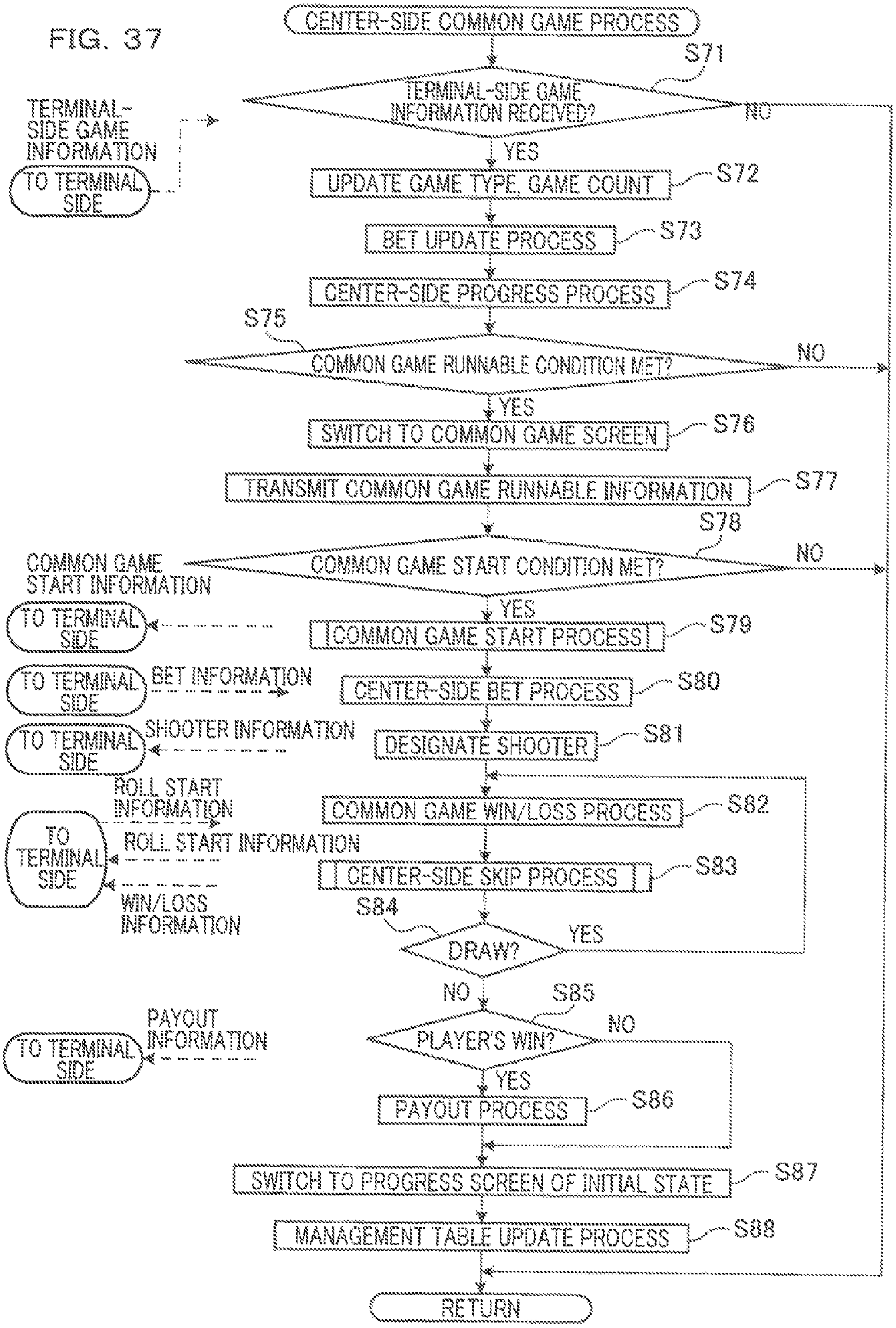
FIG. 37 is a flow chart showing a center-side common game process.

As shown in FIG. 37, the center controller 200 executes a center-side common game process while executing data communication with each slot machine 10. Specifically, it is first determined whether terminal-side game information from each of the slot machines 10 is received (S71). When no terminal-side game information is received (S71, No), this routine ends. Meanwhile, when the terminal-side game information is received (S71, Yes), various types of information included in the terminal-side game information is retrieved, and a gaming terminal management table of FIG. 21 is updated, which various types of information includes a game type, a game number, the machine number, and the bet amount (S72).

Afterwards, a bet update process is executed, and a part of a bet amount is stored for each bet amount Sn on the base game each time a base game is run, and the stored amount serves as a resource of a bet on a cap game and a payout of the crap game (S73).

Next, a center-side progress process showing a timing of transition from a slot game to a crap game is executed (S74). For example, the accumulated bet amount Bn of each slot machine 10 is compared with the event occurrence amount. When the result of the comparison at any one of the slot machine 10 indicate that the accumulated bet amount Bn exceeds the event occurrence amount, a game runnable condition satisfy flag is set to "1," indicating that the condition is satisfied. Meanwhile, the maximum accumulated bet amount Bn among the bet amounts Bn placed at the slot machine 10 does not exceed the event occurrence amount, the game runnable condition satisfy flag is reset to "0," indicating that the condition is not satisfied.

When the bet update process is executed as shown above, the game runnable condition satisfy flag is then referred to, and it is determined whether the common game runnable condition is met (S75). When the common game runnable condition is not met (S75, No), the routine ends, and the process is repeated from S71. Note that whether the common game runnable condition has been met may be determined by comparing a predetermined value with the total accumulated game count or a total accumulated bet amount.

When the common game runnable condition has been met (S75, Yes), the screen is switched from the progress screen to the common game screen (S76), as shown in FIG. 28. Then, common game runnable information is transmitted to each slot machine 10, the common game runnable information indicating satisfaction of the common game runnable condition (S77).

Next, a game status of a unit game of the regular game or bonus game at each slot machine 10 is retrieved, with reference to the gaming terminal management table of FIG. 21. Then, all the games "stop," and it is determined whether the common game start condition is satisfied at least one of the slot machine 10, which common game start condition is the cumulative value of the bet amount placed on the base game or the cumulative value of the game count of the base game has reached a predetermined value or more (S78). When the common game start condition has not been met (S78, No), the routine ends and the process is repeated from S71.

Figure 38:
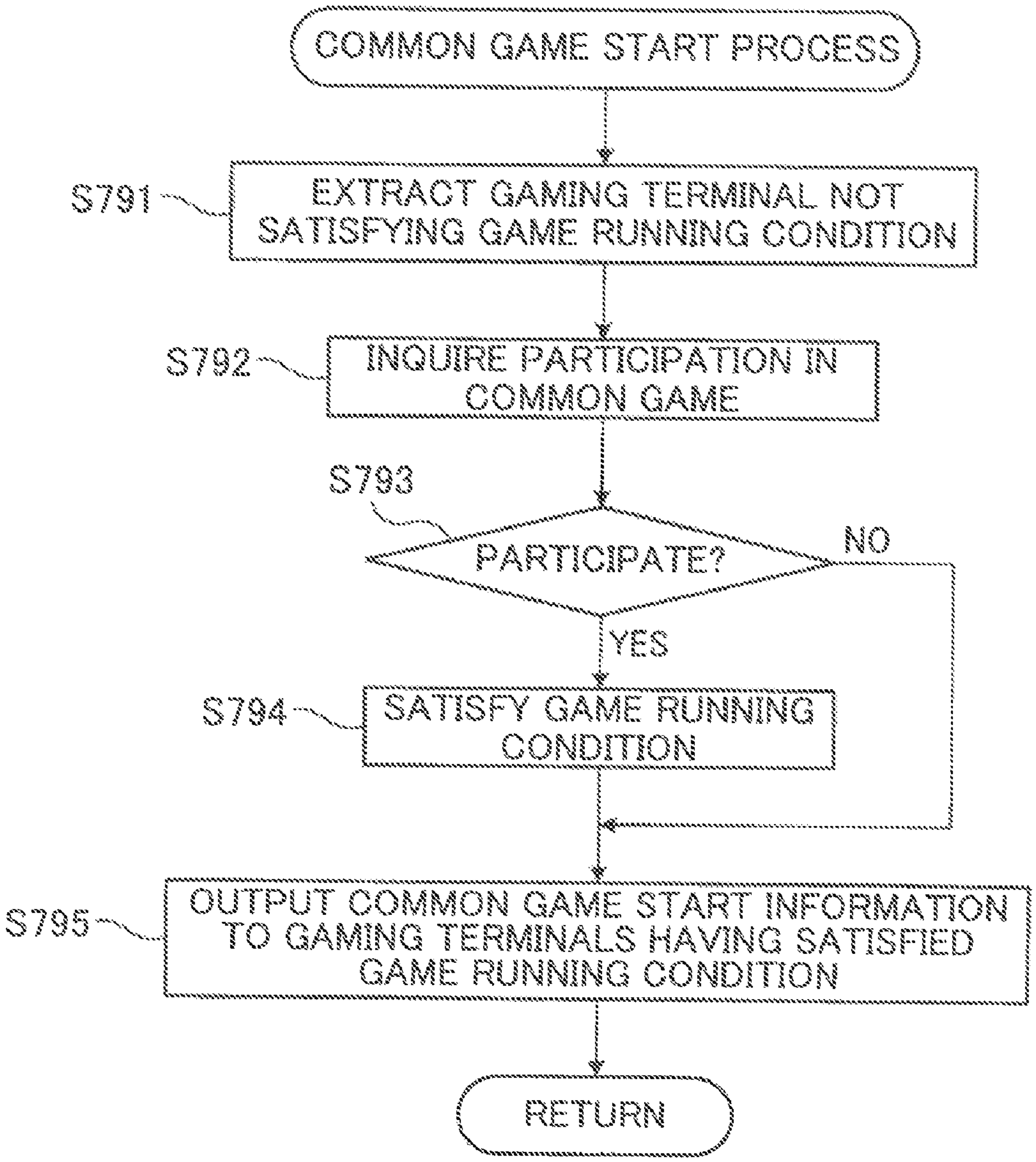
FIG. 38 is a flow chart showing a common game start process.

When the common game start condition is satisfied (S78, Yes), a common game start process is run (S79). That is, as shown in FIG. 38, a slot machine 10 (gaming terminal) is extracted, which is not qualified for participating in the crap game because the game running condition is not satisfied: i.e., the total bet amount in the base game falls short of the minimum bet amount, or the base game count is less than the minimum number of bets. (S791). Thereafter, a participation to the crap game is inquired in the extracted slot machine 10 (gaming terminal) (S792). It is determined whether each of the slot machines 10 will participate in the crap game, based on a participation or nonparticipation signal inputted from each of the extracted one or more slot machines 10 (S793). The game running condition stays unsatisfied at a slot machine 10 which will not participate in the crap game (S793, NO). Meanwhile, the game running condition is satisfied at a slot machine 10 which will participate in the crap game (S794, Yes). Afterwards, common game start information is outputted to a slot machine 10 having satisfied the game running condition (S795), and this routine ends.

Next, as shown in FIG. 37, a center-side bet process is executed based on bet information from each slot machine 10, and data of a common game management table of FIG. 22 is updated (S80).

Next, a shooter is randomly designated, and shooter information is transmitted to the designated specific slot machine 10 (S81). Next, a common game win/loss process is run at a timing that roll start information from the specific slot machine 10 is received (S82).

Specifically, first, roll start information is transmitted to a slot machine 10 having satisfied the game running condition, which roll start information indicating that a roll is executed. Then, a win/loss mode is randomly selected from three types of win/loss mode for the crap game as the common game. The three types of win/loss mode consist of win, loss, or draw.

Note that the random selection of the win/loss mode may be set in such a manner that the probability of each mode being selected differs among the mode. For example, the win/loss mode indicating "draw" may be selected with a greater probability than the other types of win/loss mode. When a win/loss mode is selected, win/loss information indicating a selected win/loss mode is transmitted to a slot machine 10 having satisfied the game running condition.

Thereafter, a center-side skip process is executed, and the center-side skip process is repeated until a win/loss mode is randomly selected, or until a win or loss is resulted, on condition that a skip start signal is received from the slot machine 10 (S83).

Thereafter, it is determined whether the win/loss mode selected in the common game win/loss process indicates a draw (S84). When the win/loss mode indicates a draw (S84: YES), the common game win/loss process of step S82 is executed with the same shooter. Note that when the win/loss mode selected is "draw," the next shooter may be designated. In this case, the shooter may be (i) randomly selected from all the slot machines 10 having satisfied the game running condition, (ii) sequentially selected from the slot machines 10 in the descending order of the total value of the bet amount or the game number at the slot game, or (iii) sequentially selected in the order of the arrangement of the slot machines 10, or in the order of machine number.

Meanwhile, when the win/loss mode is not "draw" (S84, No), it is subsequently determined whether the player wins or not (S85). When the player wins (S85, Yes), a payout amount at each slot machine 10 is calculated, and payout information indicating the payout amount is transmitted to each slot machine 10 (S86) before S87 is run. Meanwhile, when the player loses (S86, No), S87 is immediately run. In other words, the crap game screen is switched to the progress screen at the initial state (S87). A common game management table of FIG. 21 is updated thereafter (S88), and this routine ends.

(Operations of Center Controller 200: Center-Side Skip Process)

Figure 39:
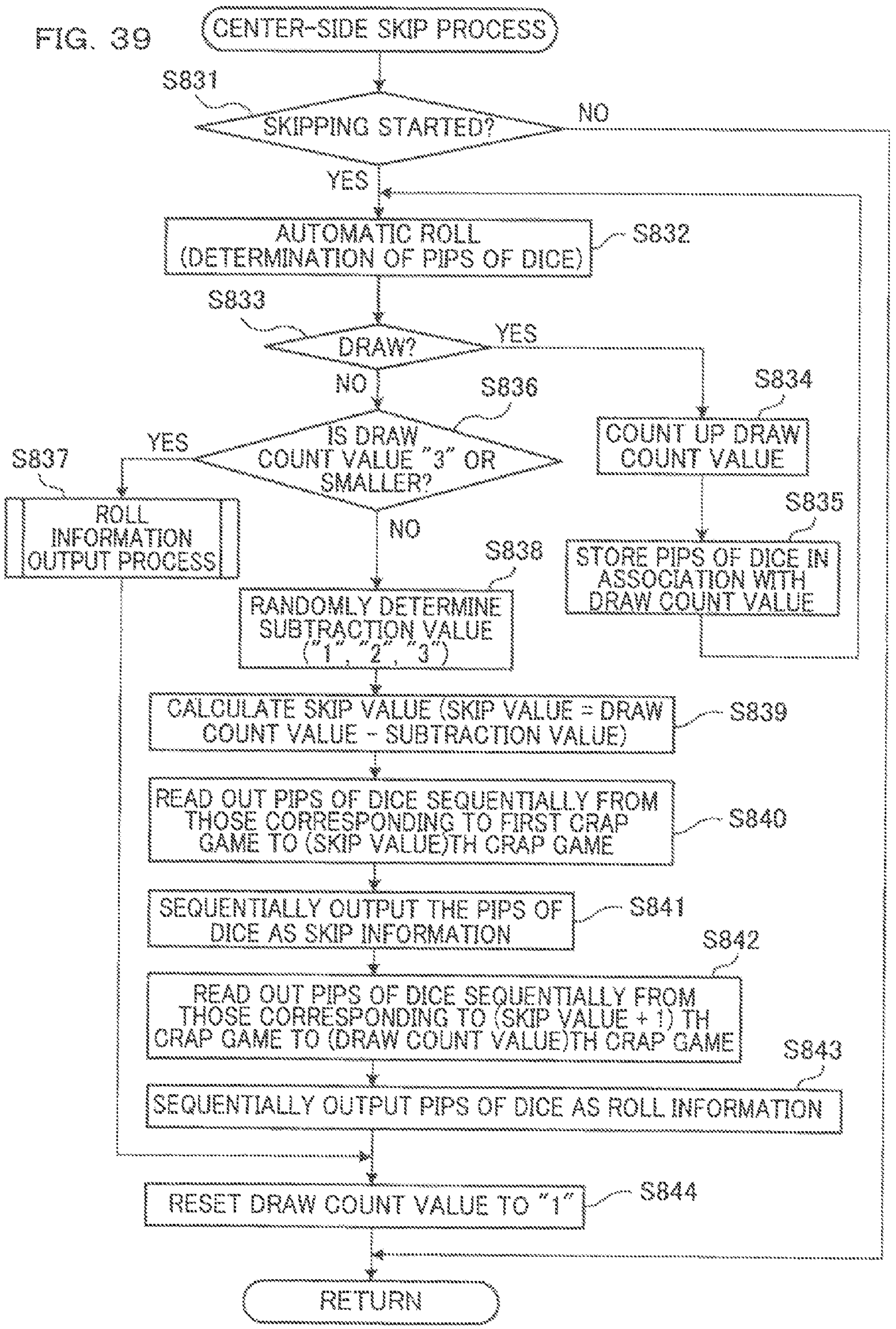
FIG. 39 is a flow chart showing a center-side skip process.

As shown in FIG. 39, when a center-side skip process is executed in step S83, it is first determined whether skipping is executed, depending on whether a skip start signal is received from a slot machine 10 (S831). When skipping is not to be started (S831: NO), this routine ends. Meanwhile, when a skip start signal is received and thus skipping is to be started (S831: YES), an automatic roll process is executed, and pips of dice are randomly determined (S832).

Then, it is determined whether the crap game ends in a draw with the pips of dice (S833). When the crap game ends in a draw (S833: YES), the draw count value is counted up (S834), and the pips of dice are stored in association with the draw count value (S835)(see die pip storage table of FIG. 23). Step S832 is repeated, and the next automatic roll process is executed.

Meanwhile, when the crap game does not end in a draw (S833: NO), it is determined whether the draw count value is "3" or smaller (S836). When the draw count value is not equal to or less than "3" (S836: NO), one subtraction value is determined from among "1," "2," and "3" (S838). Then, the subtraction value is subtracted from the draw count value, to obtain a skip value (S839). The pips of dice resulted in each game in the skip process are read out sequentially from the first game to the (skip value)th game (S842), and are sequentially output as the roll information (S843). Then, the draw count value is reset to "1" (S844) and this routine ends.

Meanwhile, when the draw count value is equal to or smaller than "3" (S836: YES), a roll information output process is executed (S837).

Figure 40:
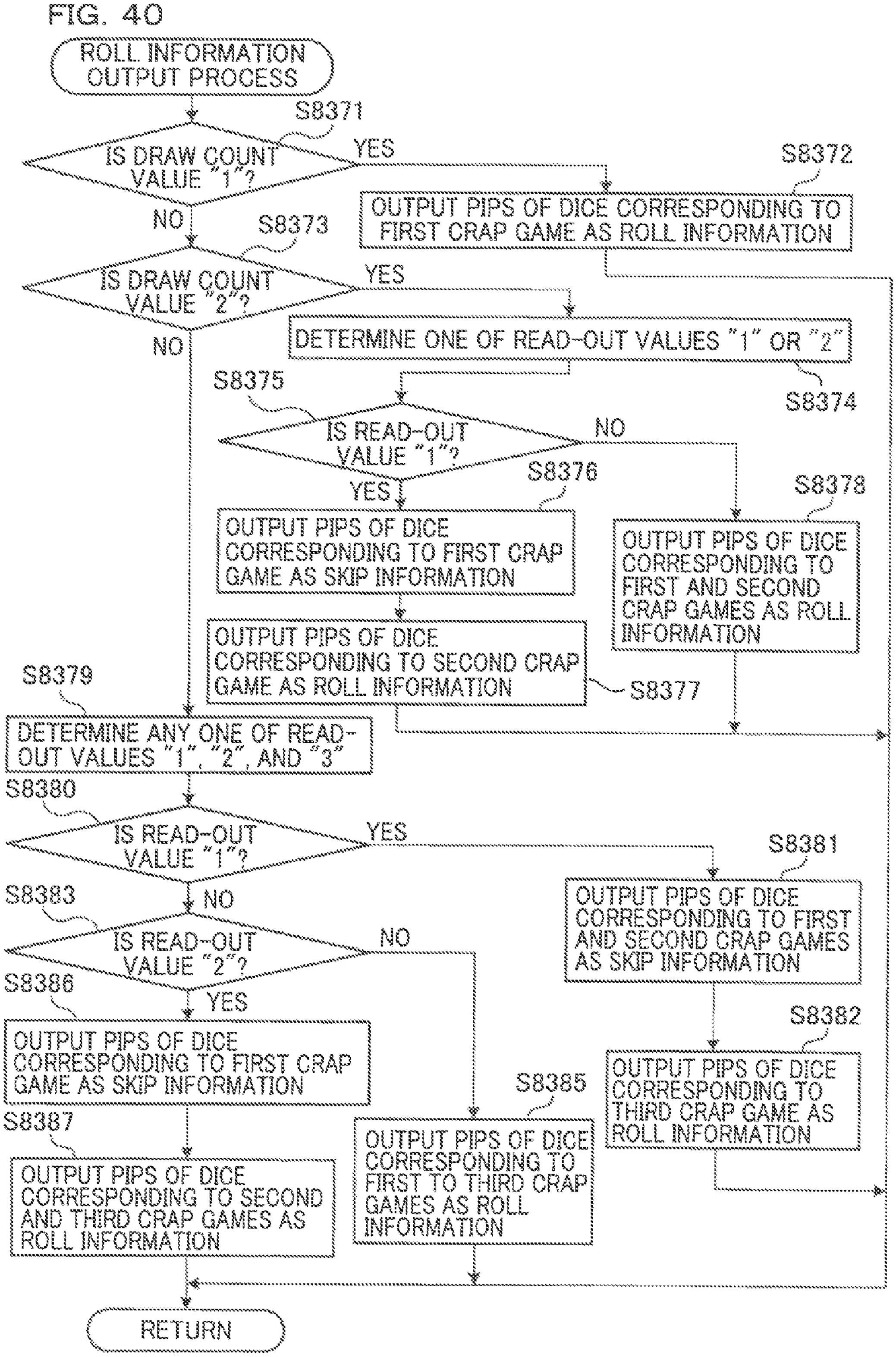
FIG. 40 is a flow chart showing a roll information output process.

In other words, as shown in FIG. 40, it is determined whether the draw count value is "1" (S8371). When the draw count value is "1" (S8371: YES), the pips of dice corresponding to the first game in the skip process is outputted as roll information (S8371), and this routine ends. Thus, when a win or loss is resulted from the first automatic roll in the center-side skip process, a roll effect is executed in relation to a game result of the first crap game indicating a win or loss.

When the draw count value is not "1" (S8371: NO), it is sequentially determined whether the draw count value is "2" (S8373). When the draw count value is "2" (S8373: YES), one of "1" or "2" is randomly determined as a read-out value (S8374). After that, there is determined whether the read-out value thus determined is "1" (S8375). If the read-out value is "1" (S8375: YES), the pips of dice of the draw game corresponding to the first game in the skip process are output as the skip information (S8376). Then, this routine will end after outputting as roll information the pips of dice of the final game having resulted in a win or loss, which corresponds to the draw count value of "2" (S8377). On the other hand, when the read-out value determined is not "1" (S8375, NO), the pips of dice corresponding to the first and second games in the skip process are sequentially output as the roll information (S8378), and the routine ends thereafter. Thus, in the center-side skip process, when a win or loss results from the second automatic roll, a roll effect is executed in relation to a game result of the first or second crap game, which indicates a win or loss.

When the draw count value is not "2" (S8373: NO), it is determined that the draw count value is "3", and then one of "1", "2", and "3" is randomly determined as a read-out value (S8379). After that, there is determined whether the read-out value thus determined is "1" (S8380). If the read-out value is "1" (S8380: YES), the pips of dice of the draw game corresponding to the first and second games in the skip process are output as the skip information (S8381). Then, this routine will end after outputting as roll information the pips of dice of the final game having resulted in a win or loss, which corresponds to the draw count value of "3" (S8382).

On the other hand, when the read-out value determined is not "1" (S8380, NO), there is determined whether the read-out value determined is "2" (S8383). If the read-out value is "2" (S8383: YES), the pips of dice of the draw game corresponding to the first game in the skip process are output as the skip information (S8386). Then, this routine will end after outputting as roll information the pips of dice corresponding to the draw count values of "2" and "3" (S8387). On the other hand when the read-out value determined is not "2" (S8383, NO), this routine will end after outputting as roll information the pips of dice corresponding to the draw count values of "1" to "3" (S8385).

Thus, in the center-side skip process, when a win or loss results from the third automatic roll, a roll effect is executed in relation to a game result of any one of the first to third crap games, which indicates a win or loss.

Modification 1

In the above embodiment, the skip count is determined by randomly deriving the number of times the crap game is repeated after skip process (subtraction value, read-out value); however, the present invention is not limited to this. That is, in the gaming machine of the present invention, the count of crap games to result in draw (i.e. repetition count) is set to "3" or the like beforehand, and a win or loss is resulted in the first game run after the skip process executed when the number of crap games resulting in a draw exceeds this repetition count. In this case, a win or loss is resulted at or before the fourth crap game without fail; i.e., a win or loss is resulted within a predetermined count of crap games. It is therefore easily possible to prevent the crap game from being repeated for an excessively long period of time.

Figure 41:
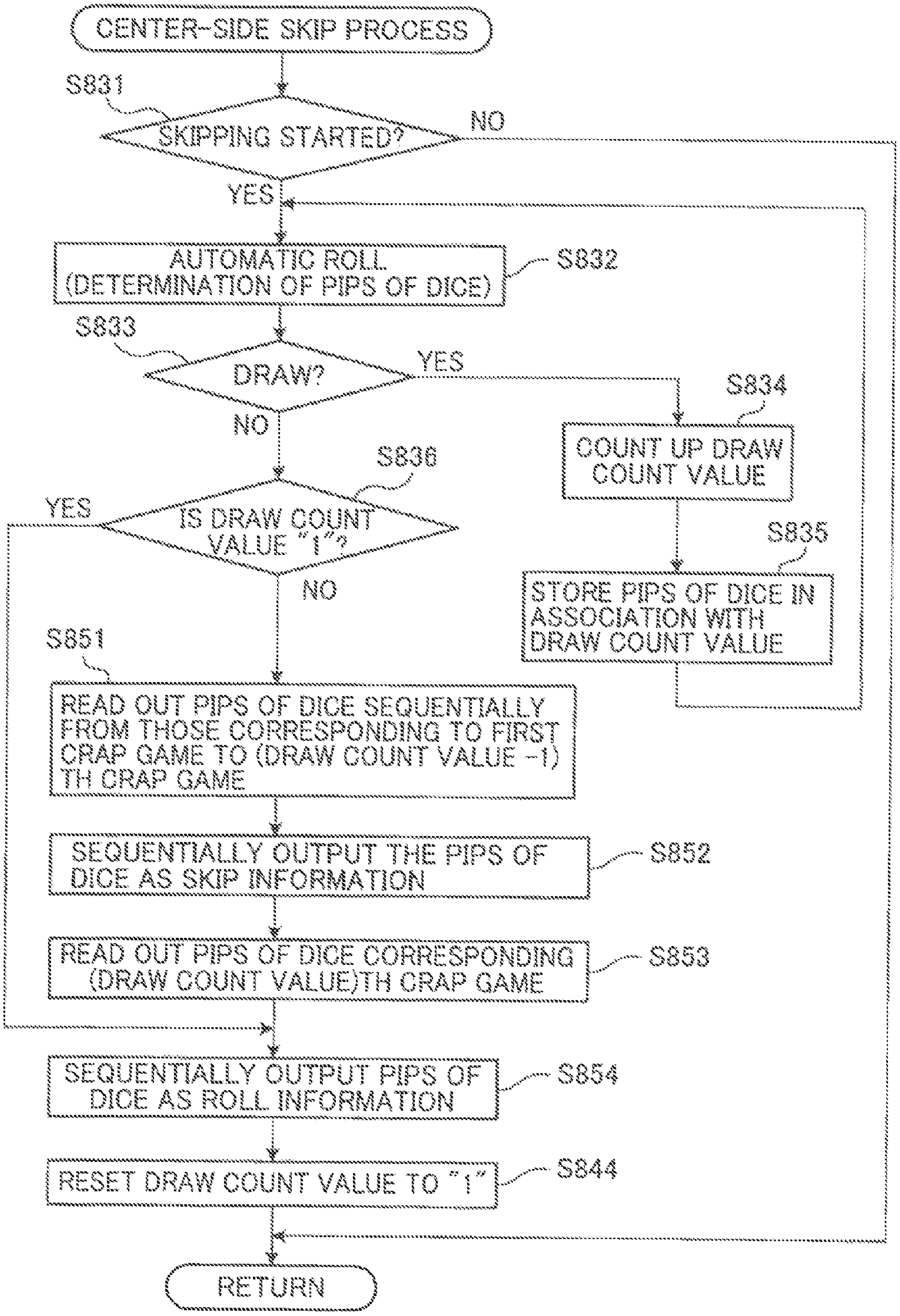
FIG. 41 is a flow chart showing a center-side skip process.

Specifically, when the crap game of the easy mode results in a draw three times in a row, the center-side skip process of FIG. 41 is executed. Then, the pips of dice is determined by the automatic roll (S832). When it is determined that a win or loss is resulted (S833, NO), there is determined whether or not the draw count value is "1" (S836). When the draw count value is "1", that is, when a win or loss is determined by the pips of dice determined in the first game after the skip process (S836, YES), those pips of dice are output as the roll information (S854).

On the other hand, when the draw count value is not "1", that is, when a win or loss is determined by the pips of dice determined in the second game after the skip process or any game thereafter (S836, NO), the pips of dice resulted in each game in the skip process are read out sequentially from the first game to the (draw count value−1)th game (S851), and are sequentially output as the skip information (S852). After that, the pips of dice determined in the (draw count value)th game are read out (S853), and are output as the roll information (S854).

As is understood from the above, the crap games of the easy mode are processed so as to result in a win or loss at or before the first game after the skip process. Therefore, when the crap game results in a draw three times in a row, a win or loss is resulted at the fourth game without fail. The other steps are identical to those of the center-side skip process shown in FIG. 39, and explanations therefor are omitted here.

Modification 2

Further, the gaming machine of the present invention may be adapted so that a count of common games re-executed (re-execution count) from the start till the common game resulting in a win or loss is randomly determined, and the number of game results to be skipped (skip count) is determined so that the skip count equals the re-execution count. Such a skip process of crap games is realized by replacing the terminal-side common game process of FIG. 31, the center-side common game process of FIG. 37, and the center-side skip process of FIG. 39, with the processes of FIG. 42 to FIG. 44, respectively.

Figure 42:
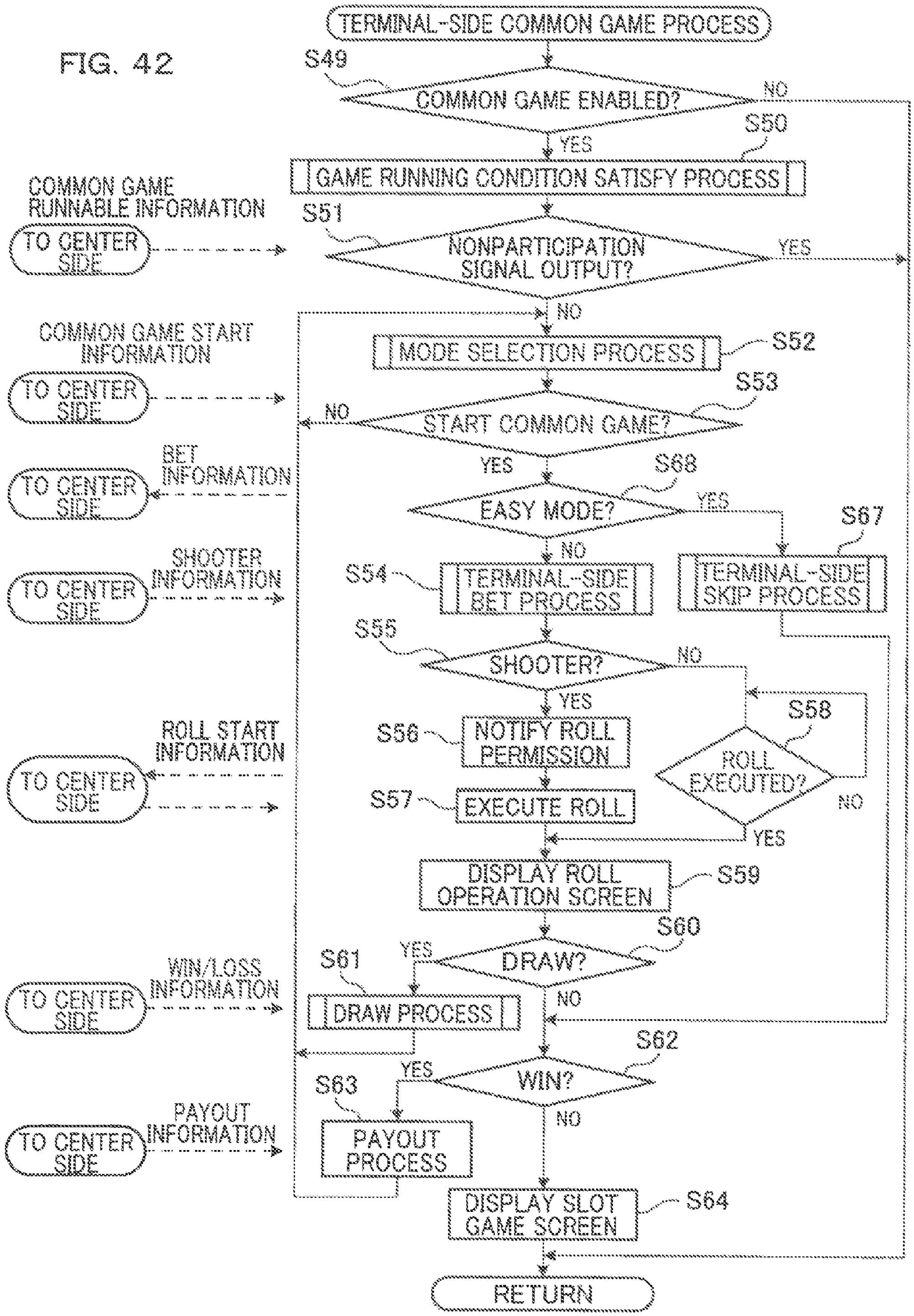
FIG. 42 is a flow chart showing a terminal-side common game process.

Specifically, in the terminal-side common game process shown in FIG. 42, when a common game is started after the mode selection process (S52) (S52, YES), there is determined whether the easy mode is selected (S68). If the easy mode is not selected (S68, NO), it is determined that the advanced mode is selected, and the crap game is run and displayed on the roll execution screen (S54 to S64). On the other hand, when the easy mode is selected (S68, YES), the terminal-side skip process is executed, and the crap game is run a predetermined number of times based on the skip information and the roll information from the center controller 200 (S67). Then, a win or loss of the crap game is determined (S62). The other steps are identical to those of the terminal-side common game process shown in FIG. 31, and explanations therefor are omitted here.

Figure 43:
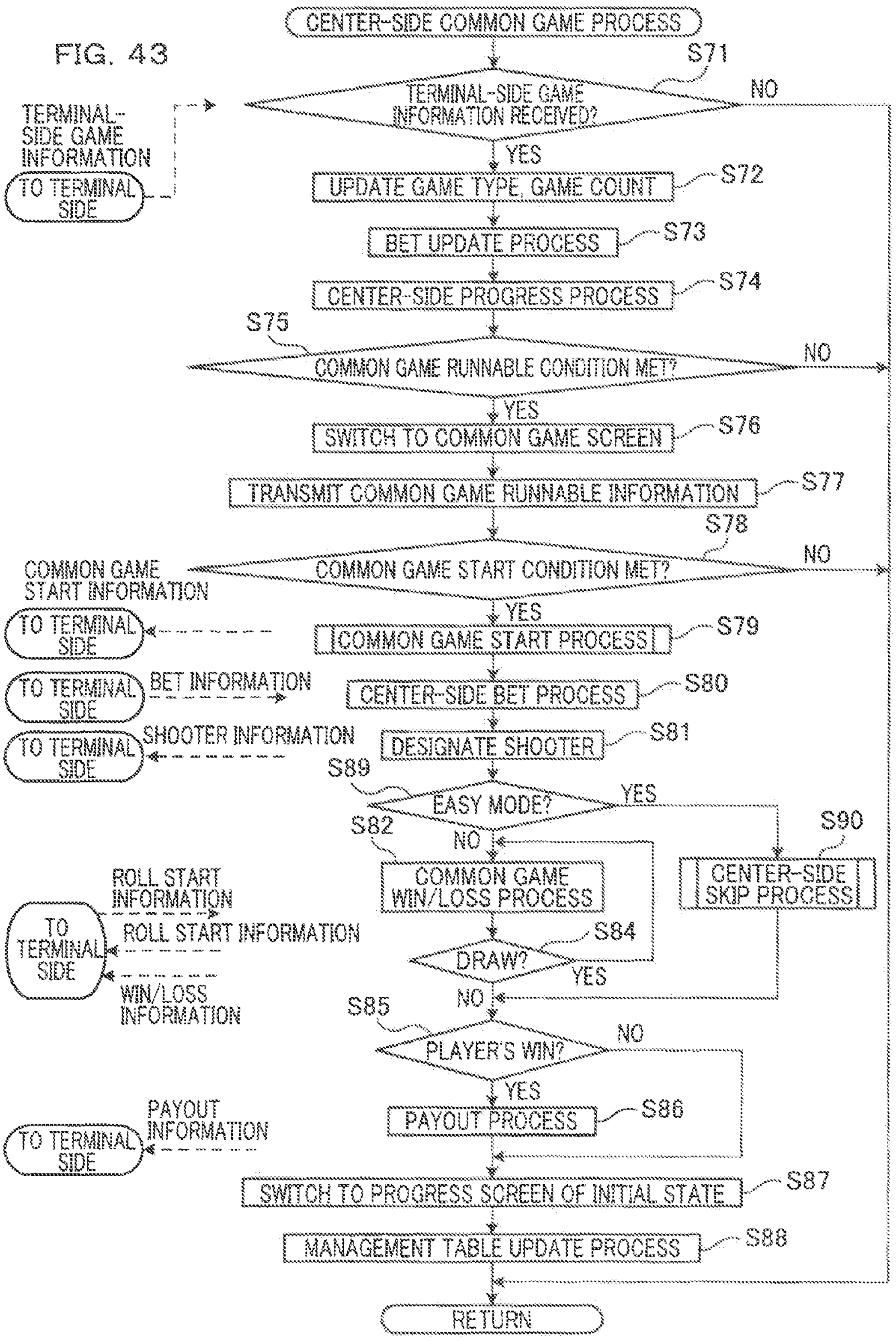
FIG. 43 is a flow chart showing a center-side common game process.

Further, a center-side skip process which forms and outputs the skip information and the roll information to be used in the above mentioned terminal-side skip process is executed in the center-side common game process, as shown in FIG. 43 (S90). Specifically, after designation of the shooter is executed (S81), there is determined in each of the slot machines 10 whether or not the easy mode is selected (S89). If the easy mode is not selected (S89, NO), it is determined that the advanced mode is selected and determination of a win or loss and payout process or the like of the advanced mode are executed (S82 to S88). On the other hand, if the easy mode is selected (S89, YES), the center-side skip process is executed (S90), and win-or-loss determination of the easy mode is executed (S85). The other steps are identical to those of the terminal-side common game process of FIG. 31, and explanations therefor are omitted here.

Figure 44:
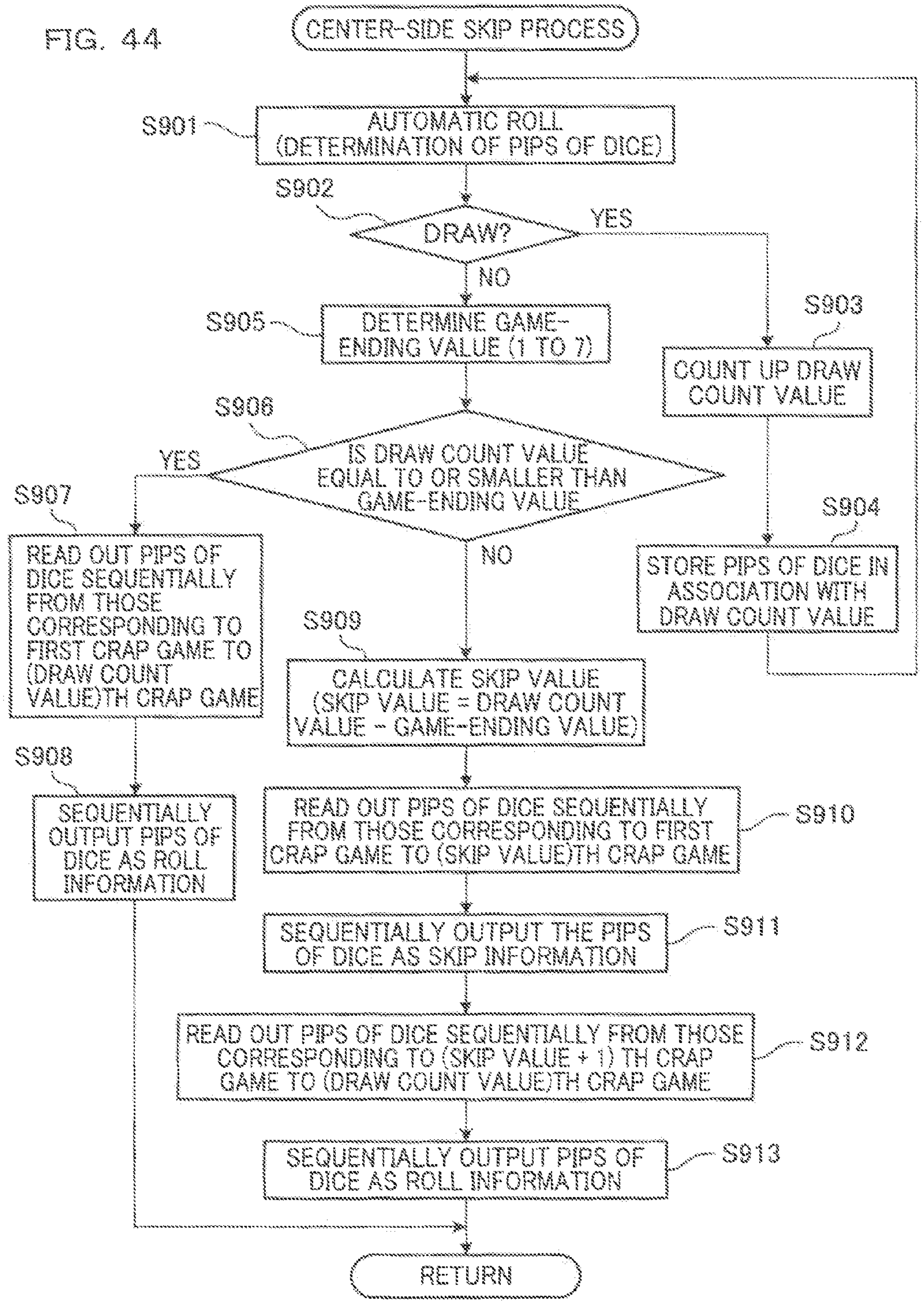
FIG. 44 is a flow chart showing a center-side skip process.

As shown in FIG. 44, in the center-side skip process, the automatic roll is executed (S901), and then there is determined whether the game resulted in a draw (S902). If the game resulted in a draw (S902, YES), the draw count value is counted up (S903), and then the pips of dice is stored in association with the draw count value (S904). Then, S901 is executed again.

On the other hand, if the game does not result in a draw (S902, NO), one of "1" to "7" is randomly determined as the game-ending value (S905). Then, there is determined whether or not the draw count value is equal to or less than the game-ending value (S906). When the draw count value is equal to or less than the game-ending value (S906, YES), the pips of dice resulted in each game in the skip process are read out sequentially from the first game to the (draw count value) th game (S907), and are sequentially output as the roll information (S908). This routine ends thereafter. Thus, when the draw count value is equal to or less than the game-ending value, the crap game is repeated a number of times corresponding to the game-ending value, without executing the skip process.

On the other hand, if the draw count value is greater than the game-ending value (S906, YES), the game-ending value is subtracted from the draw count value to calculate the skip value (S909). Then, the pips of dice resulted in each game in the skip process are read out sequentially from the first game to the (skip value)th game (S910), and are sequentially output as the skip information (S911). After that, the pips of dice are read out sequentially from the (skip value+1)th game to the (draw count value)th game (S912), and are sequentially output as the roll information (S913). This routine ends thereafter. Thus, when the draw count value is greater than the game-ending value, the crap game is repeated a number of times corresponding to the game-ending value, after the skip process.

(Game Procedure)

Figure 45:
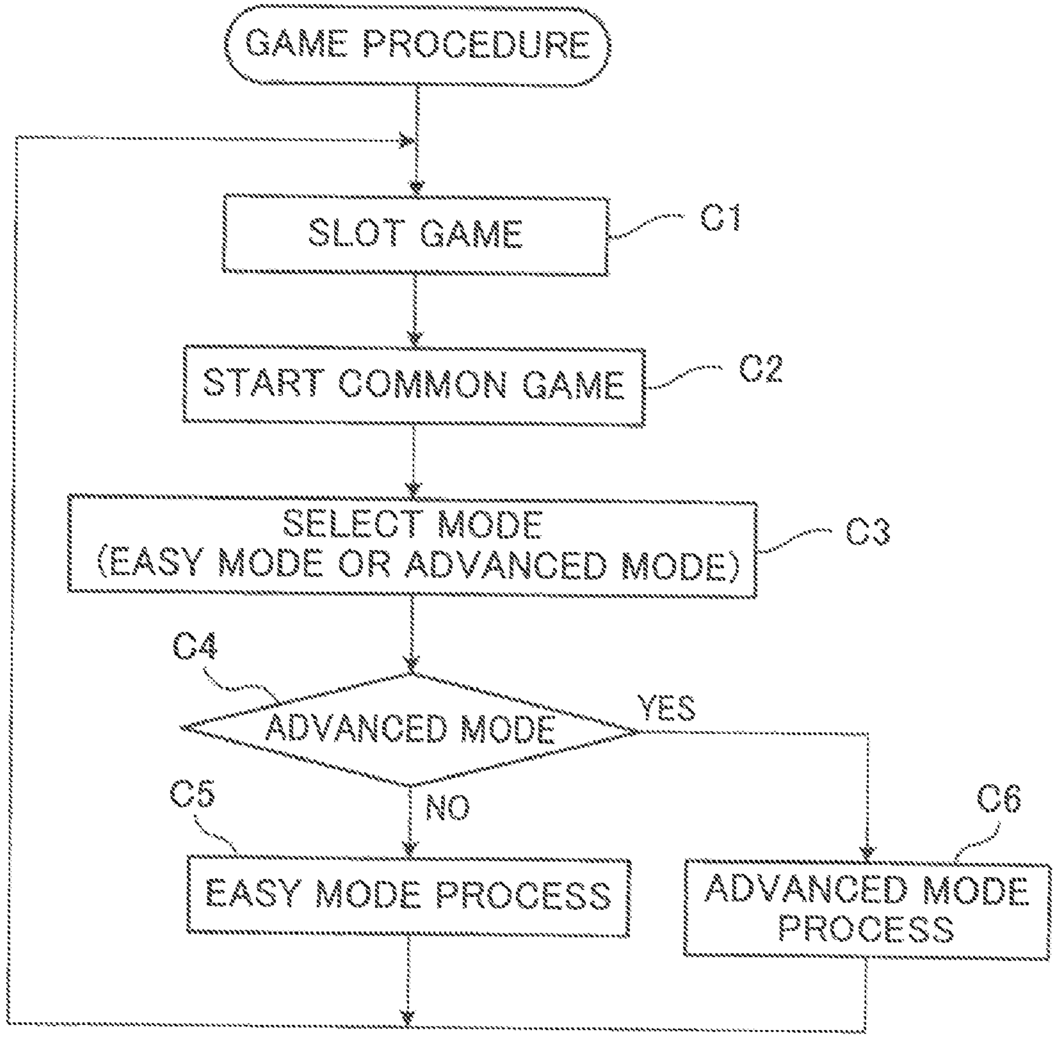
FIG. 45 is a flow chart showing a game procedure of the crap game.

The following details a game procedure realized by executing various processes in line with the above mentioned flowcharts. A slot game which is the base game is run as shown in FIG. 45. From the bet amount of the slot game, the base bet amount and the special bet amount are collected as the bet amount for a common game (C1). When the common game start condition is satisfied while the slot game is repeated, the common game is started (C2). That is, the slot game screen on the symbol display device 16 is switched to a "CRAP GAME" starting screen, and then a guidance screen explaining the game is displayed for a predetermined period.

After that, the displaying is switched to the mode selection screen, and there is determined whether the game mode is the advanced mode (C4). When an easy mode button on the mode selection screen is pressed, the easy mode process is executed (C5). On the other hand, when an advanced mode button on the mode selection screen is pressed, the advanced mode process is executed (C6).

(Game Procedure: Easy Mode Process)

Figure 46:
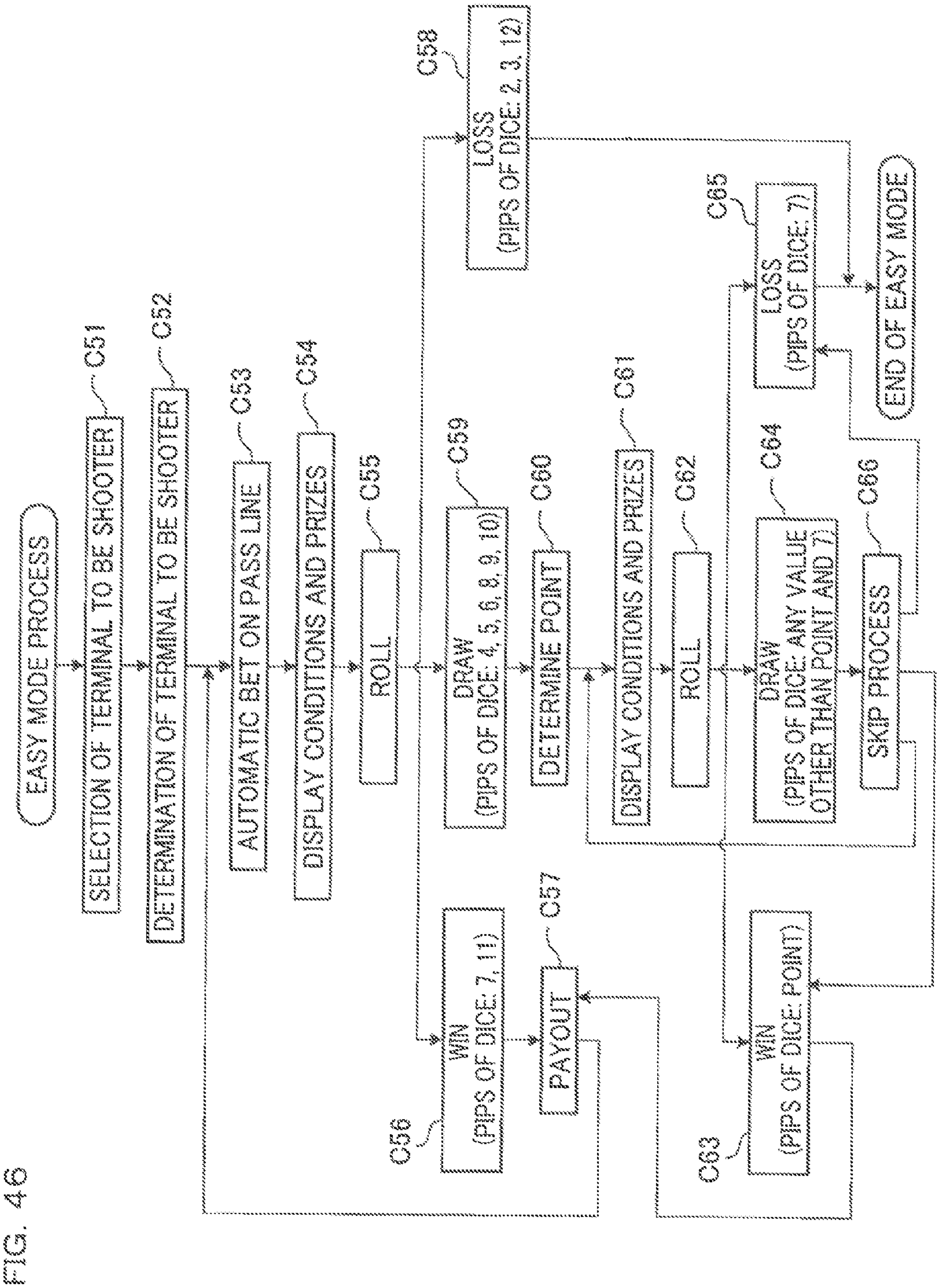
FIG. 46 is a flow chart showing an easy mode process.

When the easy mode process shown in FIG. 46 is selected, there is displayed an image of respective front faces of aligned slot machines 10, and the shooter is selected (C51). Then, the shooter is determined, and an image of the machine designated to be the shooter is emphasized (C52). There is displayed a crap game screen of the easy mode in which winning/losing conditions are simplified, and the automatic bet is executed. Note that, for the automatic bet is used the base bet amount and the special bet amount collected from the bets in the slot game (C53). Then, conditions and the prize in relation to the automatic betting are displayed. Specifically, the winning conditions, draw conditions, and losing conditions are indicated in the form of numbers, and in the form of a combination of die images. Further, there is displayed the prize that could be won in the game (C54).

Next, the roll is executed in the slot machine 10 designated to be the shooter. Specifically, a roll screen is displayed in the slot machine 10 designated to be the shooter. The roll screen prompts the player to enter a roll operation by displaying the time remaining for entering the roll operation. When the roll button 902 is pressed before elapse of the remaining time, a movie showing rolling dice image 905 at the timing of operating the button 902. On the other hand, when the roll button 902 is not pressed before the remaining time elapses, the movie showing the rolling dice image 905 is displayed when the remaining time is counted down to "0" (C55).

A winning is achieved when the pips of dice resulted from the rolling is either "7" or "11" (C56). Then, a prize corresponding to the bet amount is awarded. For example, when a still dice image 905 showing a combination of pips of the dice that add up to "7" is displayed, a prize of "$150.20" or the like is displayed (C57). After that, an automatic bet on a pass line in C53 is executed and the next crap game is executed.

Further, a loss is resulted when "2", "3", or "12" is resulted from the rolling. For example, when a still image of the dice image 905 shows a combination of pips of dice that add up to "2", text showing a loss is indicated. Then, the easy mode is ended (C58).

Further, the game results in a draw when "4", "5", "6", "8", "9", or "10" are resulted from the rolling (C59). Then, the point is determined (C60). For example, when a still image of the dice image 905 shows a combination of pips of dice that add up to "5", text indicating a draw is displayed, and point "5" is pop-up displayed.

After this, winning conditions, losing conditions, draw conditions, and prizes of the crap game are displayed. Specifically, the winning conditions, draw conditions, and losing conditions are indicated in the form of numbers and in the form of images of a combination of dice. Further, the prize awarded when a winning is achieved is displayed (C61).

Next, the roll screen is displayed. When the roll button 902 is operated before the countdown ends, a player-entered roll operation is executed. When the count down value reaches "0" before the entry of the roll button 902, the roll operation is automatically executed (C62). When "5" results from the roll, the number matches with the point "5", and a winning therefore is achieved (C63). Then, the prize of "$150.20" displayed is awarded (C57). After that, the next crap game is started, and an automatic bet on a pass line in C53 is executed.

Further, a loss is resulted when the pips of dice resulted from rolling add up to "7" (C65). Text indicating the loss is displayed for a predetermined period, and then the easy mode is ended. Further, the game results in a draw when the pips of dice resulted from the roll is other than the point "7", such as "9" (C64). In this case, C61 is executed until the game results in a draw for a predetermined number of times in a row. For example, when the game results in a draw for a predetermined number of times in a row, determination of a game result by roll is collectively executed sequentially in relation to a series of games until the game result other than a draw is to occur. From the series of game results, at least a part of draw game results are skipped, and crap games of the remaining game results are successively executed. When the game result of a crap game is a winning, C63 is executed. On the other hand, when the game result of a crap game is a loss, then C65 is executed (C66).

(Game Procedure: Advanced Mode Process)

Figure 47:
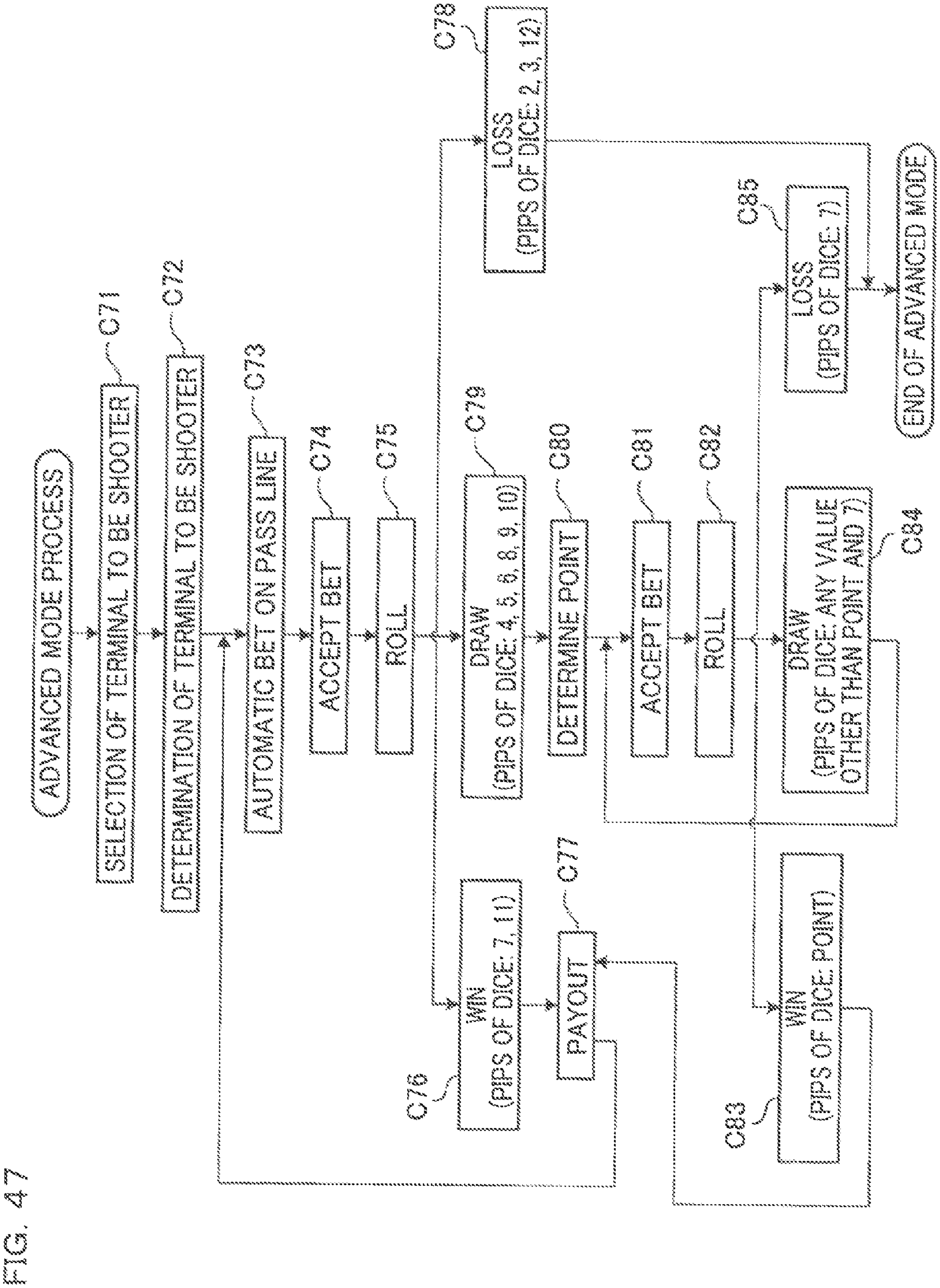
FIG. 47 is a flow chart showing an advanced mode process.

When the advanced mode process shown in FIG. 47 is selected, there is displayed an image of respective front faces of aligned slot machines 10, and the shooter is selected (C71). Then, the shooter is determined, and an image of the machine designated to be the shooter is emphasized (C72).

Next, an advanced mode bet screen is displayed which shows the surface of table used in crap games. Then, automatic bet is executed on a pass line. Note that, for the automatic bet is used the base bet amount and the special bet amount collected from the bets in the slot game (C73). Further, manual betting is enabled. When the manual betting is enabled, count down of the time for accepting the manual betting is started. When the counted value reaches "0", the manual betting is disabled, and an image is pop-up displayed to indicate that manual betting is disabled (C74).

Next, a roll screen is displayed in the slot machine 10 designated to be the shooter. Then, player-started or automatic rolling is executed (C75). A winning is achieved when the pips of dice resulted from the rolling is either "7" or "11" (C76). Then, a prize of "$150.20" or the like corresponding to the bet amount is awarded (C77). Then, the next crap game is run.

Further, a loss is resulted when "2", "3", or "12" is resulted from the rolling (C78). In this case, the game results such as the prizes won in the crap games are displayed, and an image is displayed to indicate the end of game. The crap games of the advanced mode are then completed.

Further, the game results in a draw when "4", "5", "6", "8", "9", or "10" are resulted from the rolling (C79). In this case, when the pips of dice resulted is "5", this "5" is determined to be the point, and a display area of the bet screen corresponding to this point is emphasized (C80). After that, manual betting is enabled for a certain period (C81). Then, player-started or automatic roll is executed (C82). A winning is resulted when the pips of dice resulted from the roll matches the point "5" (C83). In this case, the game result of the crap game is displayed, while payout is executed (C77). The next crap game is run thereafter.

Further, a loss is resulted when the pips of dice resulted from rolling add up to "7" (C85). In this case, the easy mode is ended. Further, the game results in a draw when the pips of dice resulted from the roll is other than the point "5" (C84), and the crap game is run again.

The present embodiment deals with a case where the number of paylines L is 25; however, the number of paylines is not limited to this in the present invention. For example, the number of paylines may be 30.

The present embodiment deals with a case where winning of bonus is achieved when three or more trigger symbols are rearranged. However, winning of bonus is not limited to this. For example, winning of bonus may be achieved when a predetermined time has elapsed since the last bonus game has ended.

Further, in the present embodiment, the free game is a game in which display of symbols on display blocks 28 are varied and stopped, and then an amount of payout is determined according to the symbols having stopped or a combination of the stopped symbols (i.e. a game normally run in a slot machine). However, the free game of the present invention is not limited to this, and the free game may be different from a game run in a slot machine. Examples of the free game include: a card game such as poker, a shooting game, a fighting game, or the like. The free game may be a game that awards a game medium or a game awarding no game medium.

Further, the following is also possible. Namely, a free game is run on condition that the number of regular games counted during the insured mode reaches a predetermined count. Then, when the number of regular games counted during the insured mode once again reaches a predetermined number, a free game which is different from the previous free game is run. The free game in the present invention may be suitably designed, and is not particularly limited, as long as the free game requires no bet of a game medium.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above. For example, various values such as the draw count value, subtraction value, skip value, read-out value, or the like mentioned in the present embodiment and modifications 1 and 2 are no more than examples, and these values are not particularly limited.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process executed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes executed in the steps or blocks, these processes are essentially executed by various devices. Further, the other structures necessary for the steps or blocks are obvious from the above descriptions.

What is claimed is:

1. A gaming machine, comprising:

a plurality of gaming terminals each having an input device which accepts an external input, and a terminal controller;

a center controller connected in communication with the gaming terminals, wherein the terminal controller is programmed to execute the steps of:

(a1) running a base game in response to a start operation inputted through the input device;

(a2) in response to a game start command from the center controller, running a common game whose game result includes a draw; and (a3) determining a game result of the common game based on game result information from the center controller, and when a game result is a draw, running a common game again based on next game result information, and wherein the center controller is programmed to execute steps of:

(b1) outputting a game start command to a gaming terminal having satisfied a game running condition at a predetermined timing;

(b2) collectively perform determination of a game result, sequentially in relation to a series of common games, until a game result other than a draw occurs;

(b3) among the game results of the series of common games thus determined in (b2), skipping at least partially one or more game results each indicating a draw, and sequentially outputting remaining one or more game results as game result information to each of the gaming terminals.

2. The gaming machine according to claim 1, wherein:

the center controller executes (b2), on condition that a predetermined count of common games are repeated.

3. The gaming machine according to claim 1, wherein:

the center controller, in (b3), (i) randomly determines a re-execution count of the common games indicating the count of common games re-executed at the terminal controller, based on the game result information, and (ii) when a count of consecutive game results which are determined in (b2) and indicates a draw is greater than the re-execution count, determines a skip count of the game results indicating a draw so that the count of the game results indicating a draw equals the re-execution count.

4. The gaming machine according to claim 3, wherein:

the center controller executes (b3) on condition that a predetermined count of consecutive game results determined in (b2) indicate a draw.

5. The gaming machine according to claim 1, wherein:

the center controller executes the following process of: determining in advance a repetition count indicating the number of common games to result in a draw, and executing (b2) on condition that the number of common games repeated equals the repetition count;

skipping in (b3) all the game results indicating a draw out of the game results determined in (b2); and outputting a last one of the game results as game result information to each of the gaming terminals.

6. The gaming machine according to claim 5, wherein:

the gaming terminals further include a display device;

the terminal controller executes the step of (a4) executing a process for displaying, on the display device, skip information from the center controller, and the center controller executes the step of (b4) outputting one or more game results which indicate a draw and are skipped in (b3) as the skip information to each of the gaming terminal.

7. The gaming machine according to claim 1, wherein:

the gaming terminals further include a display device;

the terminal controller executes the step of (a4) executing a process for displaying, on the display device, skip information from the center controller, and the center controller executes the step of (b4) outputting one or more game results which indicate a draw and are skipped in (b3) as the skip information to each of the gaming terminal.

8. The gaming machine according to claim 1, wherein the common game is a crap game.

9. A gaming machine, comprising:

a plurality of gaming terminals each including an input device which accepts an external input, and a terminal controller; and a center controller connected in communication with the gaming terminals, wherein the terminal controller is programmed to execute the steps of:

(c1) running a base game in response to a start operation inputted through the input device;

(c2) running a crap game in response to a game start command from the center controller;

(c3) determining whether the gaming terminal is designated to be a shooter of the crap game, based on a shooter command from the center controller, and when the gaming terminal is designated to be a shooter, accepting a roll operation input through the input device and enabling a roll operation command to be output to the center controller; and (c4) determining a game result of the crap game based on game result information from the center controller, and when the game result indicates a draw, running a crap game again based on next game result information, and wherein the center controller is programmed to execute steps of:

(d1) determining whether a crap game start condition is met, based on a running state of the base game at each gaming terminal;

(d2) when the crap game start condition is met, outputting a game start command to one or more gaming terminals having satisfied a game running condition;

(d3) after outputting the game start command, selecting a specific gaming terminal from among one or more gaming terminals having satisfied the game running condition, and outputting a shooter command to the specific gaming terminal;

(d4) collectively perform determination of a game result, sequentially in relation to a series of crap games, in response to a roll operation command from the specific gaming terminal, until a game result other than a draw occurs;

(d5) among the game results of the series of crap games thus determined in (d4), skipping at least partially one or more game results each indicating a draw, and sequentially outputting remaining one or more game results as game result information to each of the gaming terminals.

10. A game control method of a gaming machine including a plurality of gaming terminals including an input device which accepts an external input, and a terminal controller, and a center controller connected in communication with the gaming terminals, the method comprising:

the terminal controller executing the steps of:

running a base game in response to a start operation input through the input device;

in response to a game start command from the center controller, running a common game whose game result includes a draw; and determining a game result of the common game based on game result information from the center controller, and when a game result is a draw, running a common game again based on next game result information, and the center controller executing the steps of:

outputting a game start command to a gaming terminal having satisfied a game running condition at a predetermined timing;

collectively performing determination of a game result, sequentially in relation to a series of common games, until a game result other than a draw occurs; and among the game results of the series of crap games thus determined sequentially through collectively performed determination of game results, skipping at least a partially one or more game results each indicating a draw, and sequentially outputting remaining one or more game results as game result information, to each of the gaming terminals.

* * * * *